(12) United States Patent
Kanitz

(10) Patent No.: US 11,981,233 B2
(45) Date of Patent: May 14, 2024

(54) PASSENGER SEATS AND DOORS FOR AN AUTONOMOUS VEHICLE

(71) Applicant: UATC, LLC, Mountain View, CA (US)

(72) Inventor: Daniel Adam Kanitz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 18/181,932

(22) Filed: Mar. 10, 2023

(65) Prior Publication Data

US 2023/0211707 A1 Jul. 6, 2023

Related U.S. Application Data

(63) Continuation of application No. 16/923,610, filed on Jul. 8, 2020, now Pat. No. 11,607,973.

(Continued)

(51) Int. Cl.
*B60N 2/02* (2006.01)
*B60J 5/04* (2006.01)
(Continued)

(52) U.S. Cl.
CPC .......... *B60N 2/0292* (2013.01); *B60J 5/0455* (2013.01); *B60J 5/0479* (2013.01); *B60J 5/062* (2013.01);
(Continued)

(58) Field of Classification Search
CPC ........ B60N 2/0292; B60N 2/832; B60N 2/01; B60N 2/12; B60N 2/203; B60N 2/22;
(Continued)

(56) References Cited

U.S. PATENT DOCUMENTS 7,125,076 B2 10/2006 Beranek et al.
7,281,761 B2 10/2007 Brown et al.
(Continued)

FOREIGN PATENT DOCUMENTS

CN 107264344 10/2017
FR 2963907 2/2012

OTHER PUBLICATIONS

International Search Report and Written Opinion for Application No. PCT/US2021/035645, dated Sep. 10, 2021, 12 pages.

*Primary Examiner* — Mark R Wendell
(74) *Attorney, Agent, or Firm* — Dority & Manning, P.A.

(57) ABSTRACT

An autonomous can include one or more configurable passenger seats to accommodate a plurality of different seating configurations. For instance, the one or more passenger seats can include a passenger seat defining a seating orientation. The passenger seat can be configurable in a first configuration in which the seating orientation is directed towards a forward end of the autonomous vehicle and a second configuration in which the seating orientation is directed towards a rear end of the autonomous vehicle. The passenger seat can include a seatback rotatable about a pivot point on a base of the passenger seat to switch between the first configuration and the second configuration. Alternatively, or additionally, the autonomous vehicle can include a door assembly pivotably fixed to a vehicle body of the autonomous vehicle such that a swept path of the door assembly when moving between an open position and a closed position is reduced.

20 Claims, 34 Drawing Sheets

Related U.S. Application Data

(60) Provisional application No. 63/034,424, filed on Jun. 4, 2020.

(51) Int. Cl.
| | |
|---|---|
| *B60J 5/06* | (2006.01) |
| *B60N 2/00* | (2006.01) |
| *B60N 2/01* | (2006.01) |
| *B60N 2/12* | (2006.01) |
| *B60N 2/20* | (2006.01) |
| *B60N 2/832* | (2018.01) |
| *B60N 2/90* | (2018.01) |
| *E05D 15/04* | (2006.01) |
| *E05D 15/34* | (2006.01) |
| *B60N 2/22* | (2006.01) |
| *B60R 3/00* | (2006.01) |

(52) U.S. Cl.
CPC .............. *B60N 2/002* (2013.01); *B60N 2/01* (2013.01); *B60N 2/0224* (2013.01); *B60N 2/12* (2013.01); *B60N 2/203* (2013.01); *B60N 2/832* (2018.02); *B60N 2/933* (2018.02); *E05D 15/04* (2013.01); *E05D 15/34* (2013.01); *B60N 2/02253* (2023.08); *B60N 2/22* (2013.01); *B60N 2205/30* (2013.01); *B60R 3/002* (2013.01); *E05Y 2900/531* (2013.01)

(58) Field of Classification Search
CPC ...... B60N 2/933; B60N 2/002; B60N 2/0224; B60N 2/02253; B60J 5/0455; B60J 5/0479; B60J 5/062; E05D 15/04; E05D 15/34; B60R 3/002; E05Y 2900/531
USPC ..................................................... 296/65.13
See application file for complete search history.

(56) References Cited

U.S. PATENT DOCUMENTS

| | | | |
|---|---|---|---|
| 7,484,795 | B2 | 2/2009 | Saint-James et al. |
| 7,644,982 | B2 | 1/2010 | Paluch |
| 9,815,388 | B1 | 11/2017 | Lindsay |
| 10,479,233 | B2 | 11/2019 | Minato et al. |
| 10,744,910 | B1 | 8/2020 | Palm et al. |
| 11,077,816 | B1 * | 8/2021 | Bates .................... B60R 21/013 |
| 2008/0093910 | A1 | 4/2008 | Kato |
| 2014/0138991 | A1 | 5/2014 | Deimen et al. |
| 2015/0142245 | A1 | 5/2015 | Cuddihy et al. |
| 2015/0258955 | A1 | 9/2015 | Jayasuriya et al. |
| 2017/0028876 | A1 | 2/2017 | Yamada |
| 2017/0267124 | A1 | 9/2017 | Numazawa et al. |
| 2019/0299819 | A1 | 10/2019 | Zhao |
| 2020/0086768 | A1 | 3/2020 | Line et al. |
| 2021/0064051 | A1 * | 3/2021 | Dudar .................... B60N 2/0268 |
| 2021/0122270 | A1 * | 4/2021 | Baer .................... B60N 2/42745 |
| 2021/0178934 | A1 * | 6/2021 | Ellis .................... B60N 2/06 |
| 2021/0188287 | A1 * | 6/2021 | Taveira .................... B62D 1/183 |

* cited by examiner

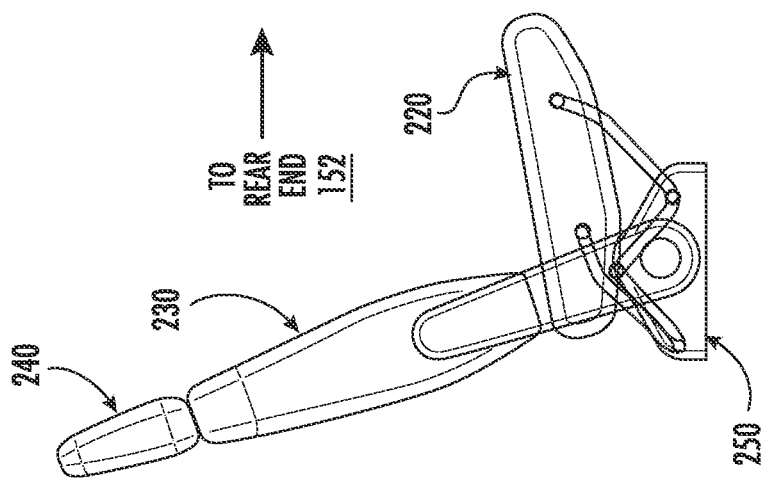
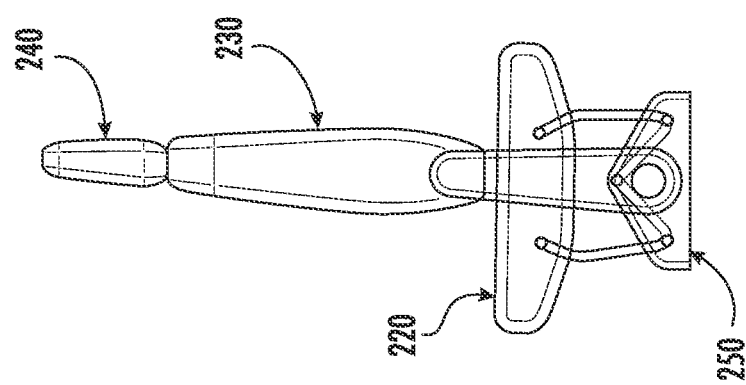
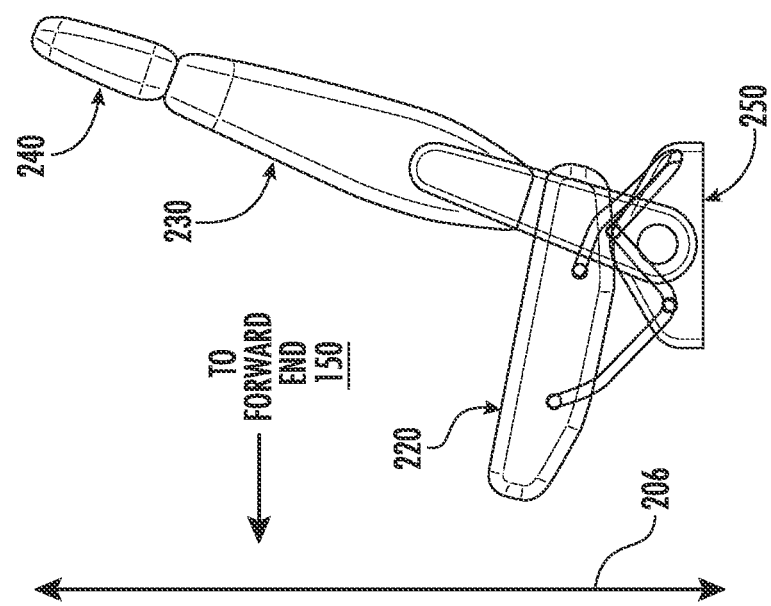

PASSENGER SEATS AND DOORS FOR AN AUTONOMOUS VEHICLE

RELATED APPLICATION

The present application is a continuation of U.S. patent application Ser. No. 16/923,610, titled "Passenger Seats and Doors for an Autonomous Vehicle", and filed on Jul. 8, 2020, which is based on and claims benefit of U.S. Provisional Patent Application No. 63/034,424 having a filing date of Jun. 4, 2020. Applicant claims priority to and the benefit of each of such applications and incorporates all such applications herein by reference in its entirety.

FIELD

The present disclosure relates generally to autonomous vehicles and, more particularly, passenger seats and doors for autonomous vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

In one example aspect, an autonomous vehicle is provided. The autonomous vehicle defines a lateral axis, a longitudinal axis, and a vertical axis. Furthermore, the autonomous vehicle extends between a forward end and a rear end along the longitudinal axis. The autonomous vehicle includes a passenger seat defining a seating orientation. The passenger seat further defines a first axis that is parallel to the lateral axis of the autonomous vehicle and a second axis that is parallel to the lateral axis of the autonomous vehicle. The passenger seat is configurable in a first configuration in which the seating orientation is directed towards the forward end of the autonomous vehicle and a second configuration in which the seating orientation is directed to the rear end of the autonomous vehicle. The passenger seat includes a base and a seatback pivotably coupled to the base. The seatback is rotatable about a pivot point on the base to switch the passenger seat between the first configuration and the second configuration. The passenger seat further includes a seat bottom coupled to the base. The seat bottom is movable along the second axis when the seatback rotates about the pivot point on the base. Alternatively, or additionally, the seat bottom rotates about the first axis when the seatback rotates about the pivot point on the base.

In another example aspect, an autonomous vehicle is provided. The autonomous vehicle defines a lateral axis, a longitudinal axis, and a vertical axis. Furthermore, the autonomous vehicle extends between a forward end and a rear end along the longitudinal axis. The autonomous vehicle includes a passenger seat defining a seating orientation. The passenger seat further defines a first axis that is parallel to the lateral axis of the autonomous vehicle and a second axis that is parallel to the lateral axis of the autonomous vehicle. The passenger seat is configurable in a first configuration in which the seating orientation is directed towards the forward end of the autonomous vehicle and a second configuration in which the seating orientation is directed to the rear end of the autonomous vehicle. The passenger seat includes a base and a seatback pivotably coupled to the base. The seatback is rotatable about a pivot point on the base to switch the passenger seat between the first configuration and the second configuration. The passenger seat further includes a seat bottom coupled to the base. The seat bottom is rotatable about the first axis when the seatback rotates about the pivot point on the base.

In yet another example aspect, an autonomous vehicle is provided. The autonomous vehicle defines a lateral axis, a longitudinal axis, and a vertical axis. Furthermore, the autonomous vehicle extends between a forward end and a rear end along the longitudinal axis. The autonomous vehicle includes a first row of passenger seats and a second row of passenger seats spaced apart from the first row of passenger seats along the longitudinal axis. The first row of passenger seats and the second row of passenger seats each include at least two passenger seats spaced apart from one another along the lateral axis. Each of the at least two passenger seats define a seating orientation. Furthermore, each of the at least two passenger seats include a base and a seatback pivotably coupled to the base. The seatback is pivotable relative to the base to switch between a first configuration in which the seating orientation faces the forward end of the autonomous vehicle and a second configuration in which the seating orientation faces the rear end of the autonomous vehicle. Each of the at least two passenger seats further include a seat bottom coupled to the base. The seat bottom is movable relative to the base along the longitudinal axis when the seatback rotates about the pivot point on the base. When each of the at least two passenger seats is in the first configuration, the seatback of a passenger seat of the at least two passenger seats is positioned forward of the seatback of every other passenger seat of the at least two passenger seats. Conversely, when each of the at least two passenger seats is in the second configuration, the seatback of the passenger seat is positioned aft of the seatback of every other passenger seat of the at least two passenger seats.

In one example aspect, an autonomous vehicle is provided. The autonomous vehicle includes a vehicle body and a door assembly. The autonomous vehicle further includes a linkage assembly pivotably fixing the door assembly to the vehicle body. The linkage assembly includes a first linkage arm and a second linkage arm. The first linkage arm pivotably fixes the door assembly to the vehicle body at a first pivot point on the vehicle body. The second linkage arm pivotably fixes the door assembly to the vehicle body at a second pivot point on the vehicle body. The second pivot point is spaced apart from the first pivot point along a longitudinal axis of the vehicle body and a vertical axis of the vehicle body. Furthermore, movement of the first linkage arm and the second linkage arm causes the door assembly to translate along the longitudinal axis and a lateral axis of the vehicle body.

In another example aspect, an autonomous vehicle is provided. The autonomous vehicle includes a vehicle body and a double door. The double door includes a first door assembly and a second door assembly. Furthermore, at least one of the first door assembly or the second door assembly is movable between an open position and a closed position to selectively couple a vertical support to the vehicle body.

In yet another example aspect, an autonomous vehicle is provided. The autonomous vehicle includes a vehicle body and a double door. The double door includes a first door assembly and a second door assembly. The first door assembly and the second door assembly are each movable between an open position and a closed position to permit access to an interior of the vehicle body via an opening defined by the vehicle body. The autonomous vehicle further includes a vertical support coupled to the vehicle body and movable along a longitudinal axis of the vehicle body. The vertical support is positioned at a first location within the opening when the first door assembly is in the open position. Conversely, when the first doo assembly is in the closed position, the vertical support is positioned at a second location within the opening. The second location being different than the first location.

Other example aspects of the present disclosure are directed to other systems, methods, vehicles, apparatuses, tangible non-transitory computer-readable media, and devices for motion prediction and/or operation of a device including a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 16A depicts the first passenger seat of FIG. 15 in the first configuration according to example embodiments of the present disclosure.

FIG. 16B depicts the first passenger seat of FIG. 15 in an intermediate third configuration according to example embodiments of the present disclosure.

FIG. 16C depicts the first passenger seat of FIG. 15 in the second configuration according to example embodiments of the present disclosure.

DETAILED DESCRIPTION

Figure 1:
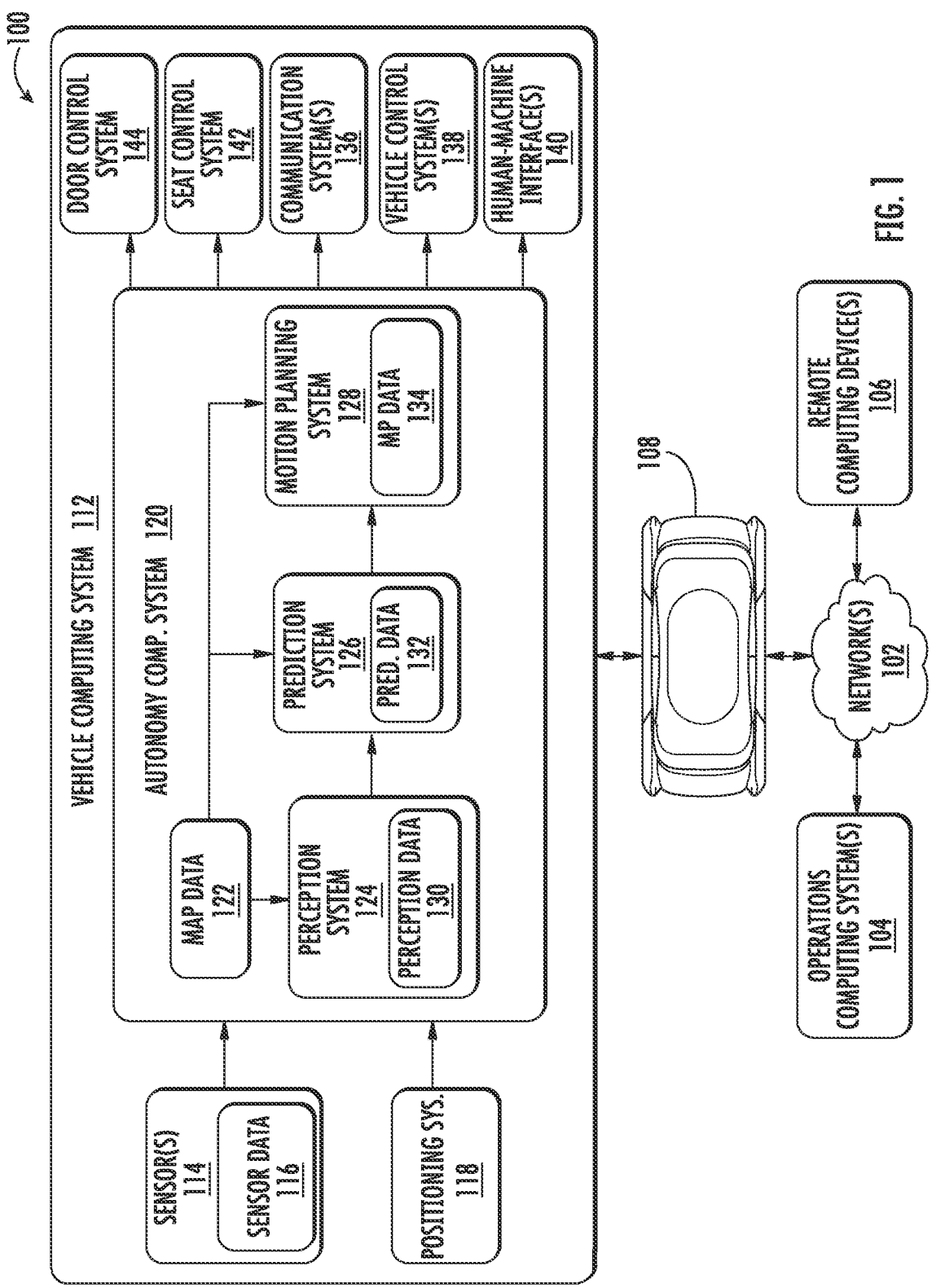
FIG. 1 depicts a block diagram of an example system for controlling the computational functions of an autonomous vehicle according to example embodiments of the present disclosure.
Figure 2:
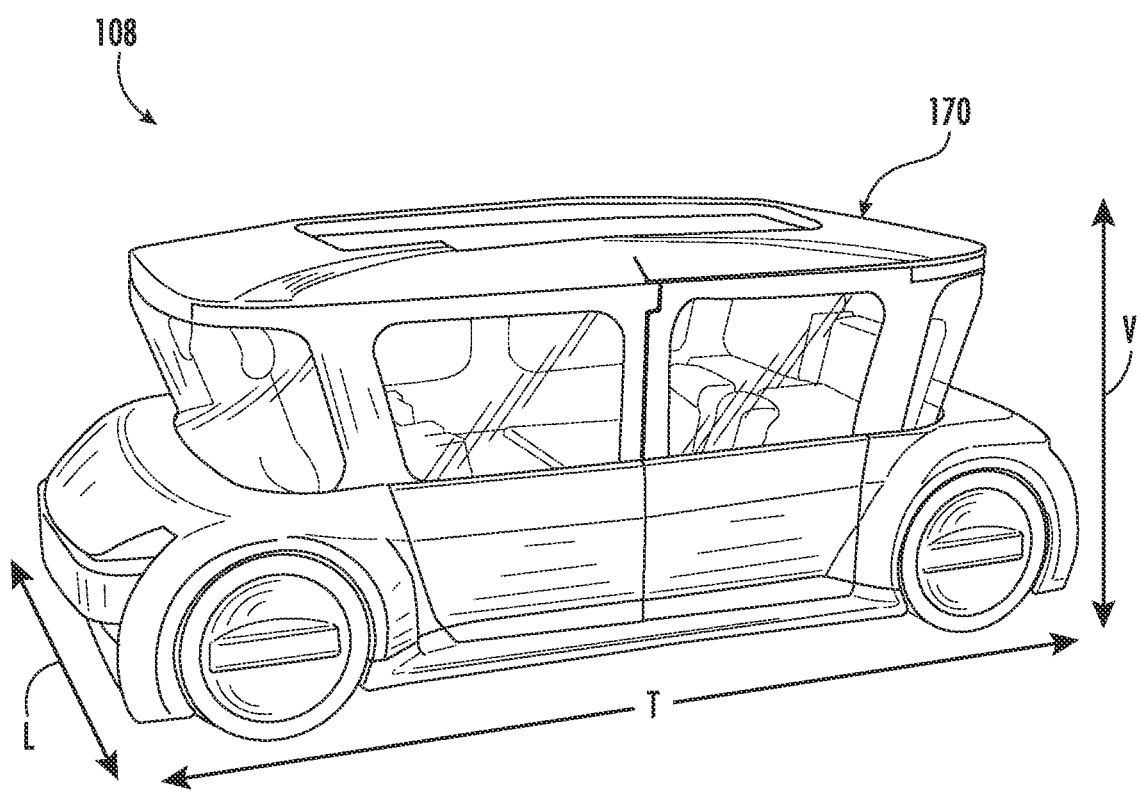
FIG. 2 depicts an autonomous vehicle according to example embodiments of the present disclosure.

Example aspects of the present disclosure are directed to an autonomous vehicle having one or more configurable passenger seats such that the interior of the autonomous vehicle can accommodate a plurality of different seating configurations (e.g., pool configuration, social configuration, meeting configuration, family configuration, etc.). This can improve the flexibility of the interior of an autonomous vehicle to automatically accommodate a variety of transportation services and preferences of passengers (e.g., utilizing the autonomous vehicle for ridesharing/ride-hailing). For instance, a first passenger seat of the autonomous vehicle can be configurable in a first configuration in which a seating orientation of the first passenger seat is directed towards a first end (e.g., forward end) of the autonomous vehicle and a second configuration in which the seating orientation is directed towards a second end (e.g., rear end) of the autonomous vehicle. The seating orientation defines the direction of the seat. For example, the first passenger seat faces the first end of the autonomous vehicle when in the first configuration and the first passenger seat faces the second, opposite end when in the second configuration.

The first passenger seat can include a base and a seatback pivotably coupled to the base. In this manner, the seatback can rotate about a pivot point on the base to switch the first passenger seat between the first configuration and the second configuration. When the first passenger seat is in the first configuration, the seating orientation of the first passenger seat and the seating orientation of a second passenger seat that is spaced apart from the first passenger seat along a longitudinal axis of the autonomous vehicle can each be directed towards the same end (e.g., first end) of the autonomous vehicle. In this manner, the interior of the autonomous vehicle can accommodate a first seating configuration (e.g., pool configuration) in which a passenger seated in the first passenger seat and a passenger seated in the second passenger seat do not face one another. Conversely, the seating orientation of the first passenger seat and the seating orientation of the second passenger seat can face different ends (e.g., first end, second end) of the autonomous vehicle when the first passenger seat is in the second configuration. In this manner, the interior of the autonomous vehicle can accommodate a second seating configuration (e.g., social configuration, meeting configuration, family configuration) in which a passenger seated in the first passenger seat and a passenger seated in the second passenger seat face one another.

The autonomous vehicle can also, or alternatively, include an improved door assembly that allows for user access while minimizing the potential for the door assembly to interfere with its surroundings. For instance, example aspects of the present disclosure are directed to an autonomous vehicle having a linkage assembly pivotably fixing a door assembly to a vehicle body of the autonomous vehicle. The linkage assembly can include at least a first linkage arm and a second linkage arm. The first linkage arm can pivotably fix the door assembly to the vehicle body at a first pivot point on the vehicle body. The second linkage arm can pivotably fix the door assembly to the vehicle body at a second pivot point on the vehicle body that is spaced apart from the first pivot point along a vertical axis of the vehicle body and a longitudinal axis of the vehicle body. In this manner, movement of the first linkage arm and the second linkage arm can cause the door assembly to translate along the longitudinal axis and a lateral axis of the vehicle body. Furthermore, the first pivot point and the second point can be inset from a periphery of the vehicle body to reduce a swept path of the door assembly when moving between an open position and a closed position to allow passengers to enter and exit the interior of the vehicle body. More specifically, the swept path of the door assembly can be reduced such that the door assembly does not protrude onto a sidewalk or adjacent traffic lane.

In some implementations, the door assembly of the autonomous vehicle can help improve the support structure of the autonomous vehicle. For instance, example aspects of the present disclosure are directed to an autonomous vehicle having a vertical support (e.g., support pillar) that can be selectively coupled to a vehicle body of the autonomous vehicle. More specifically, the vertical support can be selectively coupled to the vehicle body based on a position (e.g., open, closed) of at least one door of a double door. When the at least one door is in the closed position, the vertical support can be coupled to the vehicle body. In some implementations, the vertical support can be coupled to the vehicle body such that the vertical support is positioned at a middle of an opening through which passengers enter and exit the interior (e.g., passenger compartment) of the vehicle body. Conversely, the vertical support can be decoupled from the vehicle body when the at least one door is in the open position. Furthermore, the vertical support is not positioned at the middle of the opening when the at least one door is in the open position. In this manner, the vertical support does not obstruct the opening through which passengers enter and exit the interior of the vehicle body.

The following describes these example aspects of the present disclosure in greater detail. An autonomous vehicle (e.g., ground-based vehicle, aerial vehicle, etc.) can include various systems and devices configured to control the operation of the autonomous vehicle. For example, an autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

According to the present disclosure, the interior of the autonomous vehicle can be flexibly configured to accommodate a plurality of different seating configurations (e.g., pool configuration, social configuration, meeting configuration, family configuration, luggage configuration, etc.). For instance, the interior of the autonomous vehicle can accommodate at least a first passenger seat and a second passenger seat that is spaced apart from the first passenger seat along a longitudinal axis of the autonomous vehicle. The first passenger seat can be configurable in a first configuration in which a seating orientation of the first passenger seat is directed towards a first end (e.g., forward end) of the autonomous vehicle and a second configuration in which the seating orientation of the first passenger seat is directed towards a second end (e.g., rear end) of the autonomous vehicle.

The seating orientation of the first passenger seat and the seating orientation of the second passenger seat can each be directed towards the same end (e.g., first end) of the autonomous vehicle when the first passenger seat is in the first configuration. In this manner, the interior of the autonomous vehicle can accommodate a first seating configuration (e.g., pool configuration) in which a passenger seated in the first passenger seat and a passenger seated in the second passenger seat do not face one another. Conversely, the seating orientation of the first passenger seat and the seating orientation of the second passenger seat can face different ends (e.g., first end, second end) of the autonomous vehicle when the first passenger seat is in the second configuration. In this manner, the interior of the autonomous vehicle can accommodate a second seating configuration (e.g., social configuration) in which a passenger seated in the first passenger seat and a passenger seated in the second passenger seat face one another.

The first passenger seat can include a base and a seatback pivotably coupled to the base. More specifically, the seatback can be pivotably coupled to the base via one or more linkage arms. In this manner, the seatback can rotate about a pivot point on the base to switch the first passenger seat between the first configuration and the second configuration. For instance, the seatback can rotate about the pivot point in a clockwise direction to switch the first passenger seat from the first configuration to the second configuration. Conversely, the seatback can rotate about the pivot point in a counterclockwise direction to switch the first passenger seat from the second configuration to the first configuration.

The first passenger seat can be oriented within the interior of the autonomous vehicle such that a first axis of the first passenger seat is parallel to a lateral direction of the autonomous vehicle and a second axis of the first passenger seat is parallel to the longitudinal axis of the autonomous vehicle.

In some implementations, the base of the first passenger seat can rotate relative to the autonomous vehicle. In such implementations, it should be understood that rotation of the base of the first passenger seat relative to the autonomous vehicle can cause the first axis of the first passenger seat to be non-parallel with the lateral axis of the autonomous vehicle. Likewise, rotation of the base relative to the autonomous vehicle can cause the second axis to be non-parallel with the longitudinal axis of the autonomous vehicle.

A seat bottom of the first passenger seat can rotate about the first axis that is parallel to a lateral axis of the autonomous vehicle. In this manner, the seat bottom can rotate about the first axis to adjust a tilt angle of the seat bottom. More specifically, the seat bottom can rotate about the first axis such that the seat bottom is tilted up relative to the second axis or tilted down relative to the second axis. It should be understood that the tilt angle is defined between the seat bottom and the second axis.

In some implementations, the seat bottom can be pivotably coupled to the base of the first passenger seat via one or more linkage arms for the seat ("seat linkage arm"). For instance, the seat bottom can be pivotably coupled to the base via a first linkage arm and a second linkage arm. The first linkage arm can be pivotably coupled to the base at a first pivot point thereon. The second linkage arm can be pivotably coupled to the base at a second point thereon. In some implementations, the one or more linkage arms (e.g., first linkage arm, second linkage arm) can be disposed within a portion of the base having a shape corresponding to a parallelogram. It should be understood, however, that the one or more linkage arms can be disposed at any suitable location on the base.

In some implementations, movement of the first linkage arm and the second linkage arm about the first pivot point and the second pivot point, respectively, can cause the seat bottom to move (e.g., translate) along the second axis that is parallel to the longitudinal axis of the autonomous vehicle. For instance, movement of the first linkage arm and the second linkage arm can cause the seat bottom to initially rotate about the first axis that is parallel to the lateral axis of the autonomous vehicle. More specifically, movement of the first linkage arm and the second linkage arm can initially cause the seat bottom to rotate about the first axis until the tilt angle of seat bottom is 0 degrees (e.g., horizontal). The seat bottom can then translate along the second axis until continued movement of the first linkage arm and the second linkage arm again causes the seat bottom to rotate about the first direction. More specifically, the continued movement of the first linkage arm and the second linkage arm can cause the seat bottom to rotate such that the seat bottom is no longer horizontal (that is, the tilt angle is not 0 degrees).

The seat bottom can be configured to rotate about the first axis when the seatback is, as discussed above, rotating about the pivot point on the base to switch the first passenger seat between the first configuration and the second configuration. In some implementations, the seatback can be configured to translate along a third axis thereof that is parallel to the vertical axis of the autonomous vehicle. In this manner, the seatback can translate along the third axis to accommodate rotation of the seat bottom about the first axis. For instance, the seatback can be configured to move (e.g., translate) away from the seat bottom along the third axis. In this manner, the seat bottom can rotate without contacting (e.g., touching) the seatback.

The seatback and the seat bottom can rotate in opposing directions to switch the first passenger seat between the first configuration and the second configuration. For instance, the seat bottom can rotate about the first axis in the counterclockwise direction when the seatback is rotating about the pivot point in the clockwise direction to switch the first passenger seat from the first configuration to the second configuration. Conversely, the seat bottom can rotate about the first axis in the clockwise direction when the seatback is rotating about the pivot point in the counterclockwise direction to switch the first passenger seat from the second configuration to the first configuration.

In some implementations, a first tilt angle of the seat bottom when the first passenger seat is in the first configuration can be substantially the same (e.g., within a 10% margin) as a second tilt angle of the seat bottom when the first passenger seat is in the second configuration. Alternatively, or additionally, a first reclination angle of the seatback when the first passenger seat is in the first configuration can be substantially the same as a second reclination angle of the seatback when the first passenger seat is in the second configuration. It should be understood that the reclination angle corresponds to angle that is defined between the third axis and the seatback when the seatback is tilted in a first direction (e.g., forward) or a second direction (e.g., rearward) relative to the third axis. Alternatively, or additionally, a first relative angle between the seatback and the seat bottom when the first passenger seat is in the first configuration can be substantially the same as a second relative angle between the seatback and the seat bottom when the first passenger seat is in the second configuration.

In some implementations, the first passenger seat can include one or more drive or locking mechanisms (e.g., cam, ratchet and ball, screw, etc.) to hold the first passenger seat in the first configuration and the second configuration. In this manner, the one or more mechanisms can prevent a user from manually moving the seatback or seat bottom to switch the first passenger seat from the first configuration to the second configuration or vice versa.

In some implementations, the base of the first passenger seat can move along the longitudinal axis of the autonomous vehicle via one or more tracks defined by a floorboard of the autonomous vehicle. A floorboard can include a floor, bottom surface, or other flooring portion of the interior/passenger compartment of the autonomous vehicle. More specifically, the one or more tracks can extend between the second passenger seat and the first end (e.g., forward end) of the autonomous vehicle. In some implementations, the first passenger seat can switch between the first configuration and the second configuration while the base thereof is moving along the longitudinal axis via the one or more tracks. In some implementations, the one or more tracks can be accessible through one or more openings defined by the floorboard. In such implementations, a cover can be disposed within the one or more openings to prevent passengers from putting their hands through the one or more openings to access the one or more tracks.

It should be understood that the first passenger seat can be configured to accommodate any suitable number of passengers. For instance, in some implementations, the first passenger seat can be a captain seat configured to accommodate a single passenger. In alternative implementations, the first passenger seat can be a bench configured to accommodate two or more passengers.

In some implementations, a seatback of the second passenger seat can be pivotably coupled to a seat bottom of the second passenger seat. In this manner, the seatback of the second passenger seat can rotate about a pivot point on the seat bottom of the second passenger seat to move (e.g., rotate) between a deployed position and a stowed position.

When the seatback of the second passenger seat is in the deployed position, the seatback of the second passenger seat can be substantially perpendicular to the seat bottom of the second passenger seat. In this manner, the second passenger seat can accommodate a passenger when the seatback of the second passenger seat is in the deployed position. Conversely, the seatback of the second passenger seat can be substantially parallel (e.g., less than a 15 degree difference, less than a 10 degree difference, less than a 5 degree difference, less than a 1 degree difference, etc.) to the seat bottom of the second passenger seat when the seatback of the second passenger seat is in the stowed position.

The second passenger seat can define the same first axis, second axis, and third axis discussed above with respect to the first passenger seat. Furthermore, the seat bottom of the second passenger seat can be configured to rotate about the first axis when the seatback is, as discussed above, rotating about the pivot point on the seat bottom to move between the deployed position and the stowed position. In some implementations, the tilt angle of the seat bottom of the second passenger seat can be less than about 5 degrees when the seatback is in the stowed position. In this manner, the seatback can fold down onto the seat bottom such that the seatback can be used as table.

In some implementations, the second passenger seat can include a headrest movable between a retracted position and an extended position. When the seatback of the second passenger seat is in the deployed position, the headrest can be in the extended position to provide support for the head of a person seated in the second passenger seat. Conversely, the headrest can be in the retracted position when the seatback of the second passenger seat is in the stowed position. In some implementations, the headrest can move from the extended position to the retracted position (e.g., in the seatback) when the seatback is moving (e.g., rotating) from the deployed position to the stowed position.

In some implementations, a position (e.g., extended position or retracted position) of the headrest when the seatback of the second passenger seat is in the deployed position can be based on whether a person is seated in the second passenger seat. For instance, a seat control system of the autonomous vehicle can be in communication with one or more sensors (e.g., load cell) configured to determine whether a person is seated in the second passenger seat. In this manner, the seat control system can control movement of the headrest based, at least in part, on whether a person is seated in the second passenger seat.

When data obtained from the one or more sensors indicates a person is seated in the second passenger seat, the seat control system can provide one or more control signals to one or more actuators (e.g., electric motors) configured to control movement of the headrest. More specifically, the one or more control signals can be associated with moving the headrest into the extended position. In this manner, the headrest can support the head of the person seated in the second passenger seat.

Conversely, the seat control system can provide one or more control signals to the one or more actuators (e.g., electric motors) when the data obtained from the one or more sensors (e.g., load cell) indicate a person is not seated in the second passenger seat. More specifically, the one or more control signals can be associated with moving the headrest into the retracted position. In this manner, the headrest can be retracted to avoid obstructing the view of passengers seated in the first passenger seat. More specifically, the headrest can be retracted to avoid obstructing the passengers view out one or more windows of the autonomous vehicle.

In some implementations, the autonomous vehicle can include a third passenger seat positioned between the second end (e.g., rear end) of the autonomous vehicle and the second passenger seat along the longitudinal axis. The seatback of the third passenger seat can be coupled to a vehicle body (e.g., frame) of the autonomous vehicle. Furthermore, the seat bottom of the third passenger seat be pivotably coupled to the seatback thereof. In this manner, the seat bottom can rotate about a pivot point on the seatback to move (e.g., rotate) between a deployed position and a stowed position. When the seat bottom is in the deployed position, the seat bottom can be substantially perpendicular to the seatback. In this manner, the third passenger seat can accommodate a passenger when the seatback thereof is in the deployed position. Conversely, the seat bottom can be substantially parallel to the seatback when the seat bottom is in the stowed position. When the seat bottom of the third passenger seat is in the stowed position, a space between the second passenger seat and the third passenger seat along the longitudinal axis can accommodate luggage of one or more passengers.

In some implementations, the interior of the autonomous vehicle can include a first row of passenger seats and a second row of passenger seats that is spaced apart from the first row of passenger seats along the longitudinal axis. For instance, the first row of passenger seats and the second row of passenger seats can each include at least two passenger seats arranged in a side-by-side configuration along the lateral axis of the autonomous vehicle. Each of the at least two passenger seats can define a seating orientation. Furthermore, each of the at least two passenger seats can be configurable in a first configuration in which the seating orientation is directed towards a first end (e.g., forward end) of the autonomous vehicle and a second configuration in which the seating orientation is directed towards a second end (e.g., rear end) of the autonomous vehicle.

Each of the at least two passenger seats can include a base and a seatback pivotably coupled to the base. In this manner, the seatback can rotate about a pivot point on the base to switch the corresponding passenger seat between the first configuration and the second configuration. Each of the at least two passenger seats can further include a seat bottom configured to rotate about the lateral axis of the autonomous vehicle to adjust a tilt angle of the seat bottom. The seat bottom can be configured to rotate about the lateral axis when the seatback is rotating about the pivot point on the base to switch the corresponding passenger seat between the first configuration and the second configuration. In some implementations, the tilt angle of the seat bottom when the corresponding passenger seat is in the first configuration can be substantially the same as the tilt angle of the seat bottom when the corresponding passenger seat is in the second configuration. Alternatively, or additionally, a first reclination angle of the seatback when the corresponding passenger seat is in the first configuration can be substantially the same as a second reclination angle of the seatback when the corresponding passenger seat is in the second configuration.

In some implementations, each of the at least two passenger seats can be independently movable along the longitudinal axis via one or more tracks defined by a floorboard of the autonomous vehicle. More specifically, the base of each of the at least two passenger seats can be movable along the one or more tracks. In some implementations, a passenger seat in the first row of passenger seats can be offset relative to every other passenger included in the first row of passenger seats. More specifically, the seatback of the passenger seat can be positioned forward by a first offset distance (e.g., at least 6 inches, at least 12 inches, at least 24 inches, etc.) or aft by a second offset distance (e.g., at least 6 inches, at least 12 inches, at least 24 inches, etc.) of the seatback of every other passenger seat in the first row of passenger seats. In this manner, inadvertent contact (e.g., bumping elbows, rubbing shoulders) between a person seated in the passenger seat and a person seated in another passenger seat in the first row of passenger seats that is positioned adjacent (e.g., on either side of) the passenger seat can be avoided.

In some implementations, the autonomous vehicle can include a control system to control movement (e.g., rotation, translation) of the configurable seats within the interior of the autonomous vehicle. For instance, the control system can include one or more computing devices (e.g., processors) configured to provide one or more control signals to one or more actuators configured to move the configurable seats. In some implementations, the control system can include a manual override. For instance, the manual override can include one or more input devices (e.g., buttons, GUI elements on a display device, etc.) that a passenger can interact with to override the control system and thereby allow the passenger to manually control movement of the configurable seats.

According to the present disclosure, an autonomous vehicle can include a door assembly pivotably fixed to a vehicle body of the autonomous vehicle via a linkage assembly. The vehicle body can include a frame of the autonomous vehicle along with one or more body panels coupled to the frame. The linkage assembly can include at least a first linkage arm and a second linkage arm. The first linkage arm can pivotably fix the door assembly to the vehicle body at a first pivot point thereon. The second linkage arm can pivotably fix the door assembly to the vehicle body at a second pivot point thereon. The second pivot point can be spaced apart from the first pivot point along a vertical axis of the vehicle body and a longitudinal axis of the vehicle body. In this manner, movement of the first linkage arm and the second linkage arm causes the door assembly to translate along the longitudinal axis and a lateral axis of the vehicle body. In some implementations, the first pivot point and the second pivot point can be spaced apart from one another along an axis that is parallel to the longitudinal axis.

The first pivot point and the second pivot point can each be inset from a periphery of the vehicle body to reduce a swept path of the door assembly when moving between an open position and a closed position to permit selective access to an interior (e.g., passenger compartment) of the vehicle body. In this manner, the swept path of the door assembly can be reduced so that the door assembly does not protrude onto a sidewalk or adjacent traffic lane when moving between the open position and the closed position. In some implementations, the first pivot point and the second pivot point can be positioned between opposing sides of the vehicle body along a lateral axis thereof.

In some implementations, the first pivot point and the second pivot point can each be positioned outside of the interior (e.g., passenger compartment) of the vehicle body. For instance, the first pivot point can be positioned within a cavity defined by an exterior surface of the vehicle body. In such implementations, a shape of the first linkage arm can correspond to a shape of the cavity defined by the exterior surface of the vehicle body. In this manner, the first linkage arm can be positioned entirely within the cavity when the door assembly is in the closed position. It should be understood that only a portion of the first linkage arm can be positioned within the cavity when the door assembly is in the open position. Alternatively, or additionally, the second pivot point can be positioned within a cavity defined between a running board of the autonomous vehicle and a floorboard of the autonomous vehicle.

In some implementations, the autonomous vehicle can include a double door. In such implementations, the autonomous vehicle can include a second door assembly pivotably fixed to the vehicle body via the linkage assembly. For instance, the linkage assembly can include a third linkage arm and a fourth linkage arm. The third linkage arm can pivotably fix the second door assembly to the vehicle body at a third pivot point thereon. The fourth linkage arm can pivotably fix the second door assembly to the vehicle body at a fourth pivot point thereon. The fourth pivot point can be spaced apart from the first pivot point along a vertical axis of the vehicle body and a longitudinal axis of the vehicle body. In this manner, movement of the third linkage arm and the fourth linkage arm causes the second door assembly to translate along the longitudinal and lateral axes of the vehicle body.

The third pivot point and the fourth pivot point can each be inset from a periphery of the vehicle body to reduce a swept path of the second door assembly when moving between an open position and a closed position to permit selective access to an interior (e.g., passenger compartment) of the vehicle body. In this manner, the swept path of the second door assembly can be reduced so that the second door assembly does not protrude onto a sidewalk or adjacent traffic lane when moving between the open position and the closed position.

According to the present disclosure, an autonomous vehicle can include a vertical support (e.g., support pillar) that can be selectively coupled to a vehicle body of the autonomous vehicle. More specifically, the vertical support can be selectively coupled to the vehicle body based on a position (e.g., open, closed) of at least one door assembly of a double door. When the at least one door assembly of the double door is in the closed position, the vertical support can be coupled to the vehicle body. In some implementations, the vertical support can be coupled to the vehicle body such that the vertical support is positioned at a middle of an opening through which passengers enter and exit the interior (e.g., passenger compartment) of the vehicle body. Conversely, the vertical support can be decoupled from the vehicle body when the at least one door assembly of the double door is in the open position. Furthermore, the vertical support is not positioned at the middle of the opening when the at least one door assembly of the double door is in the open position. In this manner, the vertical support does not obstruct the opening through which passengers enter and exit the interior of the vehicle body.

In some implementations, the vertical support can be integral with a first door assembly of the double door. In such implementations, the vertical support can be coupled to the vehicle body when the first door assembly is in the closed position. For instance, in some implementations, opposing ends of the vertical support can include one or more projections that can engage corresponding openings in the vehicle body when the first door assembly of the double door is in the closed position. Furthermore, the one or more projections can disengage the corresponding openings in the vehicle body immediately prior to the first door assembly of the double door moving from the closed position to the open position. In this manner, the vertical support can be decoupled from the vehicle body and move with the first door assembly such that the vertical support does not obstruct the opening through which passengers enter and exit the interior (e.g., passenger compartment) of the vehicle body when the first door assembly is in the open position.

In some implementations, the vertical support can be integral with each door assembly of the double door. For instance, a first portion of the vertical support can be integral with the first door assembly of the double door, and a second portion of the vertical support can be integral with the second door assembly of the double door. In such implementations, the first portion of the vertical support can be coupled to the vehicle body when the first door assembly is in the closed position. Likewise, the second portion of the vertical support can be coupled to the vehicle body when the second door assembly is in the closed position. In this manner, the vertical support can provide structural support for a roof of the autonomous vehicle when both door assemblies (e.g., first door assembly, second door assembly) of the double door are in the closed position. Furthermore, the first portion of the vertical support can decouple from the vehicle body and move with the first door assembly as the first door assembly moves from the closed position to the open position. Likewise, the second portion of the vertical support can decouple from the vehicle body and move with the second door assembly as the second door assembly moves from the closed position to the open position. In this manner, the first portion of the vertical and the second portion of the vertical support do not obstruct the opening through which passengers enter and exit the interior (e.g., passenger compartment) of the autonomous vehicle when the corresponding door assembly (e.g., first door assembly, second door assembly) is in the open position.

In some implementations, an autonomous vehicle can include a vertical support (e.g., support pillar) that is coupled to a vehicle body of the autonomous vehicle and movable relative to the vehicle body along a longitudinal axis thereof based on a position of a door assembly of a double door. For instance, when the door assembly of the double door moves between an open position and a closed position to permit selective access to an interior (e.g., passenger compartment) of the vehicle body via an opening defined by the vehicle body, the vertical support can move between a first location within the opening and a second location within the opening. The first location can correspond to a middle of the opening, whereas the second location can correspond to an edge of the opening. When the door assembly of the double door is in the closed position, the vertical support can be in the first location (that is, the middle of the opening) to provide structural support for a roof of the autonomous vehicle. Conversely, the vertical support can be in the second location (that is, an edge of the opening) when the door assembly of the double door is in the open position. In this manner, the vertical support does not obstruct the opening passengers use to enter and exit the interior of the autonomous vehicle.

In some implementations, the vehicle body can define a track that the vertical support moves along as the door assembly of the double door moves between the closed position and the open position. In such implementations, the track can allow the vertical support to move within the opening between at least the first location and the second location. In alternative implementations, the vertical support can be coupled to the door assembly of the double door via one or more linkages.

In some implementations, the vertical support can be selectively coupled to the vehicle body based on a position (e.g., open position, closed position) of both door assemblies (e.g., first door assembly and second door assembly) of the double door. In some instances, only one door assembly (e.g., first door assembly or second door assembly) of the double door moves to the open position to allow passengers to enter and exit the interior of the vehicle body. In such instances, the vertical support can remain coupled to the vehicle body. More specifically, the vertical support can remain coupled to the vehicle body such that the vertical support is positioned at the middle of the opening defined by the vehicle body. In instances in which both door assemblies (e.g., first door assembly and second door assembly) of the double door move to the open position to allow passenger to enter and exit the interior of the vehicle body, the first door assembly and the second door assembly can move to the open position in a sequential manner. More specifically, the first door assembly can move to the open position first and then the second door assembly can begin moving to the open position. In such instances, the vertical support can remain coupled to the vehicle body until the second door assembly of the double door begins to move to the open position.

In some implementations, the second door assembly can pull the vertical support along a track when the second door assembly is moving from the closed position to the open position. More specifically, the second door assembly can pull the vertical support along the track such that the vertical support moves from the middle of the opening to an edge of the opening. In this manner, the vertical support can be out of the way of passengers entering or exiting the interior of the vehicle body via the opening when both door assemblies (e.g., first door assembly and second door assembly) of the double door are in the open position.

It should be understood that whether one or both door assemblies of the double door move to the open position to allow passengers to enter and exit the interior of the vehicle body can be determined based, at least in part, on a variety of parameters. For instance, in some implementations, whether one or both of the door assemblies of the double door move to the open position can be determined based on a position of passengers within the interior of the vehicle body. Alternatively, or additionally, weather conditions and/or a seating configuration of the interior of the vehicle body can determine whether one or more both of the door assemblies move to the open position.

An autonomous vehicle in accordance with the present disclosure can provide numerous technical effects and benefits. The technology of the present disclosure can allow an interior of the autonomous vehicle to accommodate a plurality of different seating configurations (e.g., pool configuration, social configuration, meeting configuration, family configuration, etc.). By way of example, as described herein, a passenger seat can include a seatback that rotates about a pivot point on a base to switch the passenger seat between a first configuration in which a seating orientation of the passenger seat faces a forward end of the autonomous vehicle and a second configuration in which the seating faces a rear end of the autonomous vehicle. In this manner, the seatback of the passenger seat can rotate about the pivot point on the base to adjust the seating orientation of the passenger as need to accommodate different seating configurations. For instance, the seatback of the passenger seat can be rotated to adjust the seating orientation thereof to accommodate a seating configuration (e.g., social configuration, meeting configuration, family configuration, and/or other seating configurations) in which a passenger seated in the passenger seat and another passenger seated in a different passenger seat face one another. Conversely, the seatback of the passenger seat can be rotated to adjust the seating orientation thereof to accommodate a seating configuration (e.g., pool configuration) in which a passenger seated in the passenger seat and another passenger seated in a different passenger seat do not face one another.

Moreover, technology of the present disclosure can reduce a swept path of a door assembly moving between an open position and a closed position to selectively allow passengers to enter and exit the interior of a vehicle body of the autonomous vehicle. For example, as described herein, the door assembly can be pivotably fixed to the vehicle body via a linkage assembly. The linkage assembly can include a first linkage arm pivotably fixing the door assembly to the vehicle body at a first pivot point thereon. The linkage assembly can further include a second linkage arm pivotably fixing the door assembly to the vehicle body at a second pivot point thereon. Furthermore, the first pivot point and the second point can be inset from a periphery of the vehicle body. In this manner, the swept path of the door assembly can be reduced such that the door assembly does not protrude onto a sidewalk or adjacent traffic lane when the door assembly is moving between the open position and the closed position.

Ultimately, the technology described herein can improve the ability for an autonomous vehicle to be customized for a variety of purposes. For example, the present technology can allow an autonomous vehicle fleet a plurality of the same base vehicles, each with an interior that can be adjusted (e.g., in real-time) as described herein to improve the ability of the vehicle to perform various services (e.g., human transport, item deliver, courier services, etc.) in accordance with various user preferences.

Referring now to the FIGS., FIG. 1 depicts a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; a human-machine interface 140; a seat control system 142; and a door control system 144.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based, at least in part, on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manual operating mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. A manual operating mode can be one in which a human driver present in the autonomous vehicle manually controls (e.g., acceleration, braking, steering) the vehicle 108 via one or more vehicle control devices (e.g., steering device) of the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing perception data including information associated with one or more respective locations and/or characteristics of one or more objects over a plurality of time intervals and/or determining, based at least in part on the perception data and a machine-learned prediction generator model, one or more predicted trajectories of the one or more objects at one or more subsequent time intervals following the plurality of time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; the human-machine interface 140; the seat control system 142; and the door control system 144. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of a location of the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data, including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can plan vehicle motion that can be used to control the one or more vehicle control systems 138 to operate the vehicle 108 according to the motion plan. The perception system 124, the prediction system, and/or motion planning system 128 (and/or the functions/operations thereof) can share one or more computing resources and/or combined into a system.

The autonomy computing system 120 can identify one or more objects that are proximate to the vehicle 108 based at least in part on the sensor data 116 and/or the map data 122. For example, the perception system 124 can obtain perception data 130 descriptive of a current and/or past state of an object that is proximate to the vehicle 108. The perception data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the perception data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction model. For example, the prediction system 126 can receive perception data 130 (e.g., from the perception system 124) associated with one or more objects within the surrounding environment of the vehicle 108. The prediction system 126 can input the perception data 130 (e.g., BEV image, LIDAR data, etc.) into the machine-learned prediction model to determine trajectories of the one or more objects based on the perception data 130 associated with each object. For example, the machine-learned prediction model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

As discussed above, the machine-learned prediction model can be previously trained via one or more machine-learning techniques. In some implementations, the machine-learned prediction model can be previously trained by one or more devices (e.g., training computing system, operations computing system 104, one or more remote computing devices 106, etc.) remote from the vehicle 108.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. In some implementations, the mobility controller can translate determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touch-screen display device associated with the one or more human-machine interfaces.

In some implementations, the vehicle computing system 112 can perform one or more operations including activating, based at least in part on one or more signals or data (e.g., the sensor data 116, the map data 122, the perception data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

The seat control system 142 can be configured to control operation of one or more configurable seats positioned within the interior of the autonomous vehicle 108. For instance, the seat control system 142 can include one or more actuators (e.g., electric motors) configured to control movement of the one or more configurable seats. As will be discussed below, the seat control system 142 can configure the interior of the autonomous vehicle 108 to accommodate a plurality of different seating configurations.

The door control system 144 can be configured to control operation of one or more door assemblies to permit passengers to enter and exit the interior of the autonomous vehicle 108. For instance, the door control system 144 can include one or more actuators (e.g., electric motors) configured to control movement of the or more door assemblies. More specifically, the one or more actuators can move the one or more door assemblies between an open position in which passengers can enter and exit the interior of the autonomous vehicle 108 and a closed position to permit selective access to the interior of the autonomous vehicle 108. When the one or more door assemblies are in the open position, one or more passengers can enter and exit the interior of the autonomous vehicle 108. Conversely, one or more passengers cannot enter and exit the interior of the autonomous vehicle 108 when the one or more door assemblies are in the closed position.

Figure 3:
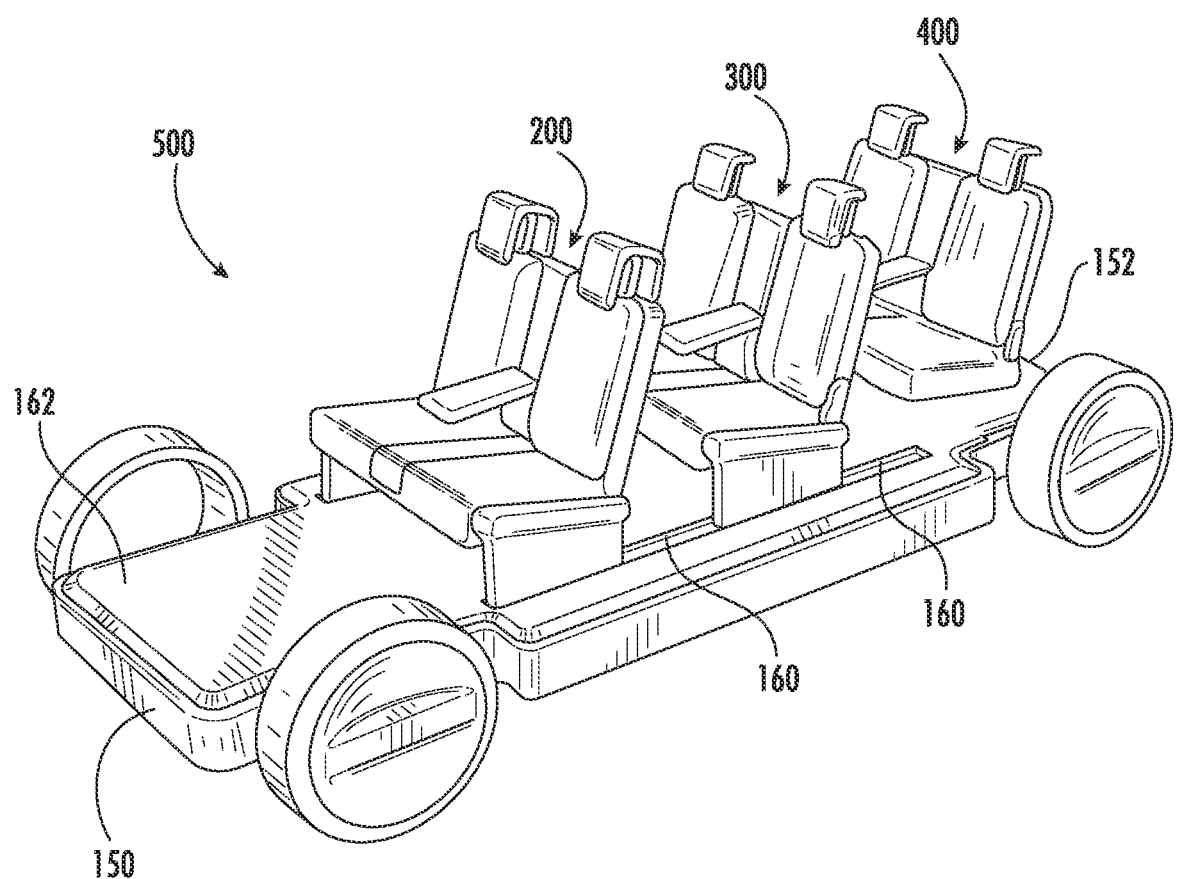
FIG. 3 depicts a perspective view of a passenger compartment of an autonomous vehicle in a first configuration according to example embodiments of the present disclosure.

Referring now to FIGS. 2-12, the autonomous vehicle 108 can define a lateral axis L, a longitudinal axis T, and a vertical axis V. As shown in FIG. 3, the autonomous vehicle 108 can extend between a first end 150 (e.g., forward end) and a second end 152 (e.g., rear end) along the longitudinal direction L. The interior of the autonomous vehicle 108 can accommodate at least a first passenger seat 200 and a second passenger seat 300 that is spaced apart from the first passenger seat 200 along the longitudinal direction L. In some implementations, the autonomous vehicle 108 can include a third passenger seat 400 positioned between the second passenger seat 300 and the second end 152 of the autonomous vehicle 108 along the longitudinal direction T. The first passenger seat 200, the second passenger seat 300, and the third passenger seat 400 can each define a seating orientation, which can define the direction of the seat. As will be discussed below, the passenger seats (e.g., first passenger seat 200, second passenger seat 300, and third passenger seat 400) can be configurable to allow the interior of the autonomous vehicle 108 to accommodate a plurality of different seating configurations (e.g., pool configuration, social configuration, family configuration, meeting configuration, luggage configuration, etc.).

Figure 4:
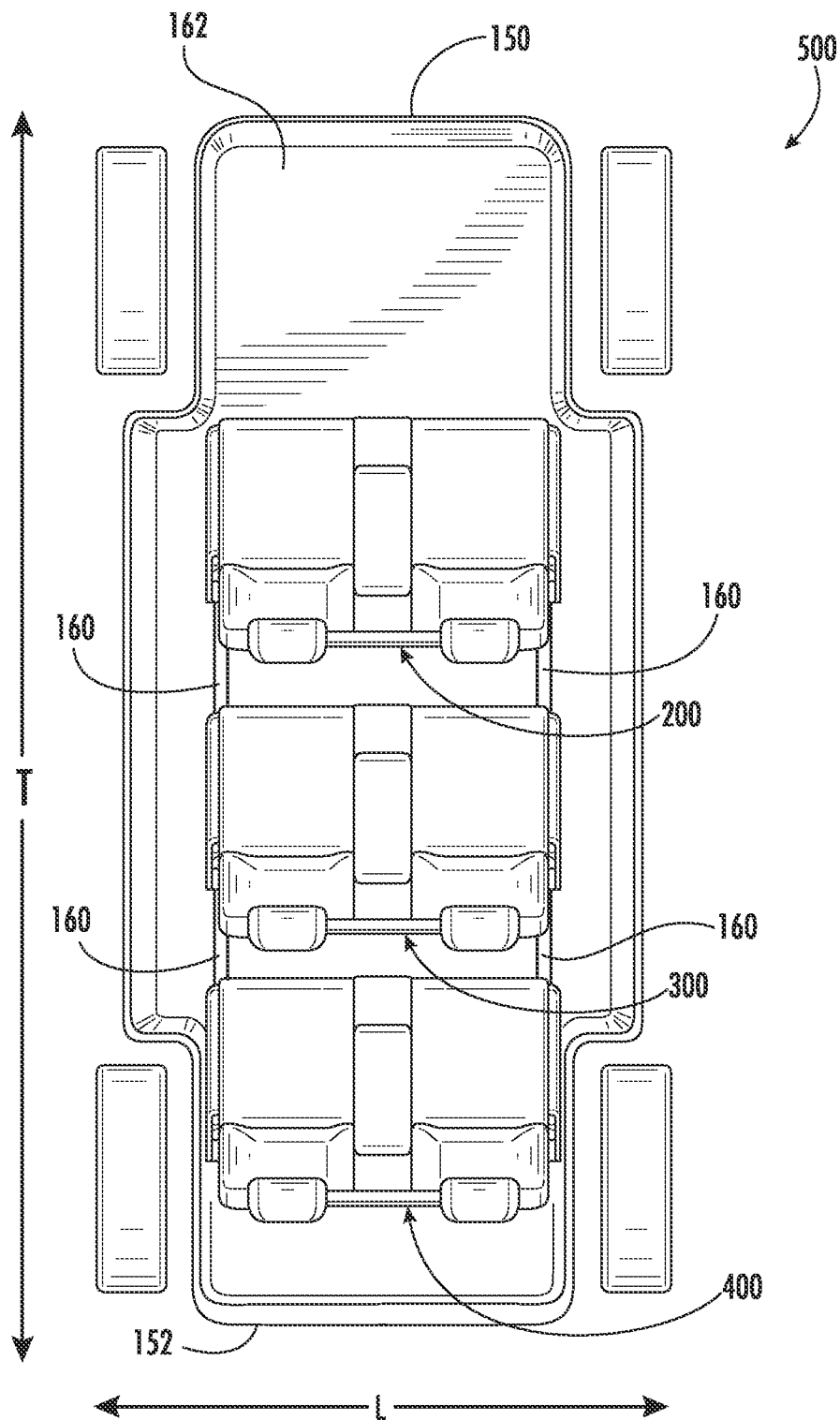
FIG. 4 depicts a top view of the passenger compartment of FIG. 3 according to example embodiments of the present disclosure.

As shown in FIGS. 3 and 4, the passenger seats can be configurable to allow the interior of the autonomous vehicle 108 to accommodate a first seating configuration 500 (e.g., pooling configuration) in which passengers seated in the passenger seats do not face one another. For instance, the passenger seats can be configured such that the seating orientation of the first passenger seat 200, the seating orientation of the second passenger seat 300, and the seating orientation of the third passenger seat 400 are each directed towards the same end (e.g., first end 150) of the autonomous vehicle 108. In this manner, a passenger seated in the first passenger seat 200, a passenger seated in the second passenger seat 300, and a passenger seated in the third passenger seat 400 do not face one another.

Figure 5:
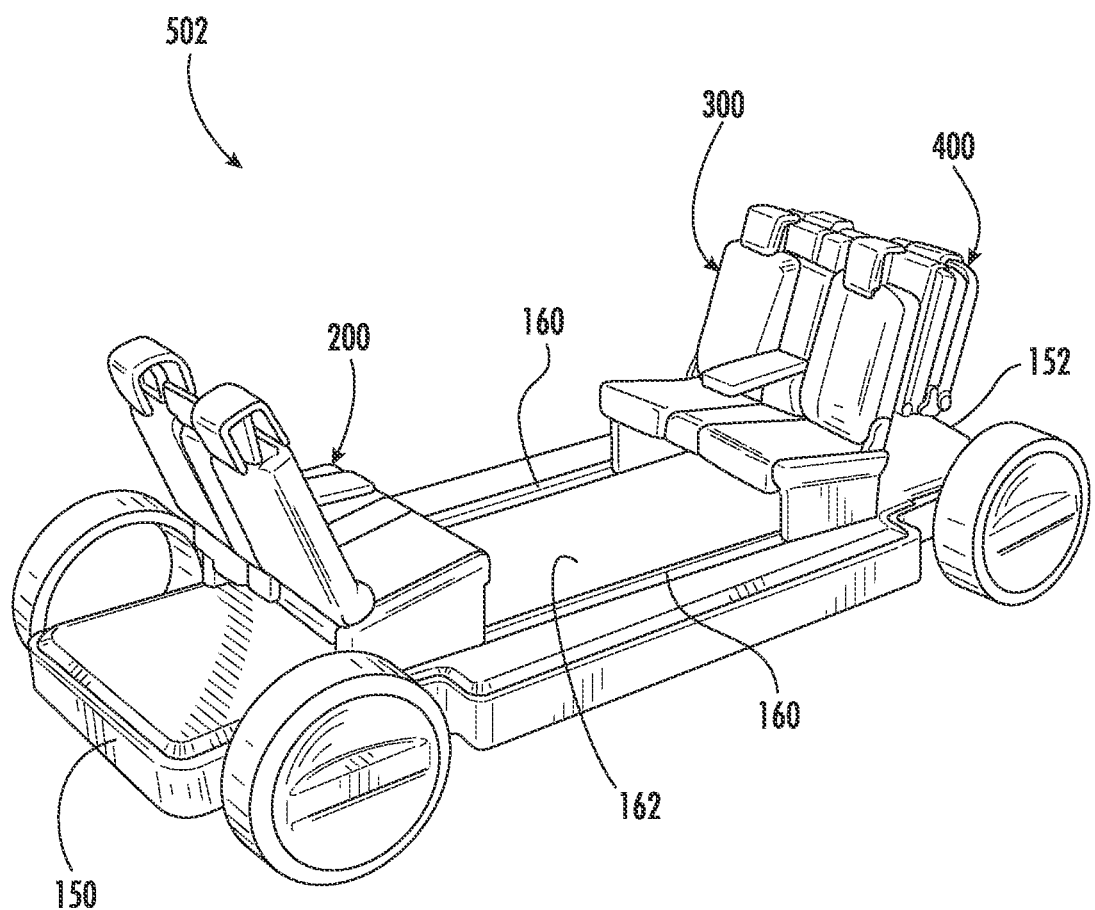
FIG. 5 depicts a perspective view of a passenger compartment of an autonomous vehicle in a second configuration according to example embodiments of the present disclosure.
Figure 6:
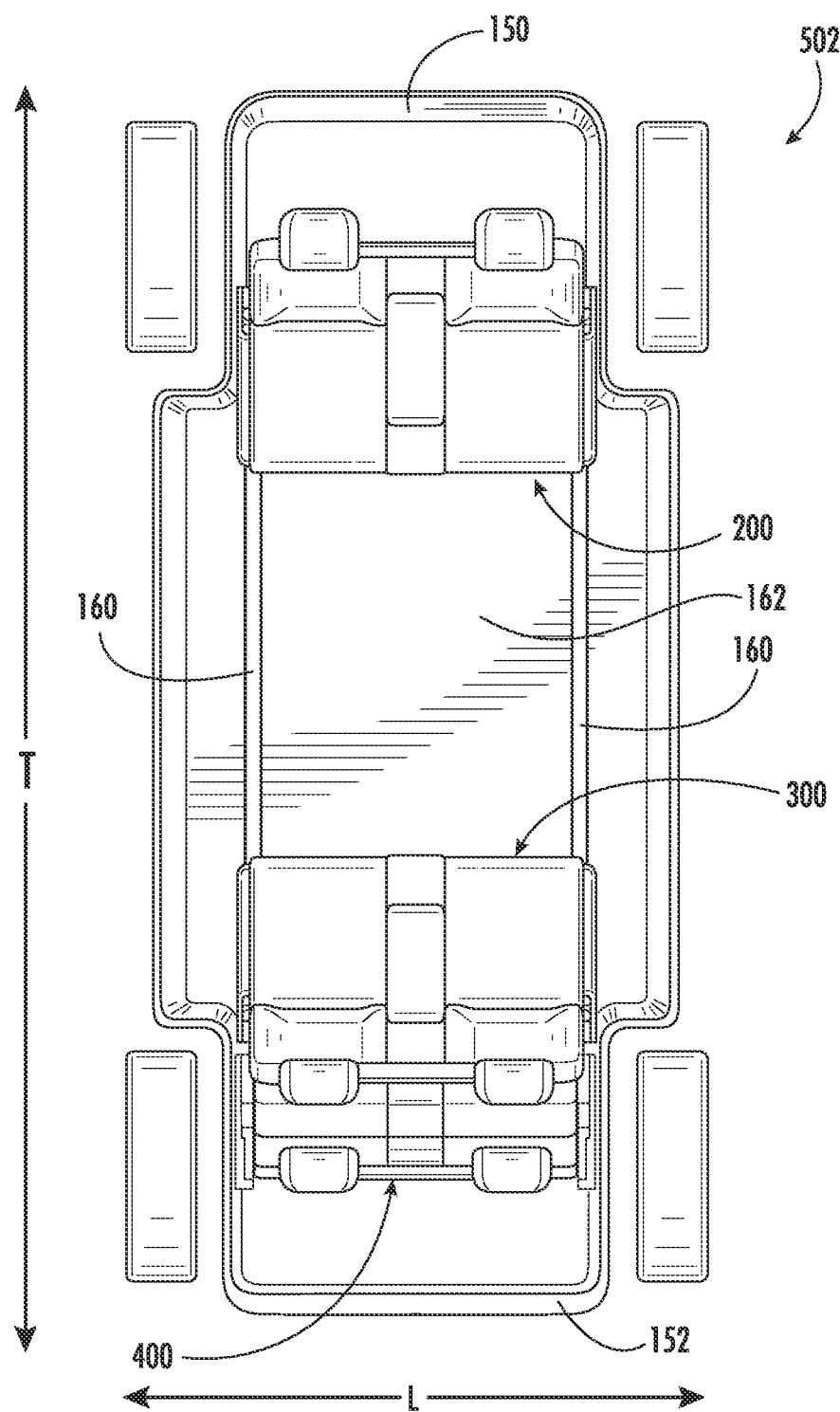
FIG. 6 depicts a top view of the passenger compartment of FIG. 5 according to example embodiments of the present disclosure.

Conversely, as shown in FIGS. 5 and 6, the passenger seats can be configurable to allow the interior of the autonomous vehicle 108 to accommodate a second seating configuration 502 (e.g., social configuration) in which a passenger seated in the first passenger seat 200 and a passenger seated in the second passenger seat 300 face one another. For instance, the seating orientation of the first passenger seat 200 and the seating orientation of the second passenger seat 300 can face different ends (e.g., first end 150, second end 152) of the autonomous vehicle 108 when the interior of the autonomous vehicle is configured according to the second seat configuration 502.

In some implementations, the first passenger seat 200 and the second passenger seat 300 can be movable along one or more tracks 160 defined, at least in part, by a floorboard 162 of the autonomous vehicle 108. For instance, the second passenger seat 300 can move along the one or more tracks 160 to adjust (e.g., increase, decrease) a distance between the first passenger seat 200 and the second passenger seat 300 along the longitudinal direction T. In such implementations, the seat bottom of the third passenger seat 400 can fold up to accommodate movement of the second passenger seat 300 along the one or more tracks 160 as needed to increase the distance between the first passenger seat 200 and the second passenger seat 300 along the longitudinal direction T. For instance, in some implementations, the second passenger seat 300 can move along the one or more tracks 160 such that the seatback of the second passenger seat 300 contacts (e.g., touches) the seat bottom of the third passenger seat 400. In alternative implementations, the seatback of the second passenger seat 300 can be spaced apart from the seat bottom of the third passenger seat 400. The first passenger seat 200 and the second passenger seat 300 can be moved along the tracks 160 by a motor, servo, and/or other mechanism with the ability to provide a force sufficient to physically move the passenger seats (e.g., first passenger seat 200 and second passenger seat 300) along the tracks 160. The motor, etc. can be communicatively connected to the seat control system 142 which can provide command signals for operation of the motor, etc.

Figure 7:
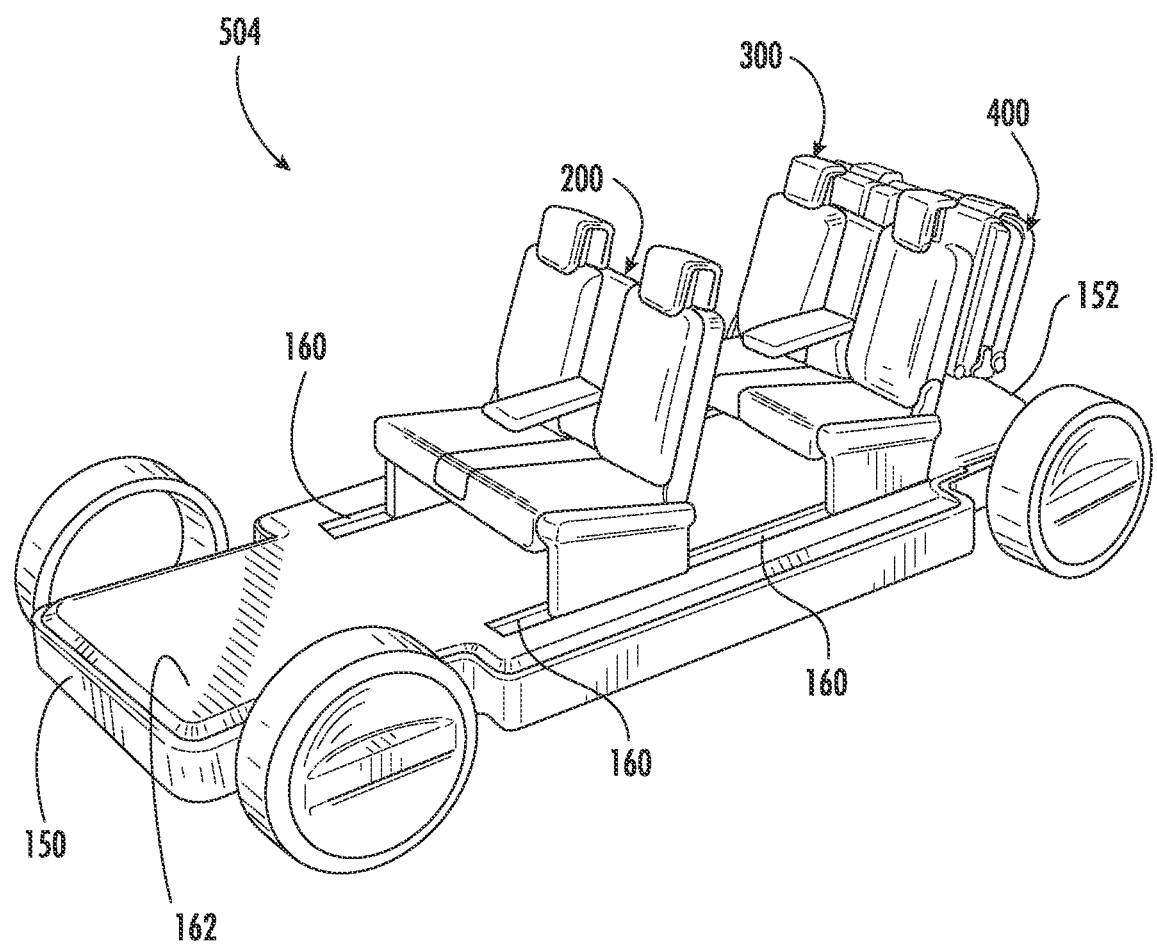
FIG. 7 depicts a perspective view of a passenger compartment of an autonomous vehicle in a third configuration according to example embodiments of the present disclosure.
Figure 8:
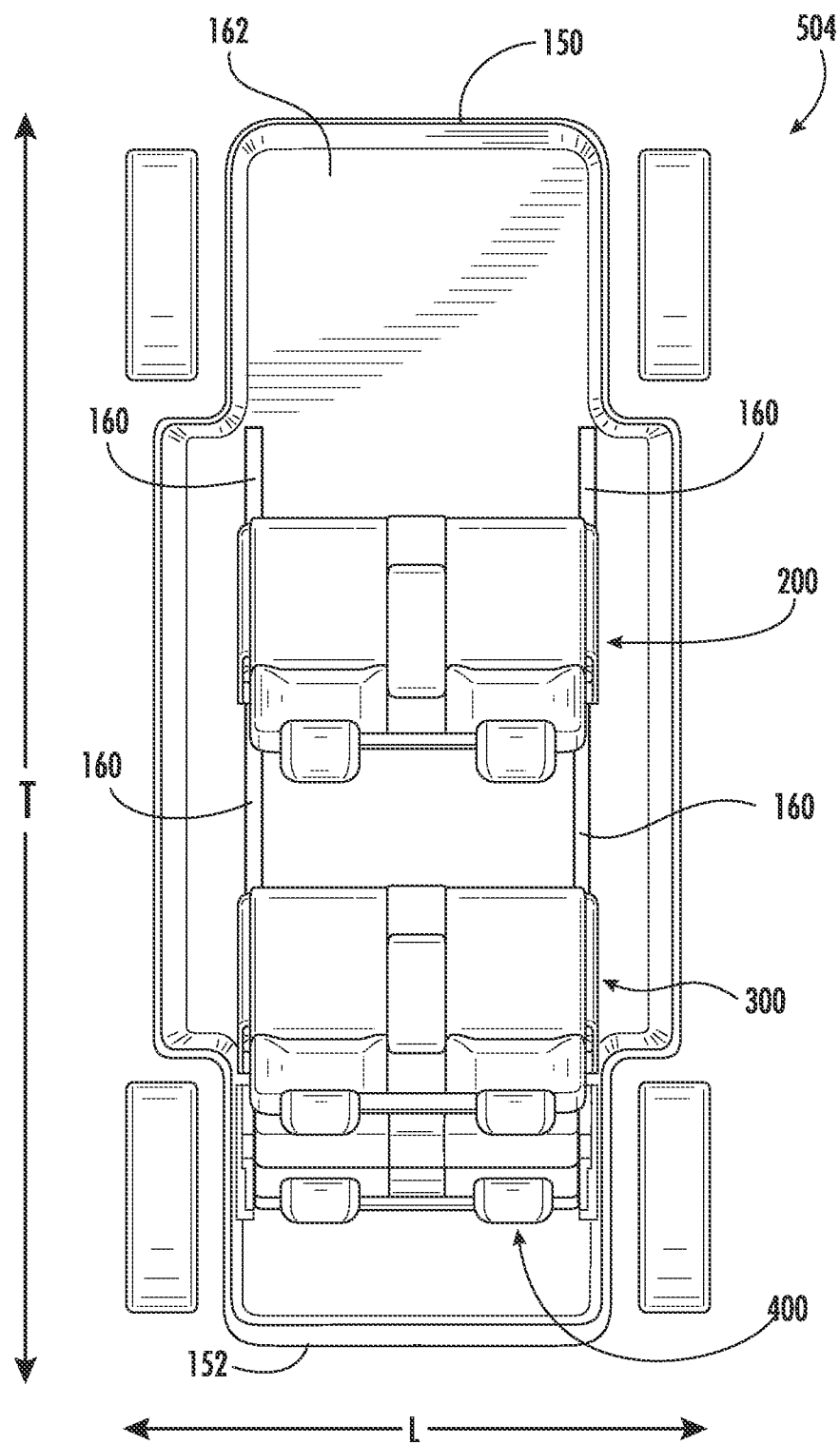
FIG. 8 depicts a top view of the passenger compartment of FIG. 7 according to example embodiments of the present disclosure.

As shown in FIGS. 7 and 8, the passenger seats can be configurable to allow the interior of the autonomous vehicle 108 to accommodate a third seating configuration 504 (e.g., family configuration) in which a passenger seated in the first passenger seat 200 and a passenger seated in the second passenger seat 300 do not face one another. For instance, the seating orientation of the first passenger seat 200 and the seating orientation of the second passenger seat 300 can each be directed to the same end (e.g., first end 150) of the autonomous vehicle. In this manner, a passenger seated in the first passenger seat 200 and a passenger seated in the second passenger seat 300 do not face one another.

Furthermore, the seat bottom of the third passenger seat 400 can be folded up to accommodate movement of the second passenger seat 300 along the one or more tracks 160 as needed to increase spacing between the first passenger seat 200 and the second passenger seat 300 along the longitudinal direction T. In this manner, the second passenger seat 300 can be spaced apart from the first passenger seat 200 along the longitudinal direction T as needed to provide sufficient leg room for the passenger seated in the second passenger seat 300.

The seat control system 142 (shown in FIG. 1) can be in communication with one or more actuators (e.g., electric motors) configured to control movement of the seat bottom of the third passenger seat 400. Furthermore, the third passenger seat 400 can include one or more locking mechanisms (e.g., ratchet and ball, screw, magnet, latch, etc.) configured to retain the seat bottom of the third passenger seat 400 in place when the one or more actuators cease (e.g., stop) moving the seat bottom. In this manner, the one or more locking mechanisms can prevent passengers from manually moving (e.g., unfolding) the seat bottom of the third passenger seat 400. Likewise, when the seat back of the third passenger seat 400 is folded down to accommodate a passenger, the one or more locking mechanisms can prevent passengers from manually moving (e.g., folding) the seat bottom of the third passenger seat 400.

Figure 9:
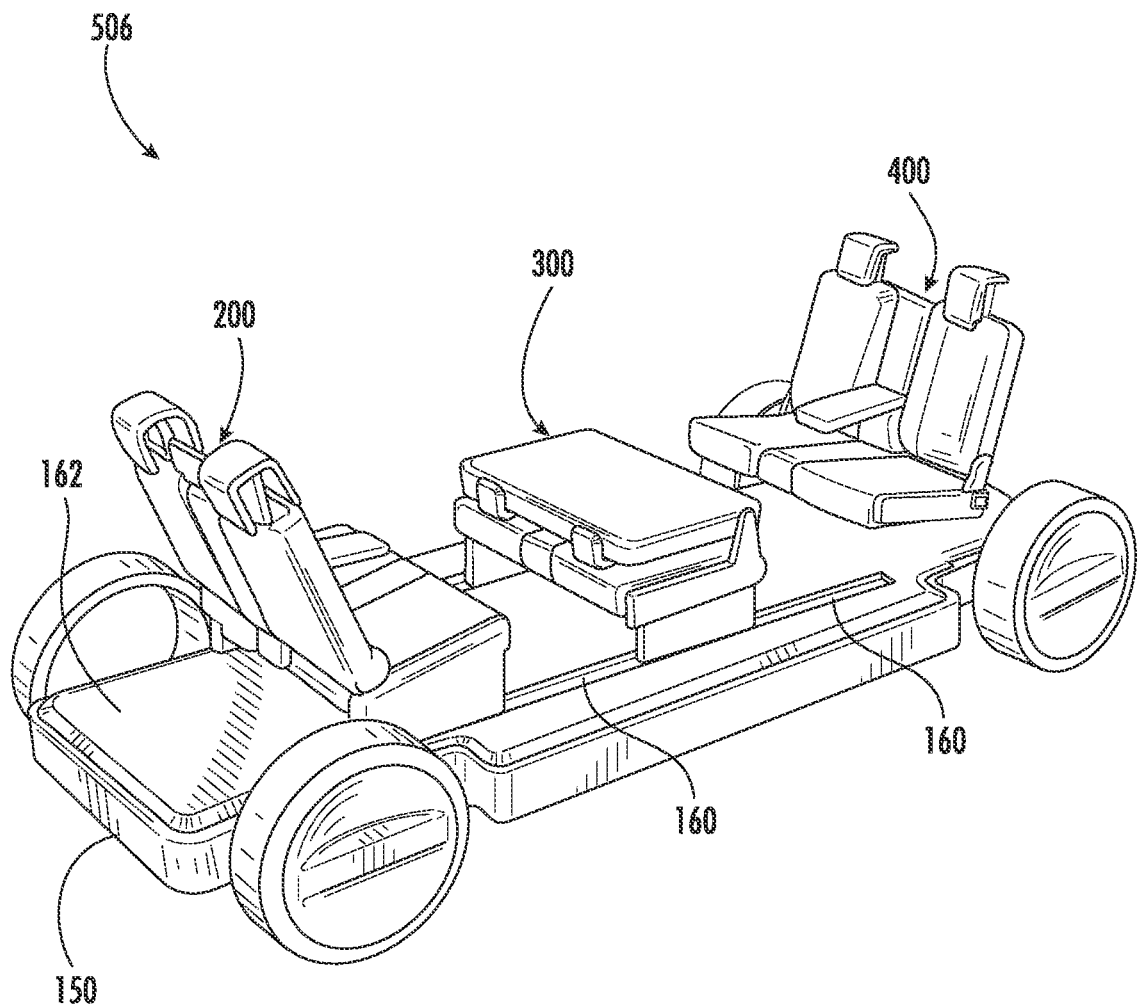
FIG. 9 depicts a perspective view of a passenger compartment of an autonomous vehicle in a fourth configuration according to example embodiments of the present disclosure.
Figure 10:
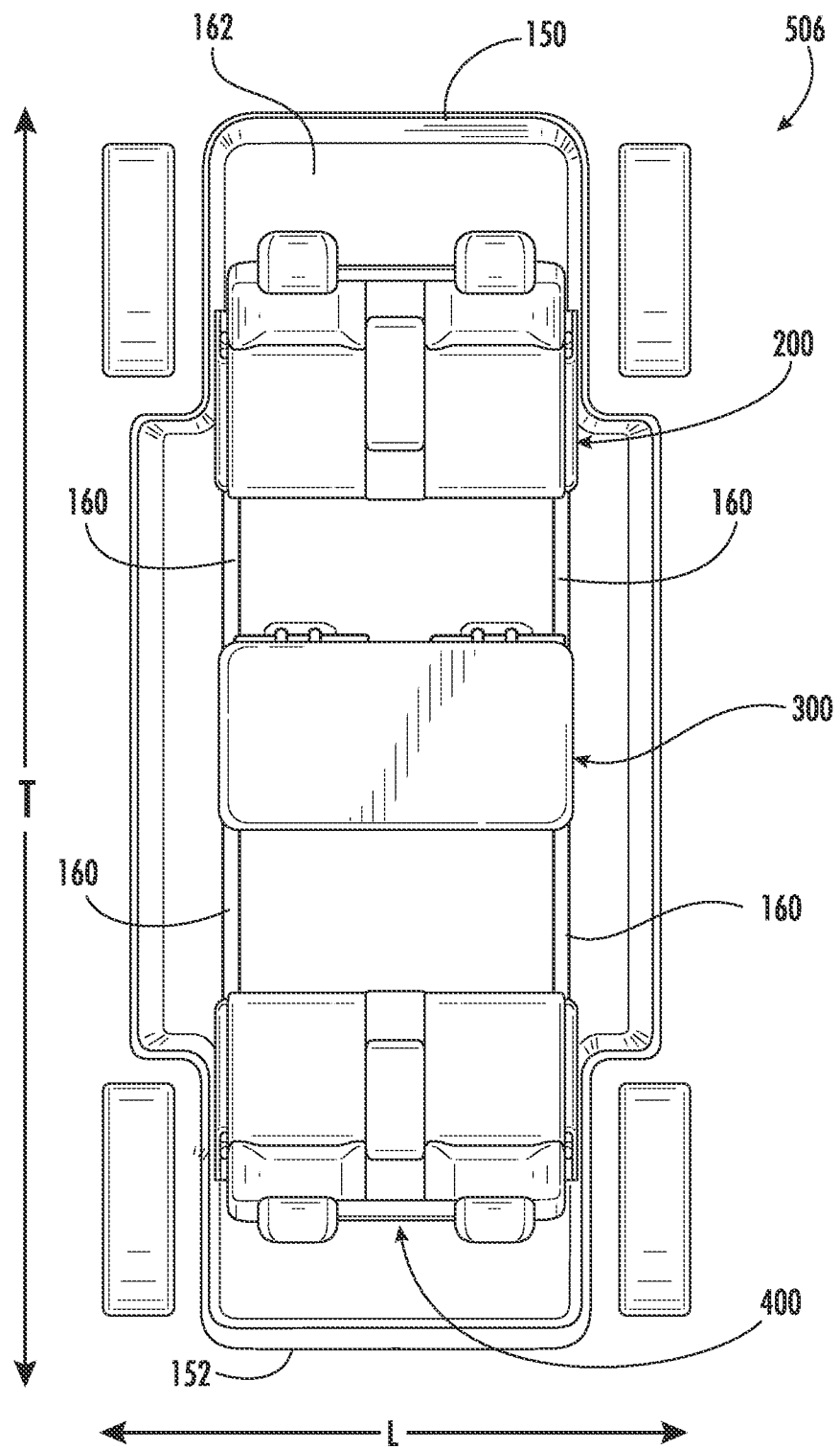
FIG. 10 depicts a top view of the passenger compartment of FIG. 9 according to example embodiments of the present disclosure.

As shown in FIGS. 9 and 10, the passenger seats can be configurable to allow the interior of the autonomous vehicle 108 to accommodate a fourth seating configuration 506 (e.g., meeting configuration) in which a passenger seated in the first passenger seat 200 and a passenger seated in the third passenger seat 400 face one another. For instance, the seating orientation of the first passenger seat 200 and the seating orientation of the third passenger seat 400 can face different ends (e.g., first end 150, second end 152) of the autonomous vehicle 108. Furthermore, the second passenger seat 300 can be configured as a table positioned between the first passenger seat 200 and the third passenger seat 400 along the longitudinal direction T. More specifically, the seatback of the second passenger seat 300 can be folded down onto the seat bottom of the second passenger seat 300 to form a table on which passengers seated in the first passenger seat 200 or the third passenger seat 400 can set items (e.g., laptop, coffee mugs, etc.).

In such implementations, the seat control system 142 can be in communication with one or more actuators (e.g., electric motors) configured to move the seatback of the second passenger seat 300 as needed to fold the seatback down onto the seat bottom of the second passenger seat 300 to form the table. Furthermore, in some implementations, the second passenger seat 300 one or more locking mechanisms (e.g., latch, magnet, etc.) configured to prevent movement of the seatback of the second passenger seat 300 when the seatback of the second passenger seat 300 is folded down onto the seat bottom of the second passenger seat 300 to form the table. In this manner, the one or more locking mechanisms can prevent passengers from manually moving (e.g., unfolding) the seatback of the second passenger seat 300 to reconfigure the second passenger seat 300 as a passenger seat. Likewise, when the second passenger seat 300 is configured as a passenger seat, the one or more locking mechanisms can prevent passengers from manually moving (e.g., folding) the seatback of the second passenger seat 300 to reconfigure the second passenger seat 300 as the table.

Figure 11:
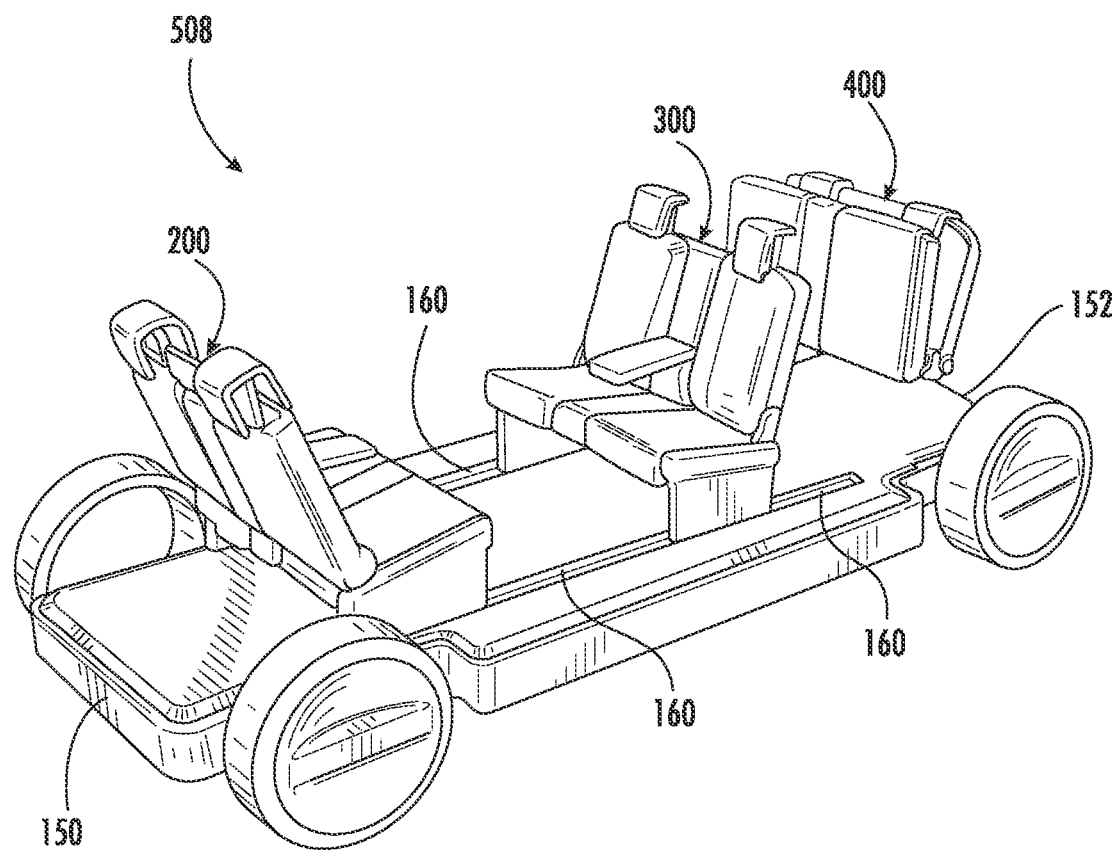
FIG. 11 depicts a perspective view of a passenger compartment of an autonomous vehicle in a fifth configuration according to example embodiments of the present disclosure.
Figure 12:
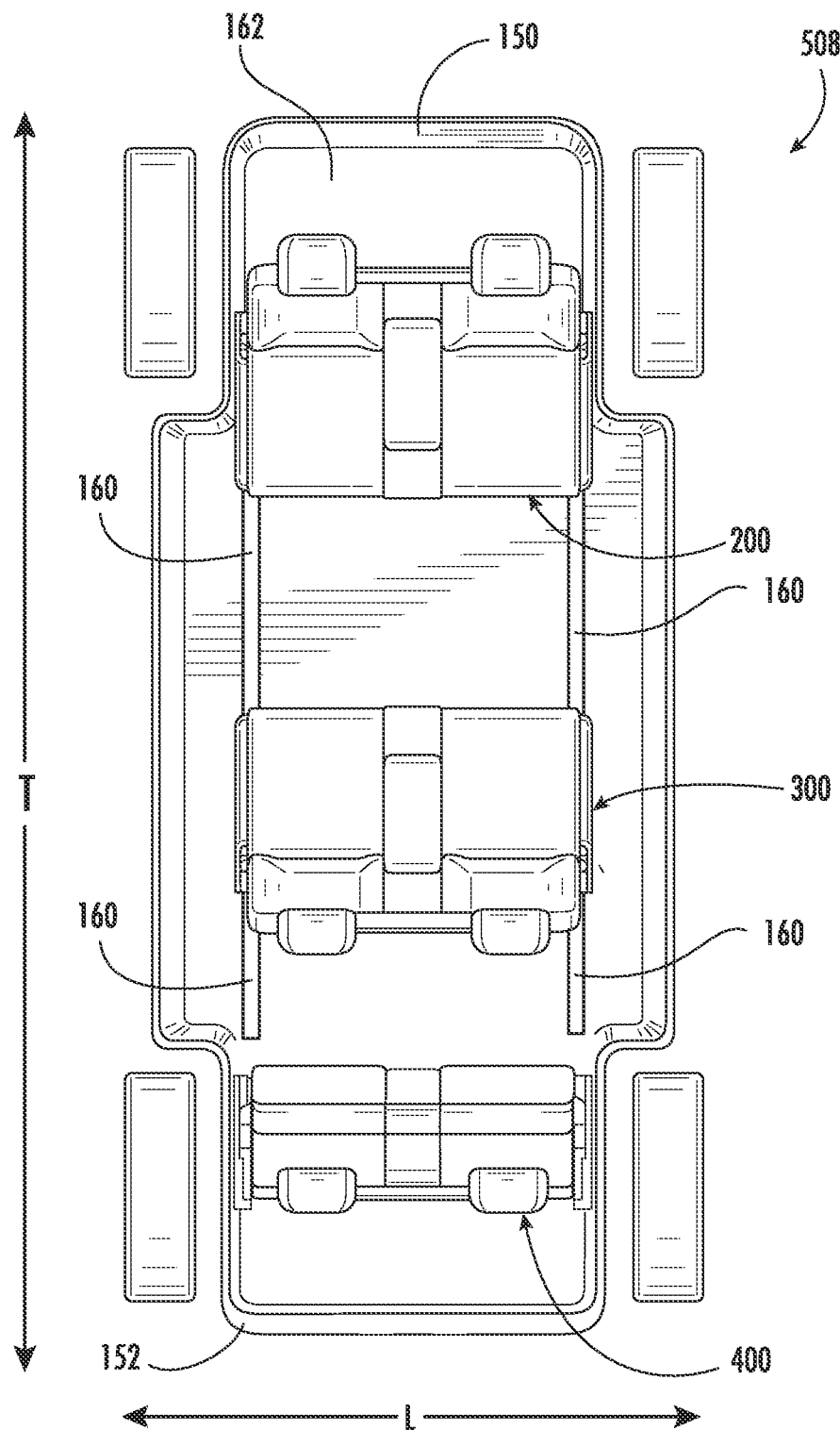
FIG. 12 depicts a top view of the passenger compartment of FIG. 11 according to example embodiments of the present disclosure.

As shown in FIGS. 11 and 12, the passenger seats can be configurable to allow the interior of the autonomous vehicle 108 to accommodate a fifth seating configuration 508 (e.g. luggage configuration) in which a passenger seated in the first passenger seat 200 and a passenger seated in the second passenger seat 300 face one another. For instance, the seating orientation of the first passenger seat 200 and the seating orientation of the second passenger seat 300 can face different ends (e.g., first end 150, second end 152) of the autonomous vehicle 108. Furthermore, the seat bottom of the third passenger seat 400 can be folded up towards the seatback of the third passenger seat 400. Still further, the second passenger seat 300 and the third passenger seat 400 can be spaced apart from one another along the longitudinal direction T to accommodate luggage (e.g., suitcase) associated with passengers. In this manner, the luggage can be stowed in the space defined between the second passenger seat 300 and the third passenger seat 400 along the longitudinal direction T. More specifically, the space can be defined between the seatback of the second passenger seat 300 and the seat bottom of the third passenger seat 400.

Figure 13:
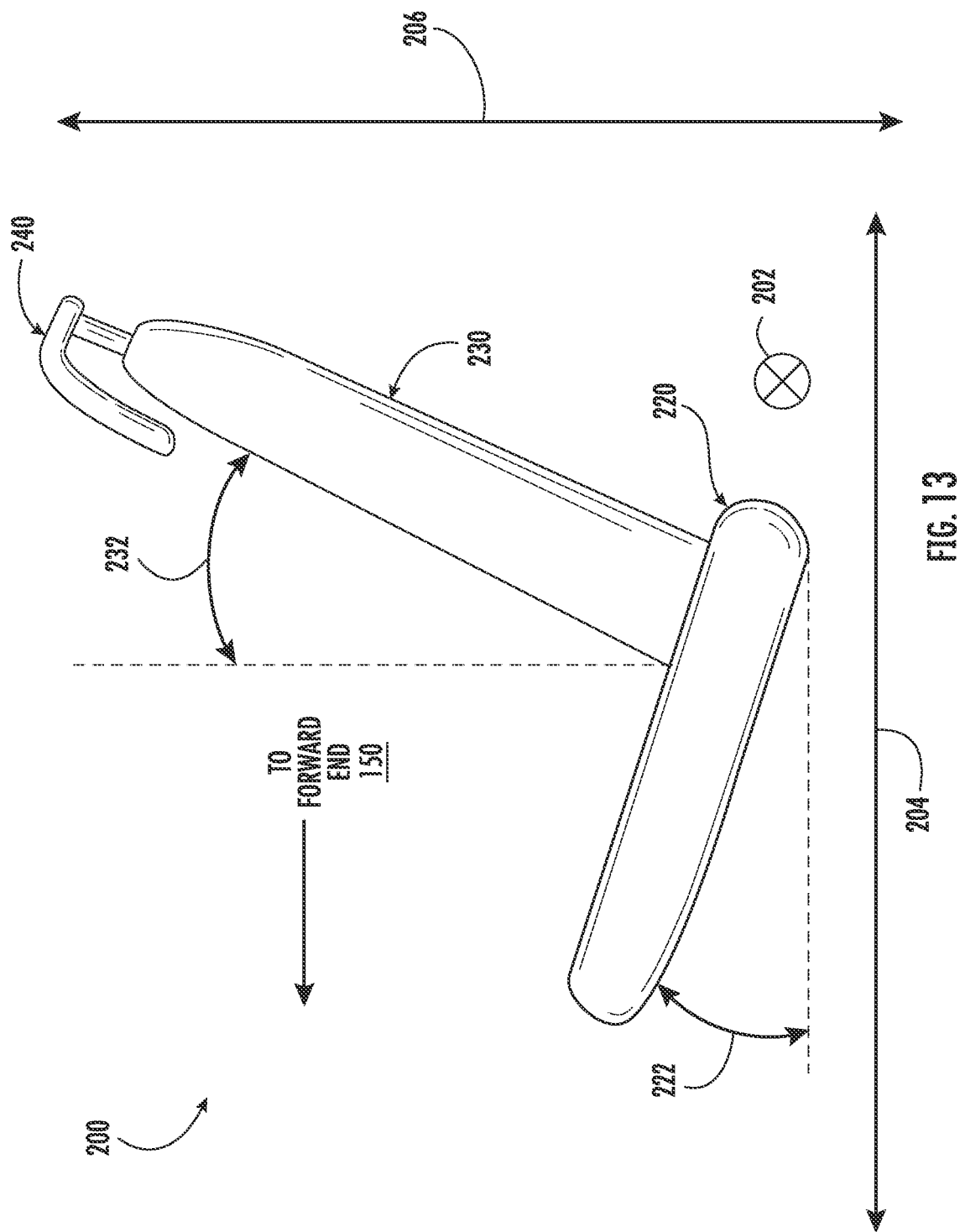
FIG. 13 depicts a first passenger seat of an autonomous vehicle in a first configuration according to example embodiments of the present disclosure.
Figure 14:
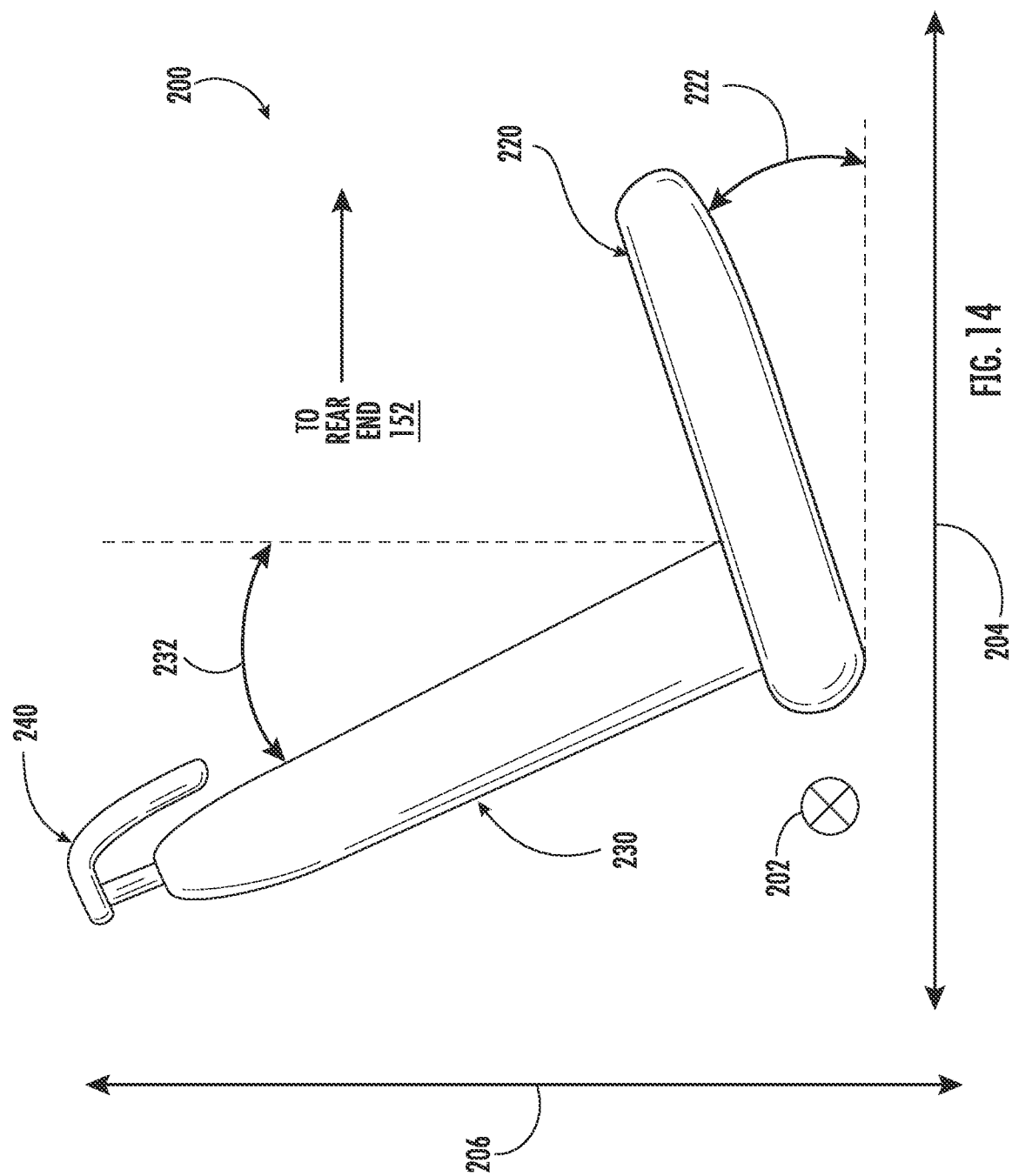
FIG. 14 depicts a first passenger seat of an autonomous vehicle in a second configuration according to example embodiments of the present disclosure.

Referring now to FIGS. 13 and 14, the first passenger seat 200 can define a coordinate system that includes a first axis 202 that is parallel to the lateral axis L (shown in FIG. 2) of the autonomous vehicle 108, a second axis 204 that is parallel to the longitudinal axis T (shown in FIG. 2) of the autonomous vehicle 108, and a third axis 206 that is parallel to the vertical axis V (shown in FIG. 2) of the autonomous vehicle 108. The first passenger seat 200 can be configurable in a first configuration (FIG. 13) in which the seating orientation of the first passenger seat 200 is directed towards the first end 150 (shown in FIG. 2) of the autonomous vehicle 108 and a second configuration (FIG. 14) in which the seating orientation of the first passenger seat 200 is directed towards the second end 152 (shown in FIG. 2) of the autonomous vehicle 108.

The first passenger seat 200 can include a seat bottom 220. The seat bottom 220 can be rotatable about the first axis 202 to adjust a tilt angle 222 of the seat bottom 220. More specifically, the seat bottom 220 can rotate about the first axis 202 such that the seat bottom 220 is tilted up relative to the second axis 204 or titled down relative to the second axis 204. It should be understood that the tilt angle is defined between the seat bottom 220 and the second axis 204. In some implementations, a first tilt angle of the seat bottom 220 when the first passenger seat 200 is in the first configuration (FIG. 13) can be substantially the same (e.g., within a 10% margin) as a second tilt angle of the seat bottom 220 when the first passenger seat 200 is in the second configuration (FIG. 13).

The first passenger seat 200 can include a seatback 230. The seatback 230 can be rotatable about a pivot point to adjust a reclination angle 232 of the seatback 230. It should be understood that the reclination angle 232 is defined between the seatback 230 and the third axis 206 of the first passenger seat 200 when the seatback 230 is titled forward in a first direction (e.g., forward) or a second direction (e.g., rearward) relative to the third axis 206. In some implementations, a first reclination angle of the seatback 230 when the first passenger seat 200 is in the first configuration (FIG. 13) can be substantially the same as a second reclination angle of the seatback 230 when the first passenger seat 200 is in the second configuration. Alternatively, or additionally, a first relative angle between the seatback 230 and the seat bottom 220 when the first passenger seat 200 is in the first configuration (FIG. 13) can be substantially the same as a second relative angle between the seatback 230 and the seat bottom 220 when the first passenger seat 200 is in the second configuration (FIG. 14).

In some implementations, the first passenger seat 200 can include a headrest 240. Furthermore, in some implementations, the headrest 240 can be movable along the third axis 206. In this manner, the headrest 240 can move along the third axis 206 to accommodate the head of a passenger seated in the first passenger seat 200. In such implementations, the seat control system 142 can be in communication with one or more actuators (e.g., electric motors) configured to move the headrest 240 along the third axis 206. Furthermore, in some implementations, the first passenger seat 200 can include one or more locking mechanisms (e.g., latch, magnet, etc.) configured to prevent one or more passengers from manually moving the headrest 240. More specifically, the one or more locking mechanisms can be configured to retain the headrest 240 in whatever position the headrest 240 is in when the one or more actuators cease moving the headrest 240 along the third axis 206.

Referring now to FIGS. 15 and 16A-16C, the first passenger seat 200 can include a base 250 to which the seatback 230 is pivotably coupled (e.g., via a pin, rod, etc.). In this manner, the seatback 230 can rotate about a pivot point 252 on the base 250 to switch the first passenger seat 200 between the first configuration (shown in FIG. 16A) and the second configuration (shown in FIG. 16C). For instance, the seatback 230 can rotate about the pivot point 252 in a clockwise direction to switch the first passenger seat 200 from the first configuration to the second configuration. Conversely, the seatback 230 can rotate about the pivot point 252 in a counterclockwise direction to switch the first passenger seat 200 from the second configuration to the first configuration.

Figure 15:
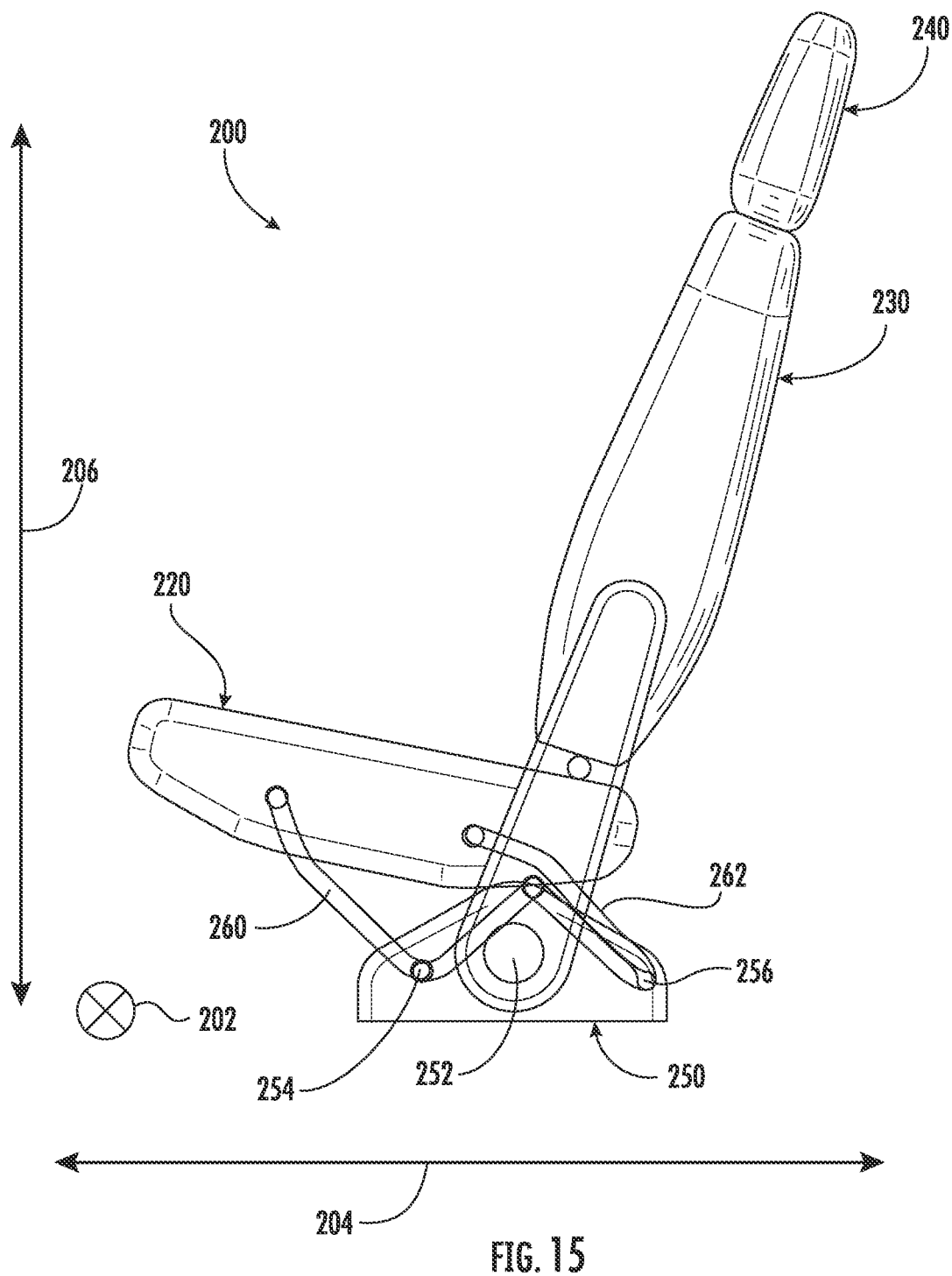
FIG. 15 depicts an embodiment of the first passenger seat according to the present disclosure.
Figure 17:
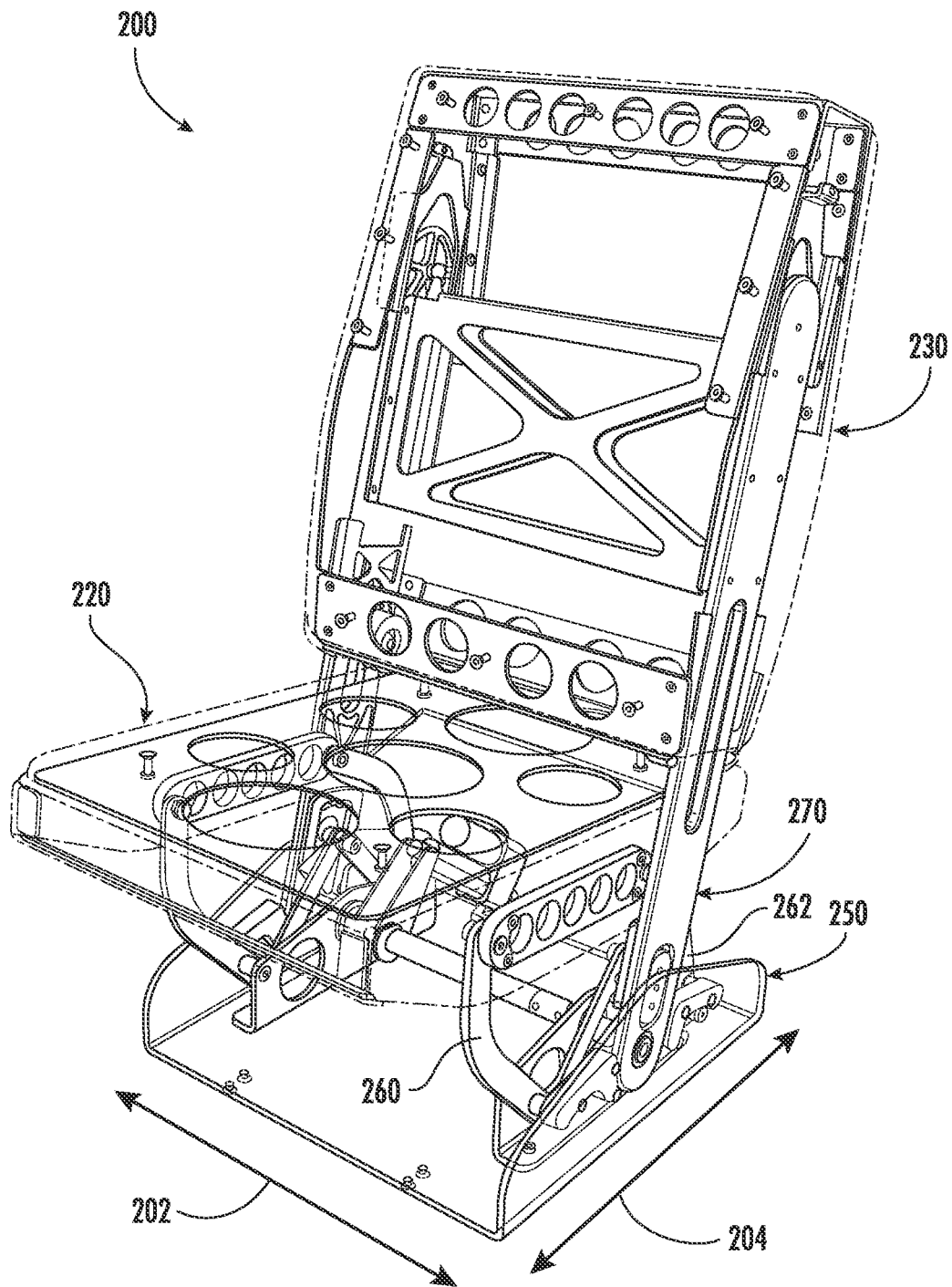
FIG. 17 depicts another embodiment of the first passenger seat according to the present disclosure.
Figure 18:
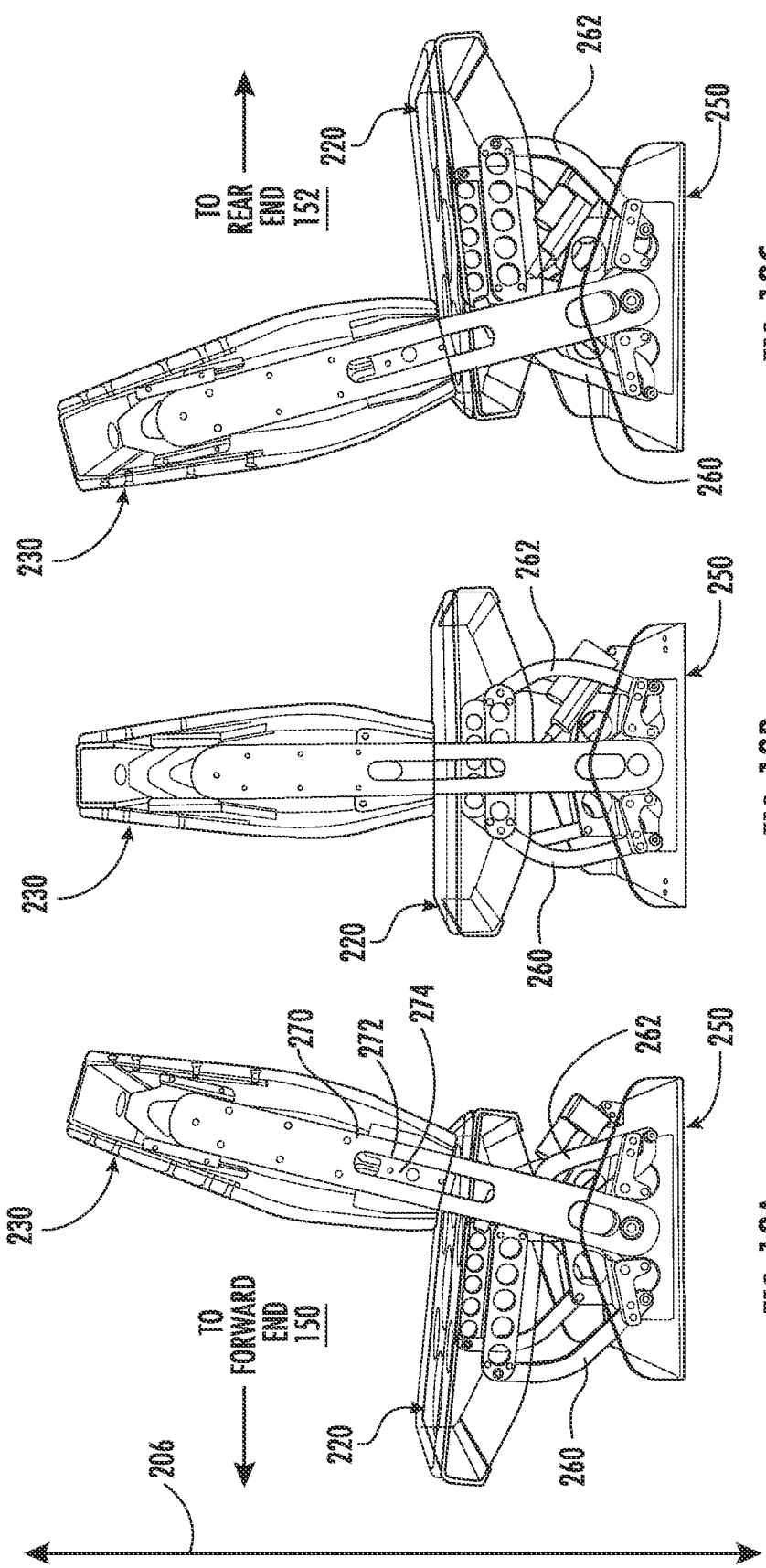
FIG. 18A depicts the first passenger seat of FIG. 17 in the first configuration according to example embodiments of the present disclosure.
FIG. 18B depicts the first passenger seat of FIG. 17 in an intermediate third configuration according to example embodiments of the present disclosure.
FIG. 18C depicts the first passenger seat of FIG. 17 in the second configuration according to example embodiments of the present disclosure.
Figure 19:
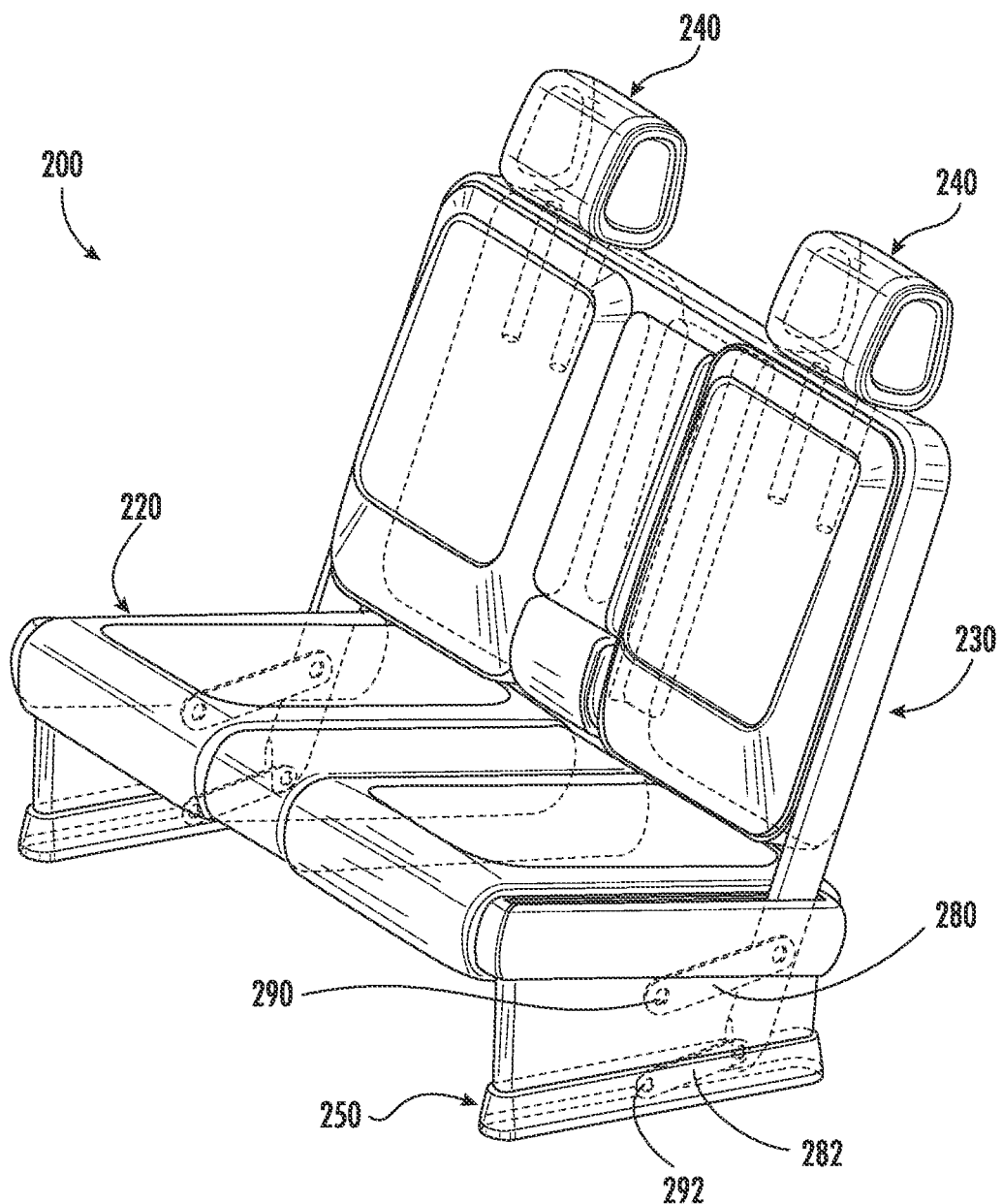
FIG. 19 depicts yet another embodiment of the first passenger seat according to the present disclosure.
Figure 20:
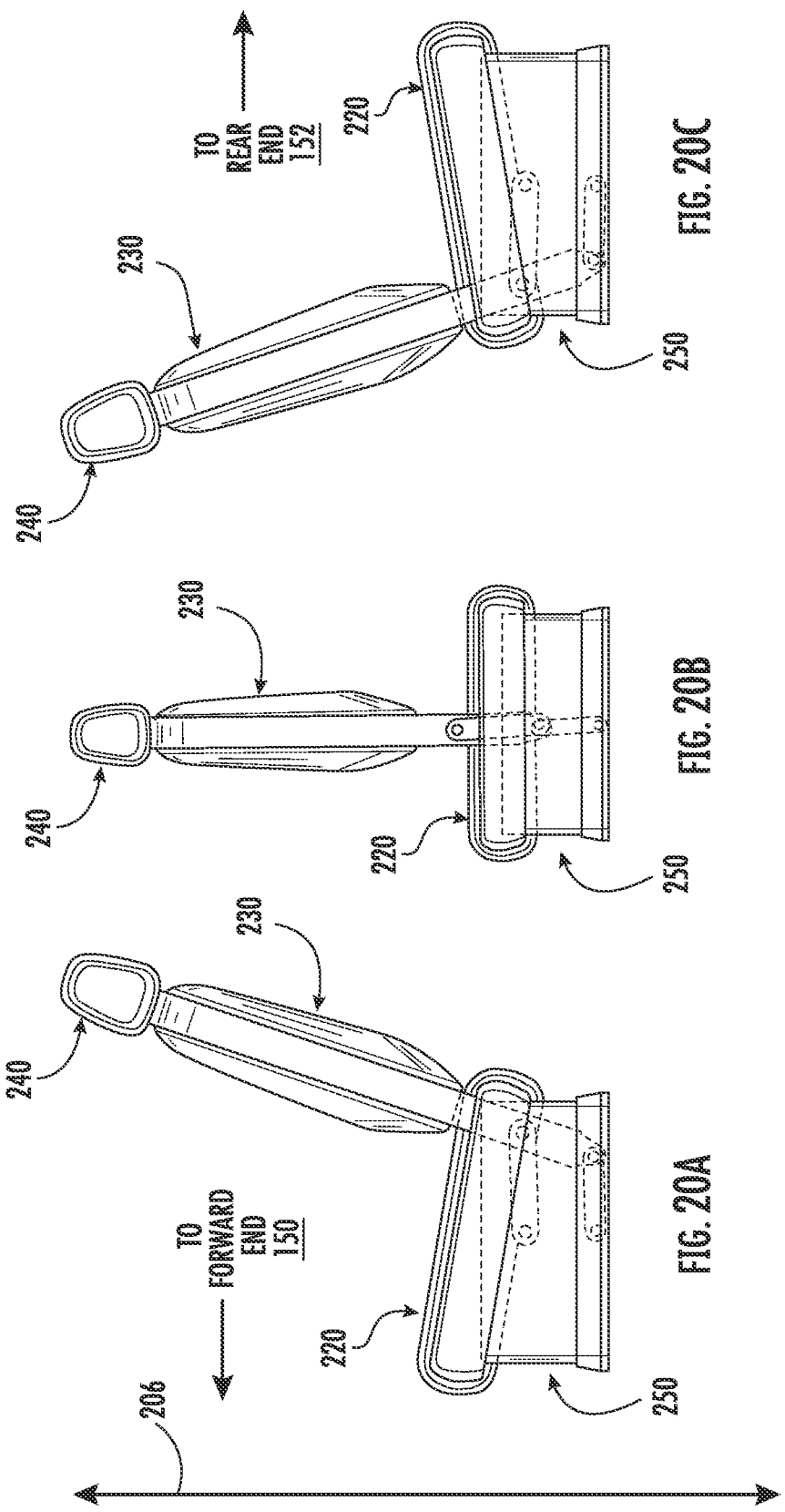
FIG. 20A depicts the first passenger seat of FIG. 19 in the first configuration according to example embodiments of the present disclosure.
FIG. 20B depicts the first passenger seat of FIG. 19 in an intermediate third configuration according to example embodiments of the present disclosure.
FIG. 20C depicts the first passenger seat of FIG. 19 in the second configuration according to example embodiments of the present disclosure.

In some implementations, the seat bottom 220 can be pivotably coupled to the base 250 of the first passenger seat 200 via one or more linkage arms ("seat linkage arm"). For instance, the seat bottom 220 can be pivotably coupled to the base 250 via a first linkage arm 260 and a second linkage arm 262 (as shown in FIG. 15). The first linkage arm 260 can be pivotably coupled to the base 250 at a first pivot point 254 thereon. The second linkage arm 262 can be pivotably coupled to the base 250 at a second pivot point 256 thereon.

As shown, movement of the first linkage arm 260 and the second linkage arm 262 about the first pivot point 254 and the second pivot point 256, respectively, can cause the seat bottom 220 to move (e.g., translate) along the second axis 204 of the first passenger seat 200. For instance, movement of the first linkage arm 260 and the second linkage arm 262 can cause the seat bottom 220 to initially rotate about the first axis 202 of the first passenger seat 200. More specifically, movement of the first linkage arm 260 and the second linkage arm 262 can initially cause the seat bottom 220 to rotate about the first axis 202 until the tilt angle of seat bottom is 0 degrees (e.g., horizontal). The seat bottom 220 can then translate along the second axis 204 until continued movement (e.g., rotation) of the first linkage arm 260 and the second linkage arm 262 again causes the seat bottom 220 to rotate about the first axis 202. More specifically, the continued movement of the first linkage arm 260 and the second linkage arm 262 can cause the seat bottom 220 to rotate such that the seat bottom 220 is no longer horizontal (that is, the tilt angle is not 0 degrees). It should be understood that the seat bottom 220 can be configured to rotate about the first axis 202 when the seatback 230 is, as discussed above, rotating about the pivot point 252 on the base 250 to switch the first passenger seat 200 between the first configuration (FIG. 16A) and the second configuration (FIG. 16C).

The seatback 230 of the first passenger seat 200 and the seat bottom 220 of the first passenger seat 200 can rotate in opposing directions to switch the first passenger seat 200 between the first configuration and the second configuration. For instance, the seat bottom can rotate about the first axis 202 in the counterclockwise direction when the seatback 230 is rotating about the pivot point 242 in the clockwise direction to switch the first passenger seat 200 from the first configuration (shown in FIG. 16A) to the second configuration (shown in FIG. 16C). Conversely, the seat bottom 220 can rotate about the first axis 202 in the clockwise direction when the seatback 230 is rotating about the pivot point 252 in the counterclockwise direction to switch the first passenger seat 200 from the second configuration to the first configuration.

Referring briefly now to FIGS. 17 and 18A-18C, another embodiment of the first passenger seat 200 is provided according to example embodiments of the present disclosure. As shown, the seatback 230 of the first passenger seat 200 can be pivotably coupled to the base 250 via a linkage arm 270. More specifically, the seatback 230 of the first passenger seat 200 can be coupled to the linkage arm 270 via a bracket 274. As shown, the bracket 274 can be positioned within a channel 272 defined by the linkage arm 270. The bracket 274 can move within the channel 272 along the third axis 206 of the first passenger seat 200 to facilitate movement of the seatback 230 along the third axis 206. In this manner, the seatback 230 can translate along the third axis 206 (e.g., move vertically within the vehicle interior cabin) to accommodate rotation of the seat bottom 220 about the first axis 202. For instance, the seatback 230 can be configured to move (e.g., translate) away from the seat bottom 220 along the third axis 206. In this manner, the seat bottom 220 of the first passenger seat 200 can rotate about the first axis 202 without contacting (e.g., touching) the seatback 230 of the first passenger seat 200.

Referring now to FIGS. 19 and 20A-20C, yet another embodiment of the first passenger seat 200 is provided according to example embodiments of the present disclosure. As shown, the seatback 230 can be pivotably coupled to the base 250 via a first linkage arm 280 and a second linkage arm 282. The first linkage arm 280 can be pivotably coupled to the base 250 at a first pivot point 290. The second linkage arm 282 can be pivotably coupled to the base 250 at a second pivot point 292 that is different than the first pivot point 290. More specifically, the second pivot point 292 can be spaced apart from the first pivot point 290 along the third axis 206. As shown, in some implementations, the first linkage arm 280 and the second linkage arm 282 can be disposed within a portion of the base 250 having a shape corresponding to a parallelogram. It should be understood, however, that the one or more linkage arms can be disposed at any suitable location on the base 250. Alternatively, or additionally, the seatback 230 can be spaced apart from the seat bottom 220 as show in FIG. 20B when the seatback 230 is rotating about the first pivot point 290 and the second pivot point 292 to switch the first passenger seat 200 from the first configuration (shown in FIG. 20A) to the second configuration (shown in FIG. 20C) or vice versa. In such implementations, the seatback 230 can accommodate rotation of the seat bottom 220 about the first axis 202 of the first passenger seat 200.

As shown, the seat bottom 220 can be pivotably coupled to the base 250. In this manner, the seat bottom 220 can rotate about the first axis 202 when the seatback 230 is rotating about the first pivot point 290 on the base 250 and the second pivot point 292 on the base 250. In this manner, the seat bottom 220 can rotate about the first axis 202 to adjust the tilt angle of the seat bottom 220. In some implementations, a first tilt angle of the seat bottom 220 when the first passenger seat 200 is in the first configuration (shown in FIG. 20A) can be substantially the same (e.g., less than a 15 degree difference, less than a 10 degree difference, less than a 5 degree difference, less than a 1 degree difference, etc.) as a second tilt angle of the seat bottom 220 when the first passenger seat 200 is in the second configuration (shown in FIG. 20C).

Figure 21:
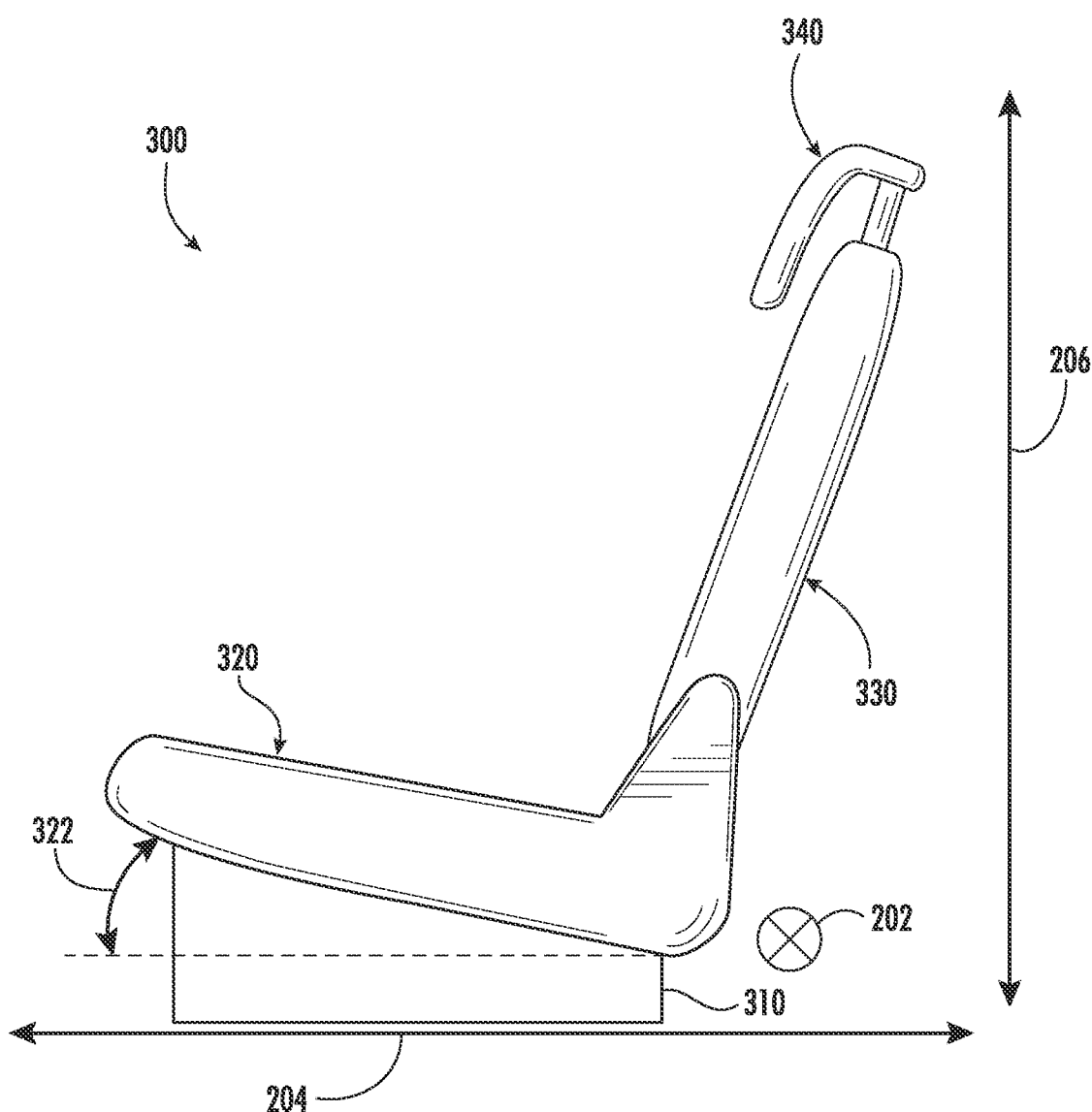
FIG. 21 depicts a seatback of a second passenger seat of an autonomous vehicle in a deployed position according to example embodiments of the present disclosure.
Figure 22:
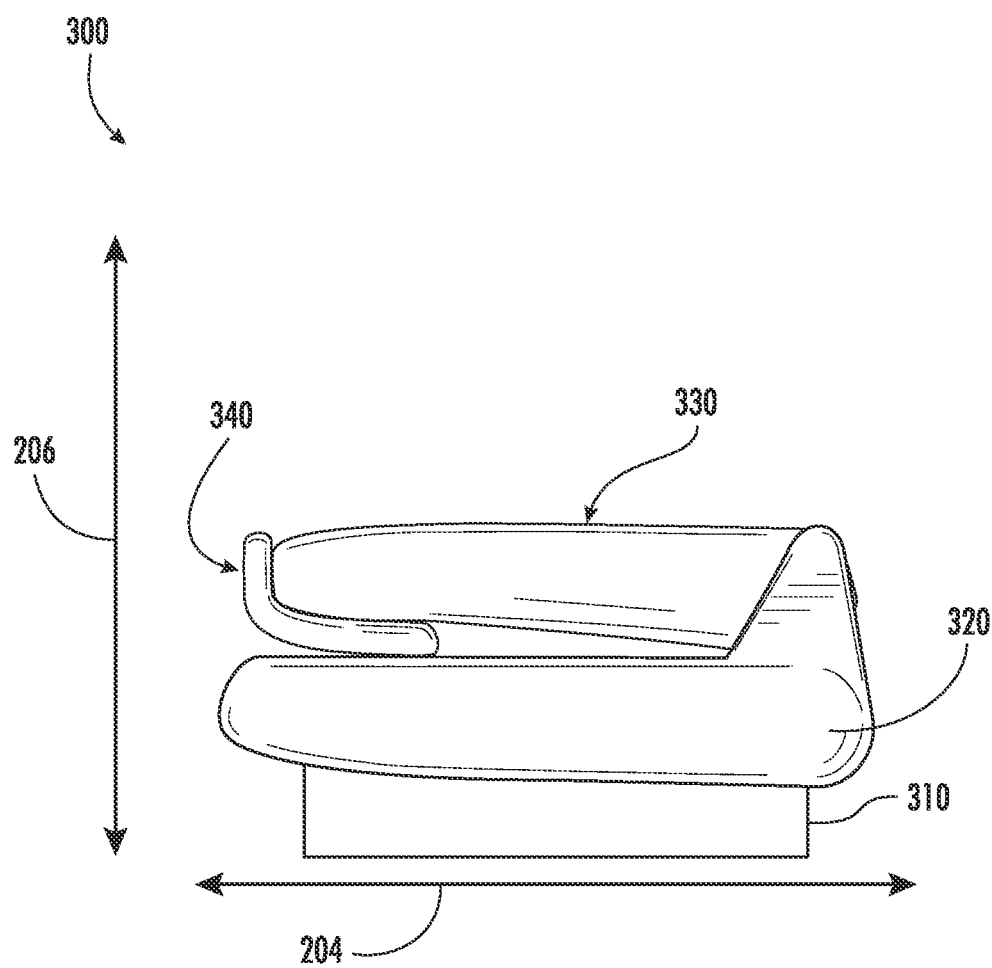
FIG. 22 depicts a seatback of a second passenger seat of an autonomous vehicle in a stowed position according to example embodiments of the present disclosure.

Referring now to FIGS. 21 and 22, an embodiment of the second passenger seat 300 is provided according to the present disclosure. The second passenger seat 300 can define a coordinate system that includes the first axis 202, the second axis 204, and the third axis 206. As shown, the second passenger seat 300 can include a base 310 and a seat bottom 320 pivotably coupled to the base 310. In this manner, the seat bottom 320 can rotate about the first axis 202 to adjust the tilt angle of the seat bottom 320.

As shown, the second passenger seat 300 can include a seatback 330. The seatback 330 can be pivotably coupled to the seat bottom 320 (e.g., via pin, rod, etc.). In this manner, the seatback 330 of the second passenger seat 300 can rotate about a pivot point on the seat bottom 320 of the second passenger seat 300 to move (e.g., rotate) between a deployed position (shown in FIG. 21) and a stowed position (shown in FIG. 22). When the seatback 330 of the second passenger seat 300 is in the deployed position, the seatback 330 of the second passenger seat 300 can be substantially perpendicular (e.g., less than a 15 degree, less than a 10 degree, less than a 5 degree, less than a 1 degree, etc. difference from 90 degrees) to the seat bottom 320 of the second passenger seat 300. In this manner, the second passenger seat 300 can accommodate a passenger when the seatback 330 of the second passenger seat 300 is in the deployed position. Conversely, the seatback 330 of the second passenger seat 300 can be substantially parallel (e.g., less than a 15 degree difference, less than a 10 degree difference, less than a 5 degree difference, less than a 1 degree difference, etc.) to the seat bottom 320 of the second passenger seat 300 when the seatback 330 of the second passenger seat 300 is in the stowed position.

In some implementations, the seat bottom 320 of the second passenger seat 300 can be configured to rotate about the first axis 202 when the seatback 330 of the second passenger seat 300 is, as discussed above, rotating about the pivot point on the seat bottom 320 of the second passenger seat 300 to move between the deployed position and the stowed position. In some implementations, a tilt angle 322 of the seat bottom 320 of the second passenger seat 300 can be less than about 5 degrees when the seatback 330 is in the stowed position. In this manner, the seatback 330 of the second passenger seat 300 can fold down onto the seat bottom 320 of the second passenger seat 300 such that the seatback 330 of the second passenger seat 300 can be used as table.

In some implementations, the second passenger seat 300 can include a headrest 340 movable between an extended position (FIG. 21) and a retracted position (FIG. 22). When the seatback 330 of the second passenger seat 300 is in the deployed position, the headrest 340 can be in the extended position to provide support for the head of a person seated in the second passenger seat 300. Conversely, the headrest 340 can be in the retracted position when the seatback 330 of the second passenger seat 300 is in the stowed position. In some implementations, the headrest 340 can move from the extended position to the retracted position (e.g., in the seatback) when the seatback 330 of the second passenger seat 300 is moving (e.g., rotating) from the deployed position to the stowed position.

In some implementations, a position (e.g., extended position or retracted position) of the headrest 340 when the seatback 330 of the second passenger seat 300 is in the deployed position can be based on whether a person is seated in the second passenger seat 300. For instance, the seat control system 142 (shown in FIG. 1) can be in communication with one or more sensors (e.g., load cell) configured to determine whether a person is seated in the second passenger seat 300. As will be discussed below in more detail, the seat control system 142 can control movement of the headrest 340 based, at least in part, on whether a person is seated in the second passenger seat 300.

When data obtained from the one or more sensors indicates a person is seated in the second passenger seat 300, the seat control system 142 can provide one or more control signals to one or more actuators (e.g., electric motors) configured to control movement of the headrest 340. More specifically, the one or more control signals can be associated with moving the headrest 340 into the extended position (FIG. 21). In this manner, the headrest 340 can support the head of the person seated in the second passenger seat.

Conversely, the seat control system 142 can provide one or more control signals to the one or more actuators (e.g., electric motors) when the data obtained from the one or more sensors (e.g., load cell) indicate a person is not seated in the second passenger seat 300. More specifically, the one or more control signals can be associated with moving the headrest 340 into the retracted position (FIG. 22). In this manner, the headrest 340 can be retracted to avoid obstructing the view of passengers seated in the first passenger seat 200 (shown in FIG. 11) or the third passenger seat 400 (shown in FIG. 3). More specifically, the headrest 340 can be retracted to avoid obstructing the passengers view out one or more windows of the autonomous vehicle 108 (shown in FIG. 2).

Figure 23:
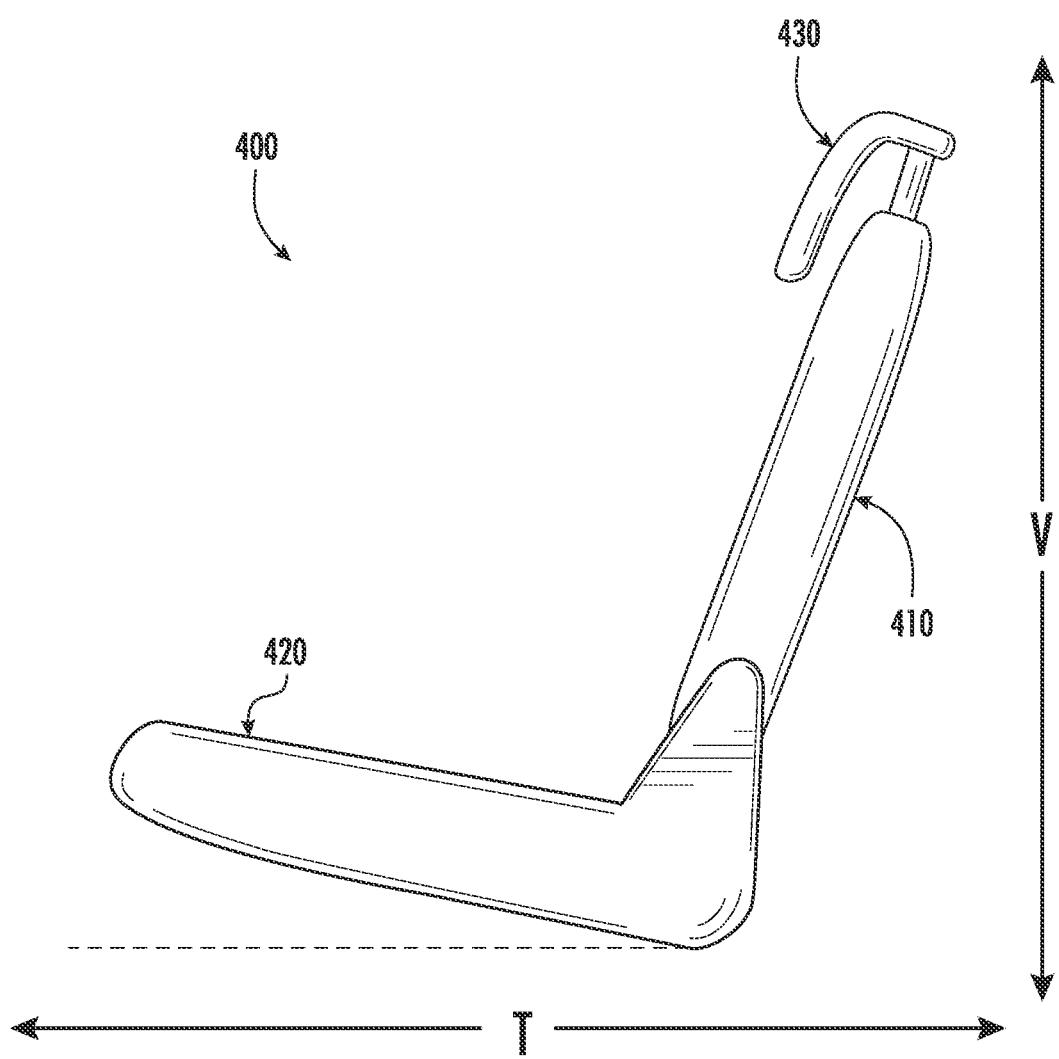
FIG. 23 depicts a seat bottom of a third passenger seat of an autonomous vehicle in a deployed position according to example embodiments of the present disclosure.
Figure 24:
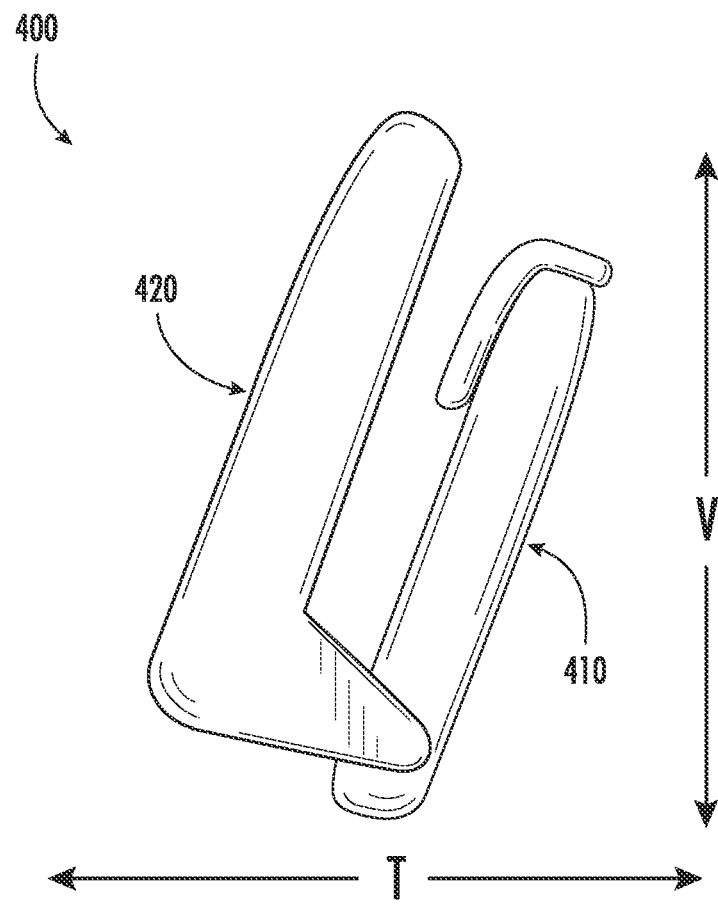
FIG. 24 depicts a seat bottom of a third passenger seat of an autonomous vehicle in a stowed position according to example embodiments of the present disclosure.
Figure 25:
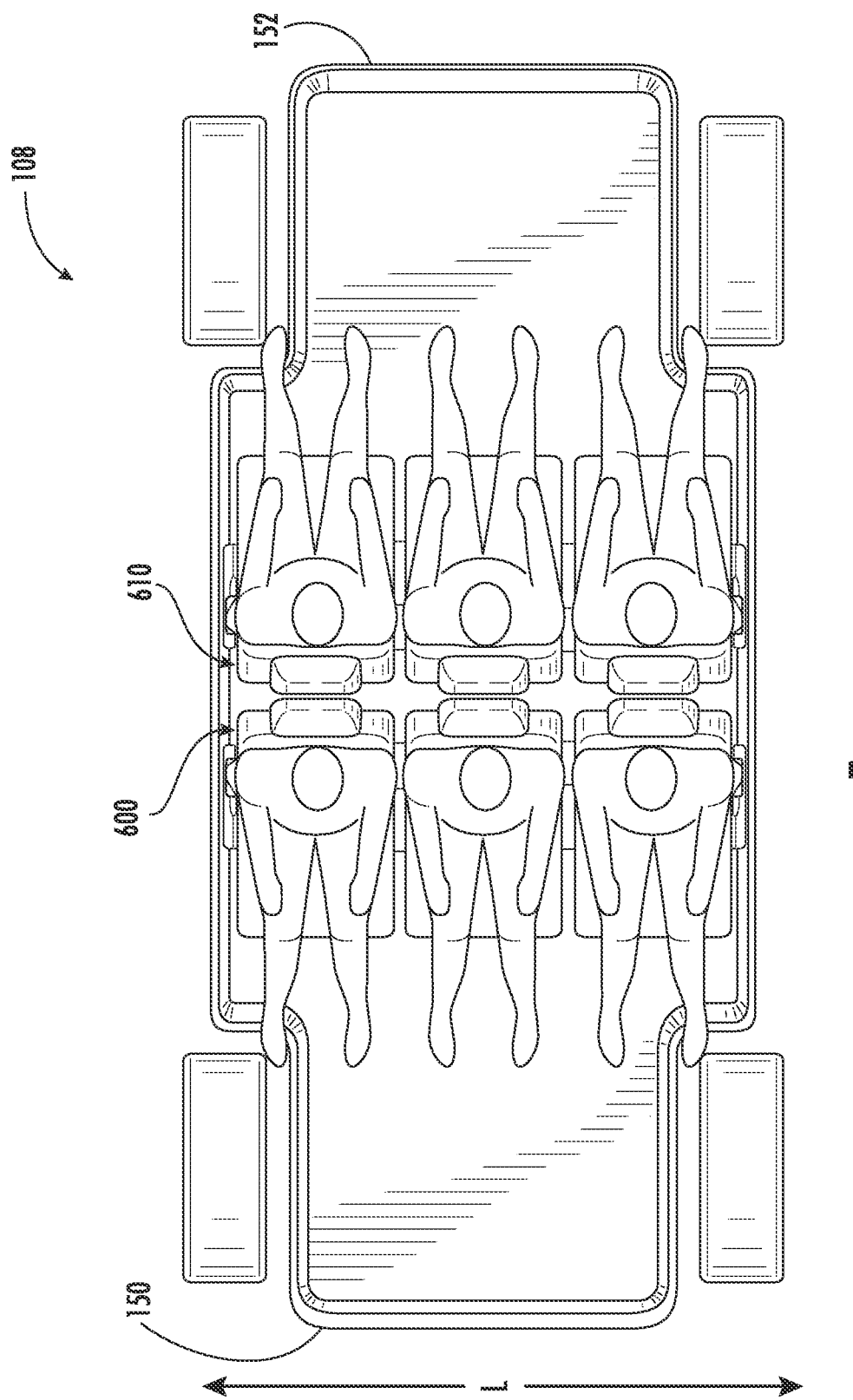
FIG. 25 depicts an interior of autonomous vehicle in a first seating configuration according to example embodiments of the present disclosure.
Figure 26:
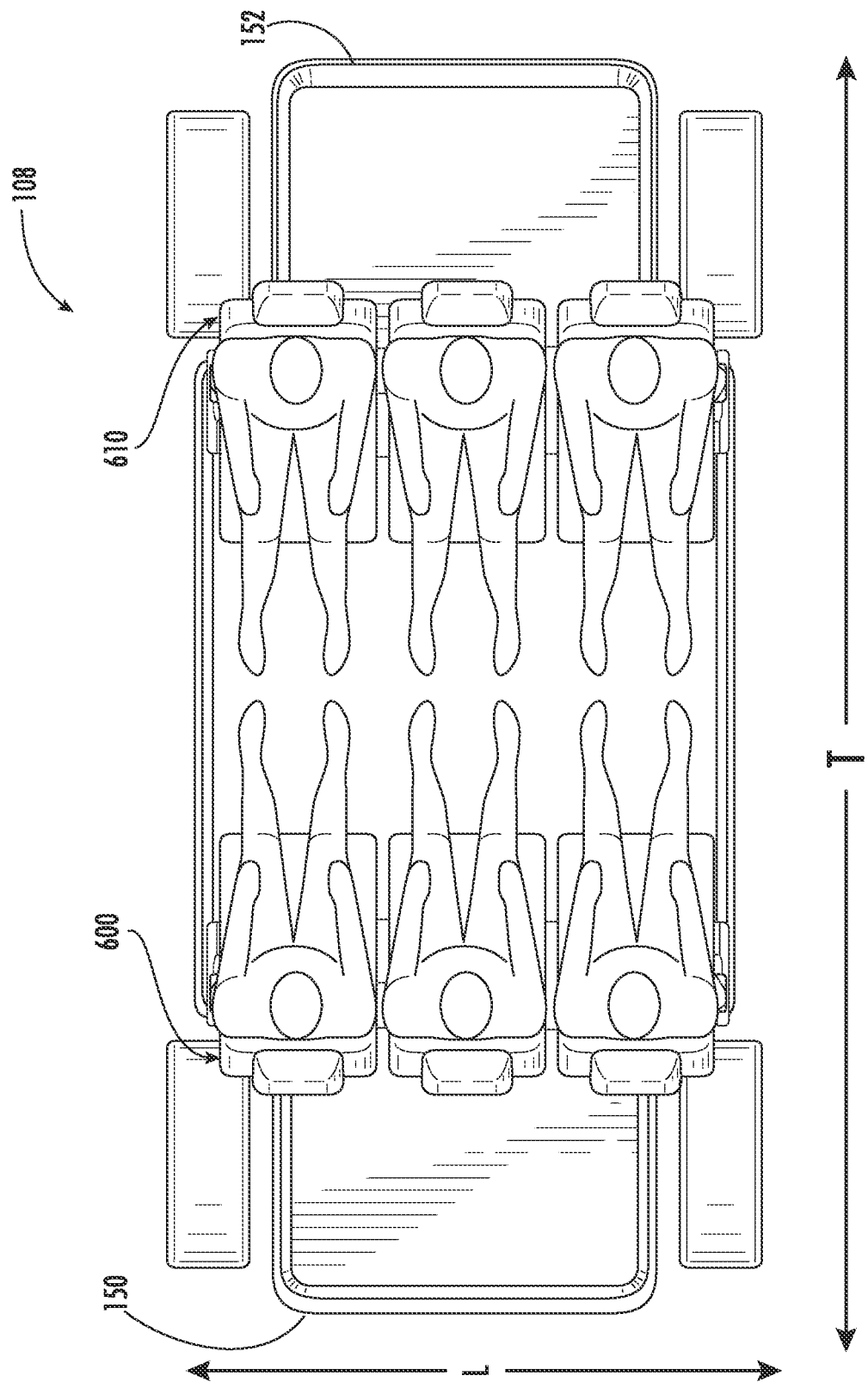
FIG. 26 depicts an interior of an autonomous vehicle in a second seating configuration according to example embodiments of the present disclosure.

Referring now to FIGS. 23 and 24, an embodiment of the third passenger seat 400 is provided according to the present disclosure. The third passenger seat 400 can include a seatback 410 and a seat bottom 420. In some implementations, the seatback 410 can be coupled to a vehicle body 170 (shown in FIG. 2) of the autonomous vehicle 108. Furthermore, the seat bottom 420 can be pivotably coupled to the seatback 410 (e.g., via pin, rod, etc.). In this manner, the seat bottom 420 can rotate about a pivot point on the seatback 410 to move (e.g., rotate) between a deployed position (FIG. 23) and a stowed position (FIG. 24). When the seat bottom 420 of the third passenger seat 400 is in the deployed position, the seat bottom 420 can be substantially perpendicular (e.g., less than a 15 degree, less than a 10 degree, less than a 5 degree, less than a 1 degree, etc. difference from 90 degrees) to the seatback 410 of the third passenger seat 400. In this manner, the third passenger seat 400 can accommodate a passenger when the seatback 410 of the third passenger seat 400 is in the deployed position. Conversely, the seat bottom 420 of the third passenger seat 400 can be substantially parallel (e.g., less than a 15 degree difference, less than a 10 degree difference, less than a 5 degree difference, less than a 1 degree difference, etc.) to the seatback 410 of the third passenger seat 400 when the seat bottom 420 is in the stowed position. When the seat bottom 420 of the third passenger seat 400 is in the stowed position, a space between the second passenger seat 300 (shown in FIGS. 11 and 12) and the third passenger seat 400 along the longitudinal axis T can accommodate luggage of one or more passengers.

In some implementations, the third passenger seat 400 can include a headrest 430. Furthermore, in some implementations, the headrest 430 can be movable along the third axis 206. In this manner, the headrest 430 can move along the third axis 206 to accommodate the head of a passenger seated in the first passenger seat 200.

Referring now to FIGS. 25-28, the interior of the autonomous vehicle 108 can include a first row of passenger seats 600 and a second row of passenger seats 610 that is spaced apart from the first row of passenger seats 600 along the longitudinal axis T. For instance, the first row of passenger seats 600 and the second row of passenger seats 610 can each include at least two passenger seats arranged in a side-by-side configuration along the lateral axis L of the autonomous vehicle 108. Each of the at least two passenger seats can define a seating orientation. Furthermore, each of the at least two passenger seats can be configurable in the first configuration in which the seating orientation is directed towards the first end 150 (e.g., forward end) of the autonomous vehicle 108 and the second configuration in which the seating orientation is directed towards the second end 152 (e.g., rear end) of the autonomous vehicle 108.

In some implementations, each of the at least two passenger seats can be configured as the first passenger seat 200 discussed above with reference to FIGS. 13-20. For instance, each of the at least two passenger seats can include the base 250 (shown in FIG. 13) and the seatback 230 (shown in FIG. 14) pivotably coupled to the base 250. In this manner, the seatback 230 can rotate about one or more pivot points on the base 250 to switch the corresponding passenger seat between the first configuration and the second configuration.

Figure 27:
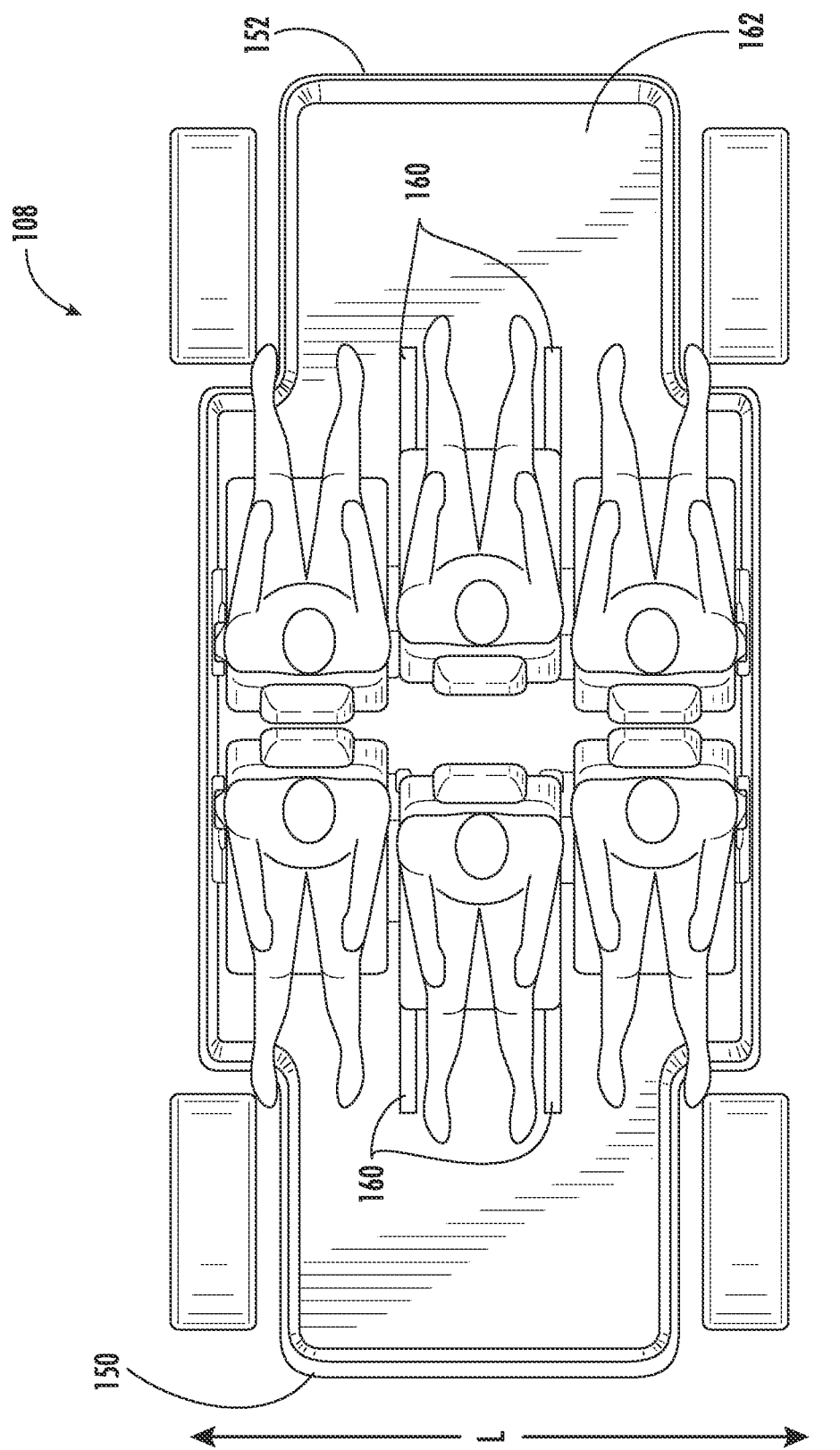
FIG. 27 depicts an interior of an autonomous vehicle in a first seating configuration according to example embodiments of the present disclosure.
Figure 28:
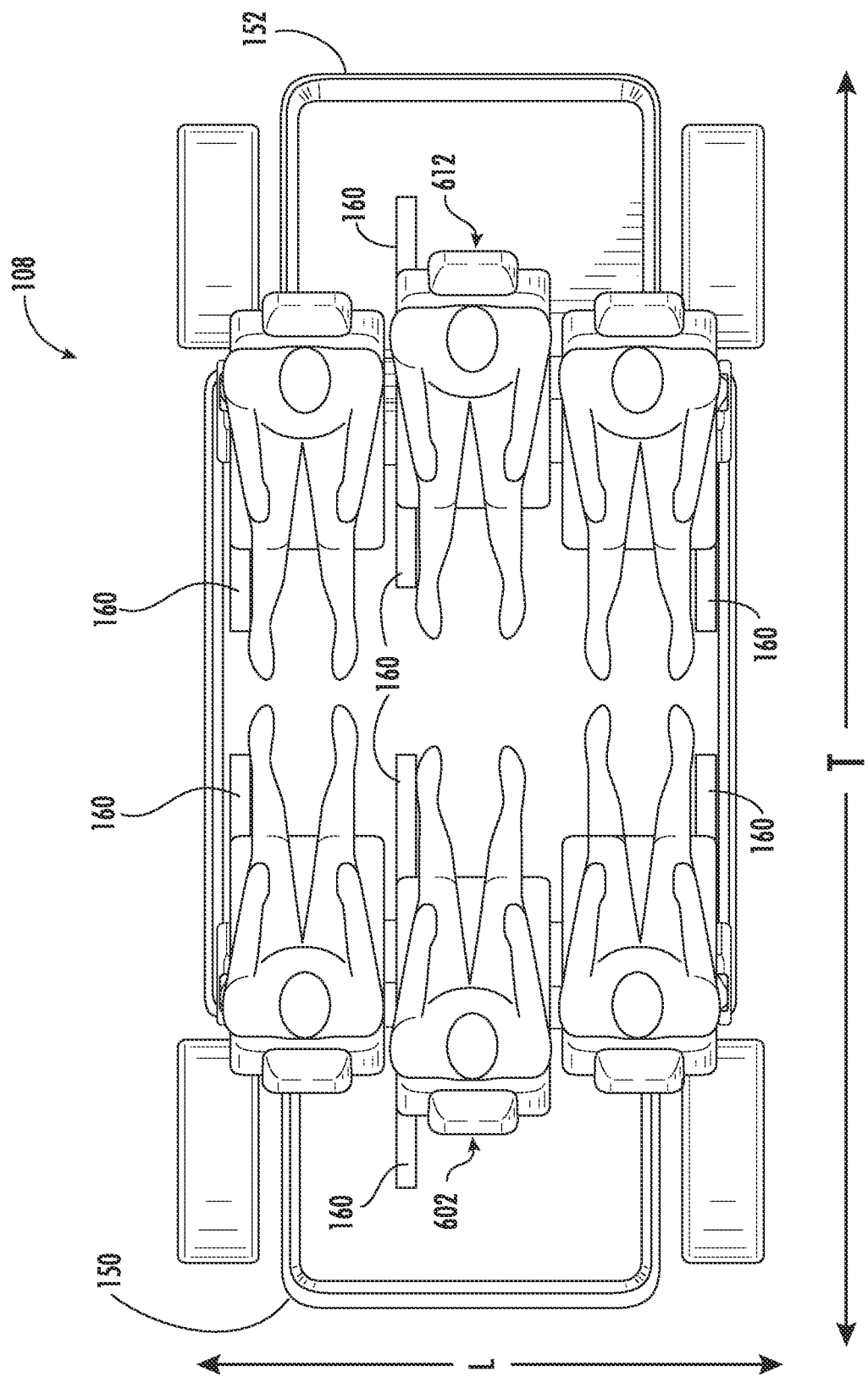
FIG. 28 depicts an interior of an autonomous vehicle in a second seating configuration according to example embodiments of the present disclosure.

In some implementations, one or more of the at least two passenger seats can be independently movable along the longitudinal axis T via one or more tracks 160 defined by the floorboard 162 of the autonomous vehicle 108 (as shown in FIGS. 27 and 28). More specifically, the base 250 of one or more of the at least two passenger seats of the first row of passenger seats 600 and the second row of passenger seats 610 can be movable along the one or more tracks 160. For instance, in some implementations, a passenger seat 602 in the first row of passenger seats 600 can be offset relative to every other passenger included in the first row of passenger seats 600. More specifically, a seatback 230 of the passenger seat 602 can be positioned forward by a first offset distance (e.g., at least 6 inches, at least 12 inches, at least 24 inches, etc.) or aft by a second offset distance (e.g., at least 6 inches, at least 12 inches, at least 24 inches, etc.) of the seatback of every other passenger seat in the first row of passenger seats 600. Additionally, or alternatively, a passenger seat 612 in the second row of passenger seats 610 can be offset relative to every other passenger included in the second row of passenger seats 610. More specifically, a seatback 230 of the passenger seat 612 can be positioned forward by a first offset distance (e.g., at least 6 inches, at least 12 inches, at least 24 inches, etc.) or aft by a second offset distance (e.g., at least 6 inches, at least 12 inches, at least 24 inches, etc.) of the seatback of every other passenger seat in the first row of passenger seats 610. In this manner, inadvertent contact (e.g., bumping elbows, rubbing shoulders) between a person seated in the passenger seat 602, 612 and a person seated in a passenger seat that is positioned adjacent (e.g., positioned on either side of) the passenger seat 602, 612 can be avoided.

Figure 29:
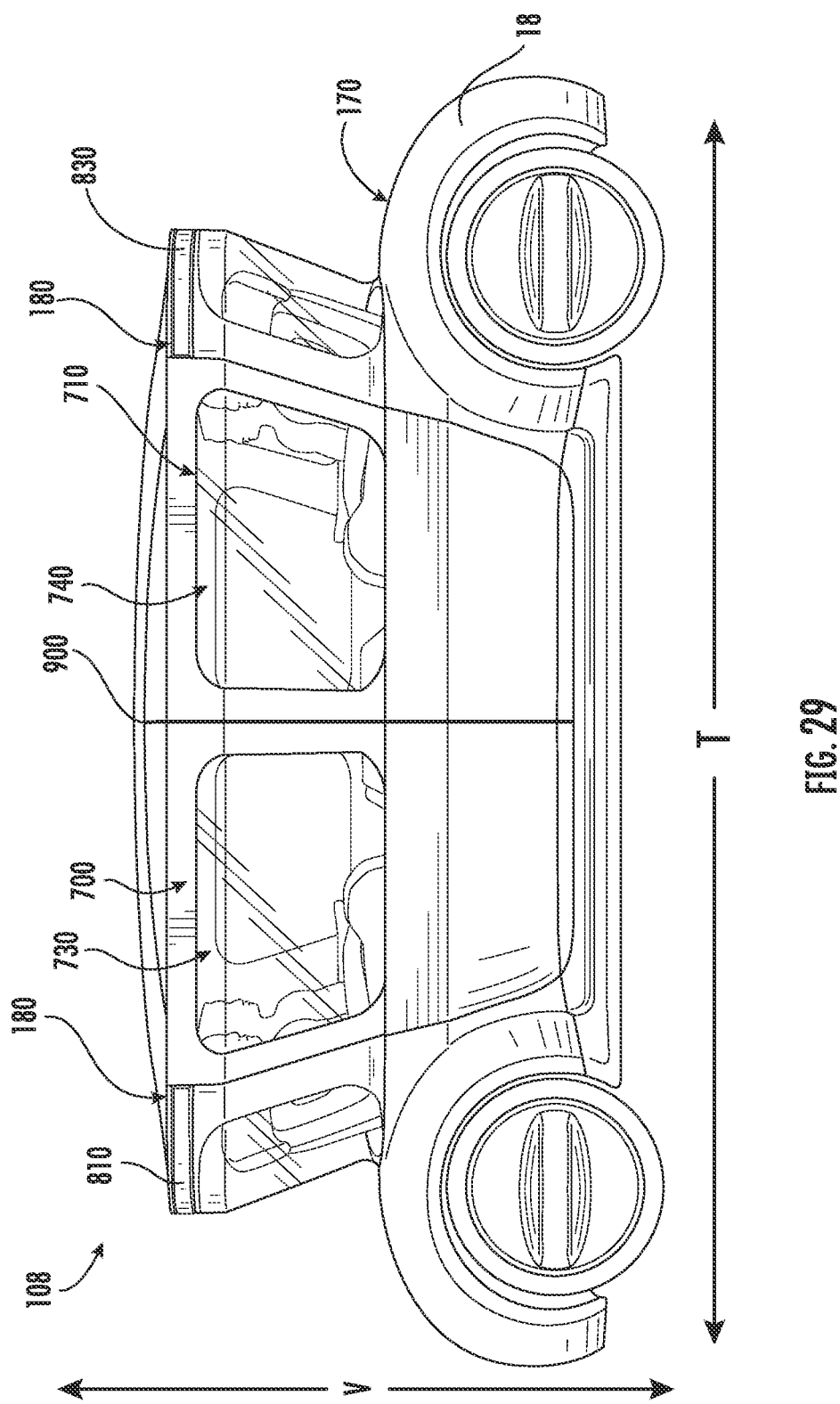
FIG. 29 depicts a double door of an autonomous vehicle in a closed position according to example embodiments of the present disclosure.
Figure 30:
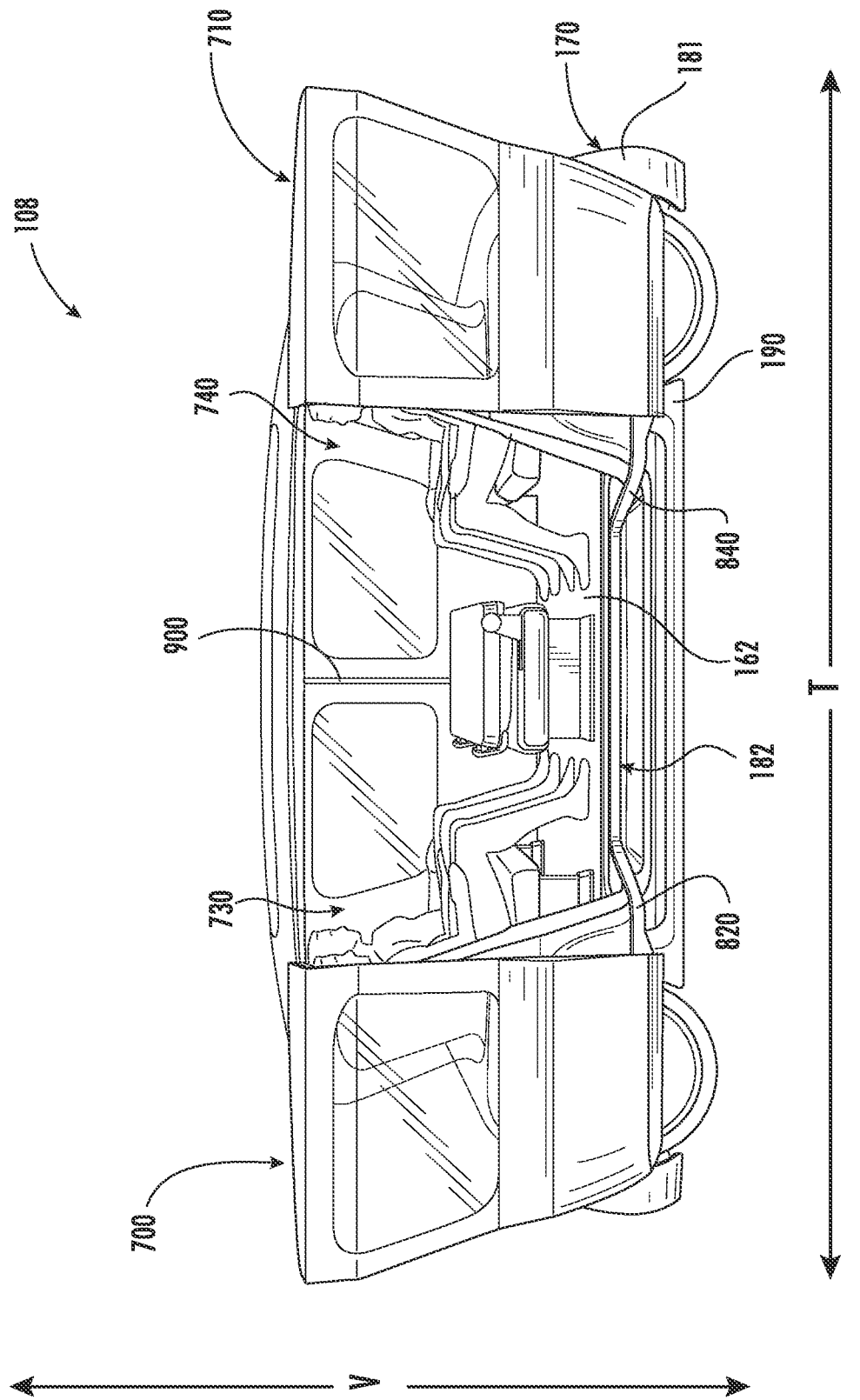
FIG. 30 depicts a double door of an autonomous vehicle in a closed position according to example embodiments of the present disclosure.
Figure 31:
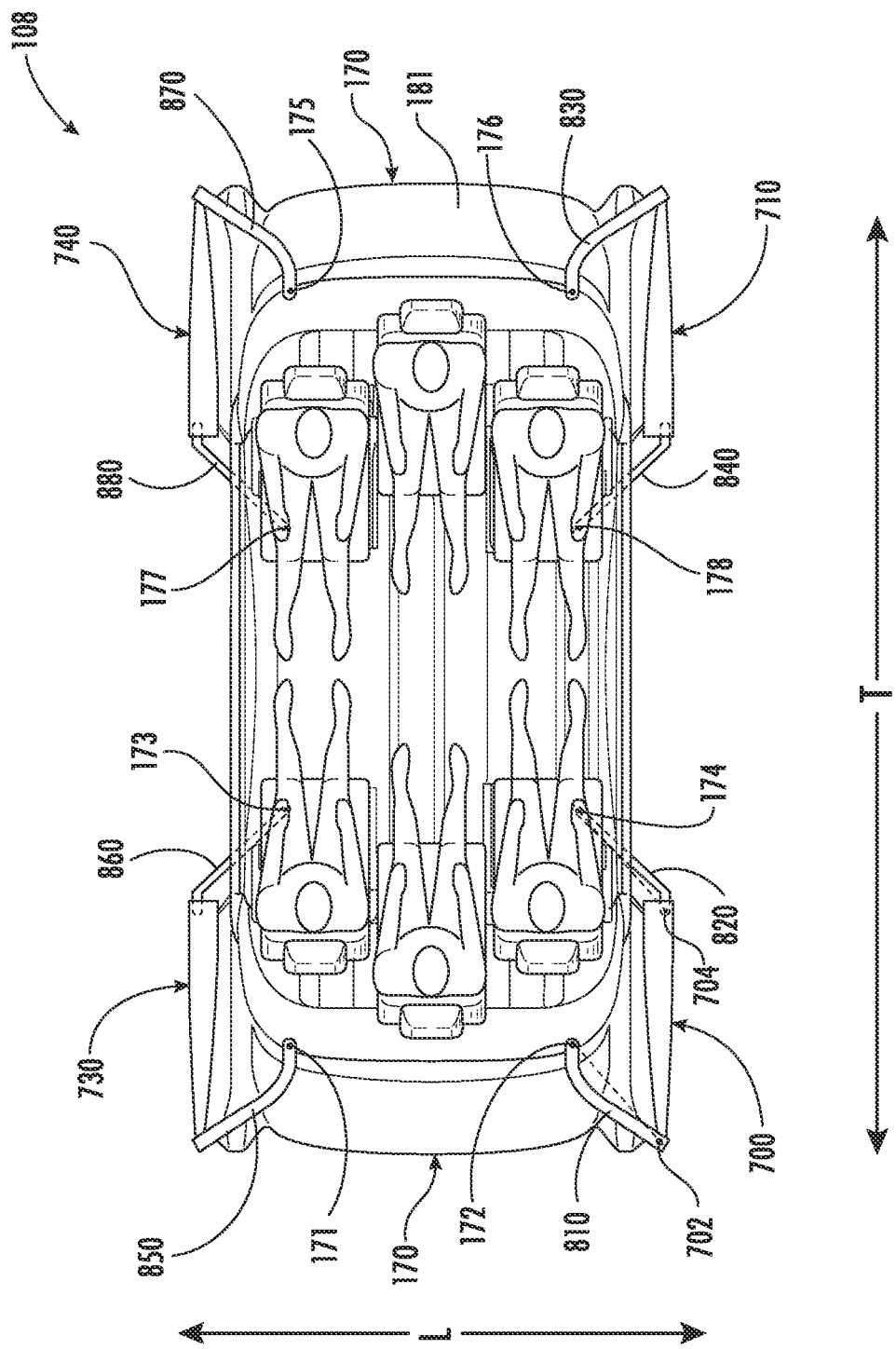
FIG. 31 depicts another view of a double door of an autonomous vehicle in an open position according to example embodiments of the present disclosure.

Referring now to FIGS. 29 through 31, the autonomous vehicle 108 can, in some implementations, include a door assembly 700 pivotably fixed to the vehicle body 170 of the autonomous vehicle 108 via a linkage assembly. It should be understood that the vehicle body 170 can include a frame (not shown) of the autonomous vehicle 108 along with one or more body panels 181 coupled to the frame. The linkage assembly can include at least a first linkage arm 810 and a second linkage arm 820. The first linkage arm 810 can pivotably fix the door assembly 700 to the vehicle body 170 at a first pivot point 172 thereon. The second linkage arm 820 can pivotably fix the door assembly 700 to the vehicle body 170 at a second pivot point 174 thereon. The second pivot point 174 can be spaced apart from the first pivot point 172 along a vertical axis V of the vehicle body 170 and a longitudinal axis L of the vehicle body 170. In this manner, movement of the first linkage arm 810 and the second linkage arm 820 can cause the door assembly 700 to translate along the longitudinal axis T and the lateral axis L of the vehicle body 170. In some implementations, the first pivot point 172 and the second pivot point 174 can be spaced apart from one another along an axis that is parallel to the longitudinal axis T.

The first pivot point 172 and the second pivot point 174 can each be inset from a periphery of the vehicle body 170 to reduce a swept path of the door assembly 700 when moving between an open position (shown FIG. 29) and a closed position (shown FIG. 30) to permit selective access to an interior (e.g., passenger compartment) of the vehicle body 170. In this manner, the swept path of the door assembly 700 can be reduced so that the door assembly 700 does not protrude onto a sidewalk or adjacent traffic lane when moving between the open position and the closed position. For instance, in some implementations, the first pivot point 172 and the second pivot point 174 can be inset from the periphery of the vehicle body 170 such that the first pivot point 172 and the second pivot point 174 are each positioned between opposing sides of the vehicle body 170 along the lateral axis L.

In some implementations, the first pivot point 172 and the second pivot point 174 can each be positioned outside of the interior (e.g., passenger compartment) of the vehicle body 170. For instance, the first pivot point 172 can be positioned within a cavity 180 (shown in FIG. 29) defined by an exterior surface of the vehicle body 170. In such implementations, a shape of the first linkage arm 810 can correspond to a shape of the cavity 180 defined by the exterior surface of the vehicle body 170. In this manner, the first linkage arm 810 can be positioned entirely within the cavity 180 when the door assembly 700 is in the closed position (shown in FIG. 29). It should be understood that only a portion of the first linkage arm 810 can be positioned within the cavity 180 when the door assembly 700 is in the open position(shown in FIGS. 30 and 31). Alternatively, or additionally, the second pivot point 174 can be positioned within a cavity 182 (shown in FIG. 30) defined between a running board 190 of the autonomous vehicle 108 and the floorboard 162 of the autonomous vehicle 108.

As shown in FIG. 31, the first pivot point 172 and the second pivot point 174 can each be equidistant from the door assembly 700. More specifically, a first straight line distance (denoted by dashed line) from the first pivot point 172 on the vehicle body 170 to a first point 702 at which the first linkage arm 810 is coupled to the door assembly 700 can be substantially the same as a second straight line distance (denoted by dashed line) from the second pivot point 174 on the vehicle body 170 to a second point 704 at which the second linkage arm 820 is coupled to the door assembly 700. As such, the first linkage arm 810 and the second linkage arm 820 can remain parallel to one another when the door assembly 700 is moving between the closed position (shown in FIG. 29) and the open position (shown in FIG. 31). In this manner, rotation of the door assembly 700 about the vertical axis V when the door assembly 700 is moving between the closed position and the open position can be avoided.

In some implementations, the autonomous vehicle 108 can include a double door. In such implementations, the autonomous vehicle 108 can include a second door assembly 710 pivotably fixed to the vehicle body 170 via the linkage assembly. For instance, the linkage assembly can include a third linkage arm 830 and a fourth linkage arm 840. The third linkage arm 830 can pivotably fix the second door assembly 710 to the vehicle body 170 at a third pivot point 176 thereon. The fourth linkage arm 840 can pivotably fix the second door assembly 710 to the vehicle body 170 at a fourth pivot point 178 thereon. The fourth pivot point 178 can be spaced apart from the third pivot point 176 along the vertical axis V of the vehicle body 170 and the longitudinal axis T of the vehicle body 170. In this manner, movement of the third linkage arm 830 and the fourth linkage arm 840 can cause the second door assembly 710 to translate along the longitudinal and lateral axes T, L of the vehicle body 170.

The third pivot point 176 and the fourth pivot point 178 can each be inset from a periphery of the vehicle body 170 to reduce a swept path of the second door assembly 710 when moving between an open position and a closed position to permit selective access to an interior (e.g., passenger compartment) of the vehicle body 170. In this manner, the swept path of the second door assembly 710 can be reduced so that the second door assembly 710 does not protrude onto a sidewalk or adjacent traffic lane when moving between the open position and the closed position.

In some implementations, the autonomous vehicle 108 can include a second double door. The second double door can include a third door assembly 730 and a fourth door assembly 740. The third door assembly 730 and the fourth door assembly 740 can each be pivotably fixed to the vehicle body 170 via the linkage assembly. For instance, the linkage assembly can include a fifth linkage arm 850 and a sixth linkage arm 860. The fifth linkage arm 850 can pivotably fix the third door assembly 730 to the vehicle body 170 at a fifth pivot point 171 thereon. The sixth linkage arm 860 can pivotably fix the third door assembly 730 to the vehicle body 170 at a sixth pivot point 173 thereon. The sixth pivot point 173 can be spaced apart from the fifth pivot point 171 along the vertical axis V of the vehicle body 170 and the longitudinal axis T of the vehicle body 170. In this manner, movement of the fifth linkage arm 850 and the sixth linkage arm 860 can cause the third door assembly 730 to translate along the longitudinal and lateral axes T, L of the vehicle body 170.

The fifth pivot point 171 and the sixth pivot point 173 can each be inset from a periphery of the vehicle body 170 to reduce a swept path of the third door assembly 730 when moving between an open position (shown in FIGS. 30 and 31) and a closed position to permit selective access to an interior (e.g., passenger compartment) of the vehicle body 170. In this manner, the swept path of the third door assembly 730 can be reduced so that the third door assembly 730 does not protrude onto a sidewalk or adjacent traffic lane when moving between the open position and the closed position.

The linkage assembly can further include a seventh linkage arm 870 and an eight linkage arm 880. The seventh linkage arm 870 can pivotably fix the fourth door assembly 740 to the vehicle body 170 at a seventh pivot point 175 thereon. The eight linkage arm 880 can pivotably fix the fourth door assembly 740 to the vehicle body 170 at an eight pivot point 177 thereon. The eight pivot point 177 can be spaced apart from the seventh pivot point 175 along the vertical axis V of the vehicle body 170 and the longitudinal axis T of the vehicle body 170. In this manner, movement of the seventh linkage arm 870 and the eight linkage arm 880 can cause the fourth door assembly 740 to translate along the longitudinal and lateral axes T, L of the vehicle body 170.

The seventh pivot point 175 and the eight pivot point 177 can each be inset from a periphery of the vehicle body 170 to reduce a swept path of the fourth door assembly 740 when moving between an open position and a closed position to permit selective access to an interior (e.g., passenger compartment) of the vehicle body 170. In this manner, the swept path of the fourth door assembly 740 can be reduced so that the fourth door assembly 740 does not protrude onto a sidewalk or adjacent traffic lane when moving between the open position and the closed position.

Figure 32:
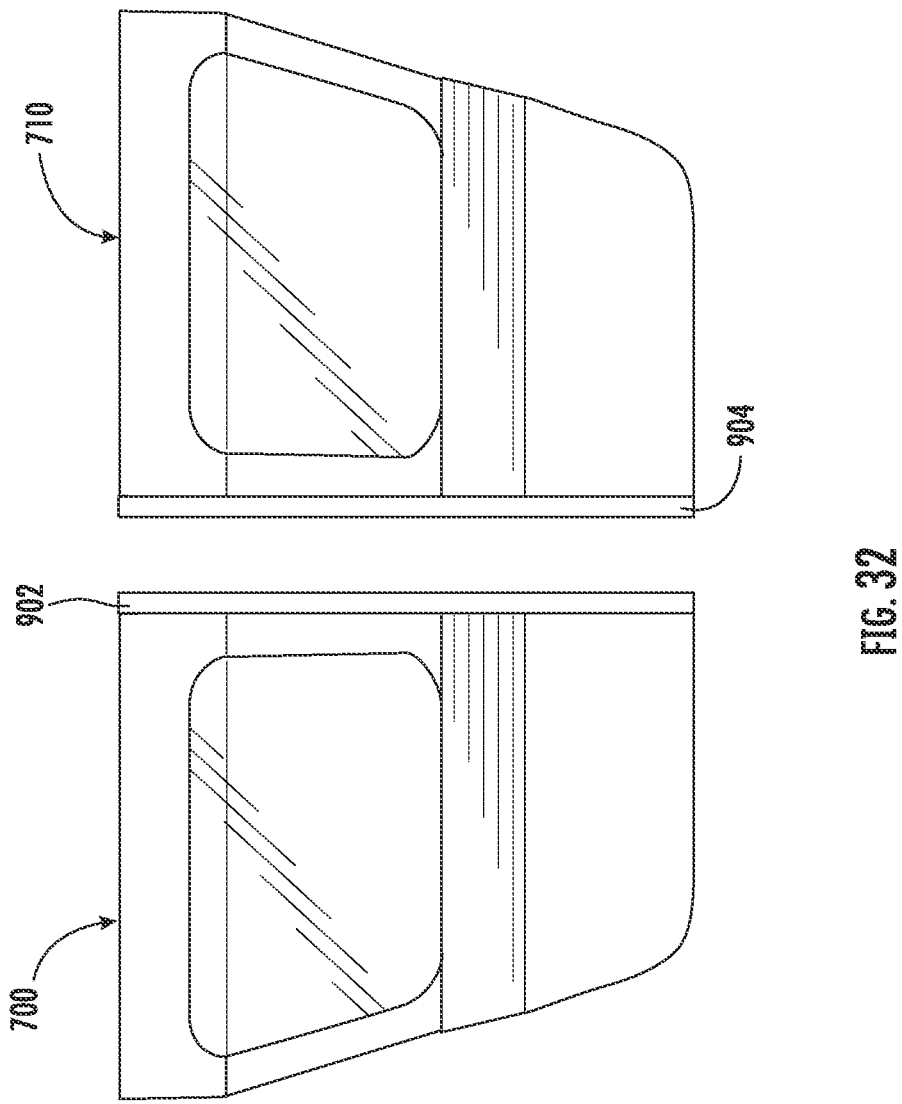
FIG. 32 depicts a vertical support that is integral with a first door of a double door and a second door of a double door according to example embodiments of the present disclosure.
Figure 33:
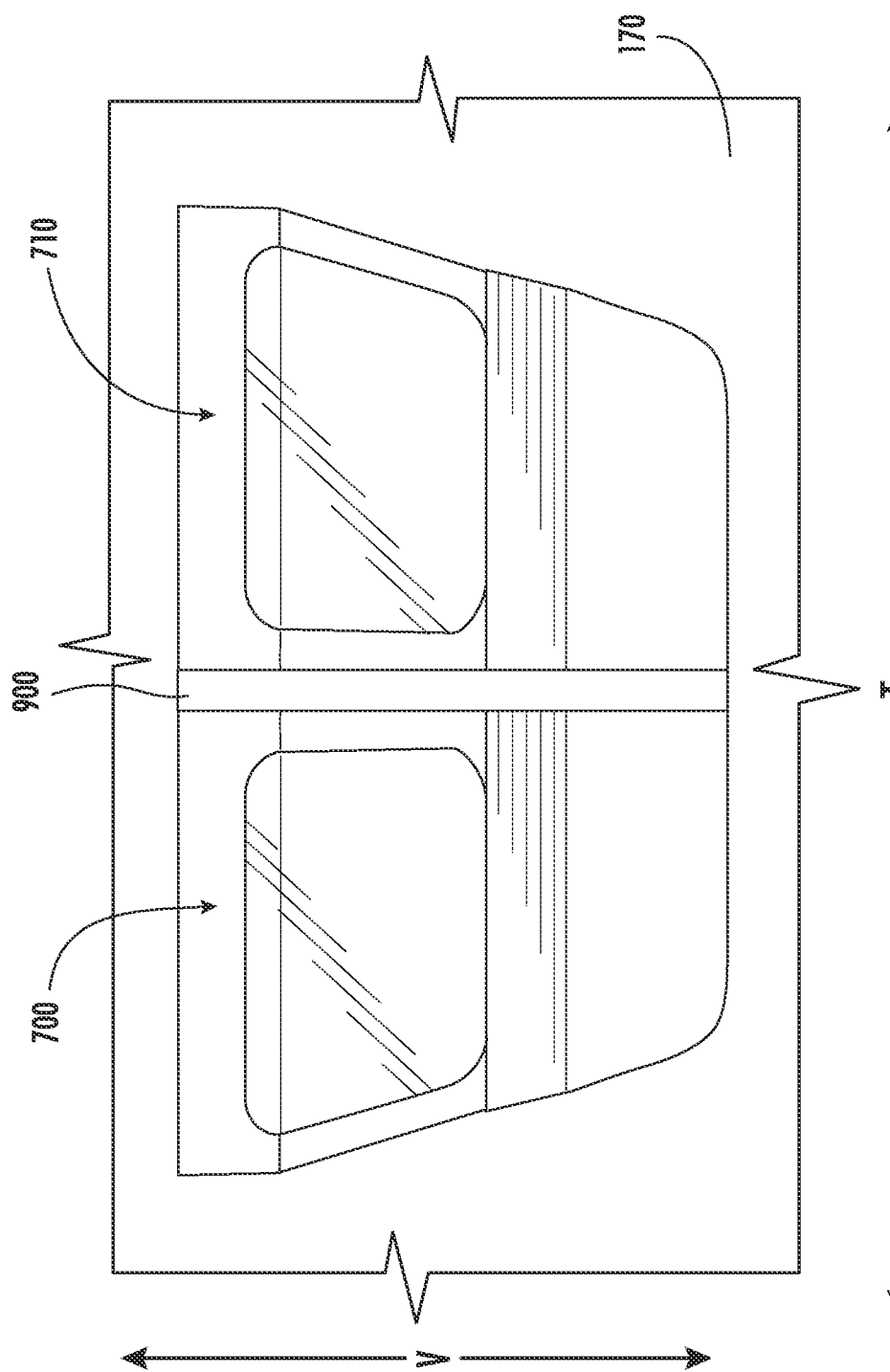
FIG. 33 depicts a vertical support in a first position when a door of a double door is in a closed position.
Figure 34:
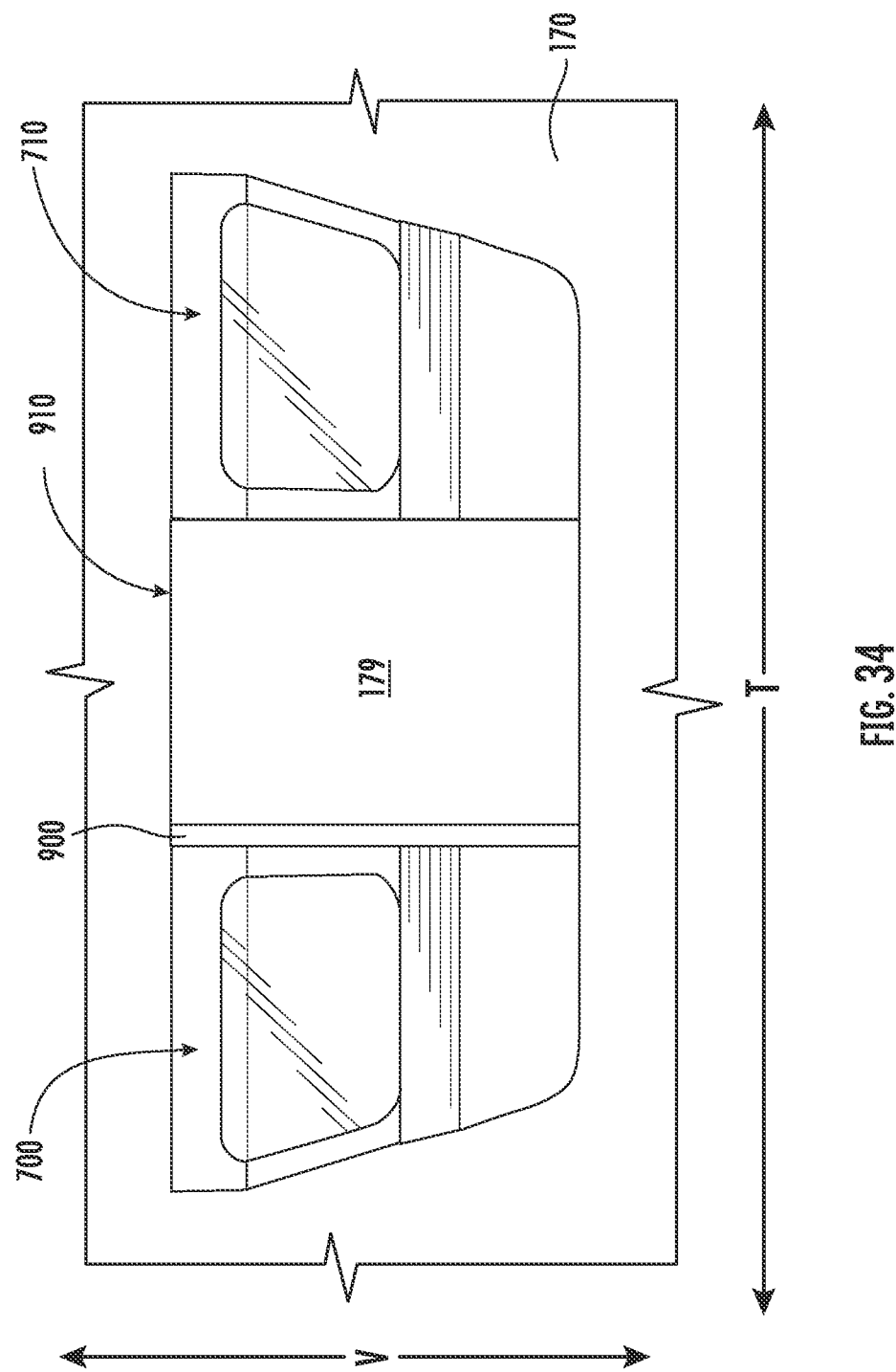
FIG. 34 depicts a vertical support in a second position when a door of a double door is in an open position.

Referring now to FIGS. 32-34, the autonomous vehicle 108 can, in some implementations, include a vertical support 900 (e.g., support pillar) that can be selectively coupled to the vehicle body 170 of the autonomous vehicle 108. More specifically, the vertical support 900 can be selectively coupled to the vehicle body 170 based on a position (e.g., open, closed) of at least one door assembly (e.g., first door assembly 700 and second door assembly 710) of a double door. When the at least one door assembly is in the closed position, the vertical support 900 can be coupled to the vehicle body 170, as further described herein. In some implementations, the vertical support 900 can be coupled to the vehicle body 170 such that the vertical support 900 is positioned at a middle of an opening 910 through which passengers enter and exit the interior 179 (e.g., passenger compartment) of the vehicle body 170. Conversely, the vertical support 900 can be decoupled from the vehicle body 170 when the at least one door assembly is in the open position. Furthermore, the vertical support 900 is not positioned at the middle of the opening 910 when the at least one door assembly is in the open position. In this manner, the vertical support 900 does not obstruct the opening 910 through which passengers enter and exit the interior 179 of the vehicle body 170.

In some implementations, the vertical support 900 can be integral with the first door assembly 700 of the double door. In such implementations, the vertical support 900 can be coupled to the vehicle body 170 when the first door assembly 700 is in the closed position. For instance, in some implementations, opposing ends of the vertical support 900 can include one or more projections (not shown) that can engage corresponding openings (also not shown) in the vehicle body 170 when the first door assembly 700 is in the closed position. Furthermore, the one or more projections can disengage the corresponding projections in the vehicle body 170 immediately prior to the first door assembly 700 moving from the closed position to the open position. In this manner, the vertical support 900 can be decoupled from the vehicle body 170 and move with the first door assembly 700 such that the vertical support 900 does not obstruct the opening 910 through which passengers enter and exit the interior 179 (e.g., passenger compartment) of the vehicle body 170 when the first door assembly is in the open position. In some implementations, the vertical support 900 can be integral with the second door assembly 710 in a similar manner.

In some implementations, the vertical support 900 can be integral with each door assembly (e.g., first door assembly 700 and second door assembly 710) of the double door. For instance, as shown in FIG. 32, a first portion 902 of the vertical support 900 can be integral with the first door assembly 700 of the double door, and a second portion 904 of the vertical support 900 can be integral with a second door assembly 710 of the double door. In such implementations, the first portion 902 of the vertical support 900 can be coupled to the vehicle body 170 when the first door assembly 700 is in the closed position. Likewise, the second portion 904 of the vertical support 900 can be coupled to the vehicle body 170 when the second door assembly 710 is in the closed position. In this manner, the vertical support 900 can provide structural support for a roof of the autonomous vehicle when both door assemblies (e.g., first door assembly 700, second door assembly 710) of the double door are in the closed position. Furthermore, the first portion 902 of the vertical support 900 can decouple from the vehicle body 170 and move with the first door assembly 700 as the first door assembly 700 moves from the closed position to the open position. Likewise, the second portion 904 of the vertical support 900 can decouple from the vehicle body 170 and move with the second door assembly 710 as the second door assembly 710 moves from the closed position to the open position. In this manner, the first portion 902 of the vertical support 900 and the second portion 904 of the vertical support 900 do not obstruct the opening 910 through which passengers enter and exit the interior 179 (e.g., passenger compartment) of the autonomous vehicle 108. In some implementations, the first portion 902 of the vertical support 900 and the second portion 904 of the vertical support 900 can be coupled to one another while their respective door assemblies are in the closed position. This can be accomplished via one or more magnets, protrusion/recess connection, tab/slot connection, etc.

In some implementations, the vertical support 900 can be coupled to the vehicle body 170 and movable relative to the vehicle body 170 along the longitudinal axis T based on a position of the first door assembly 700 of the double door. When the first door assembly 700 of the double door moves between the open position (shown in FIG. 34) and the closed position (shown in FIG. 33) to permit selective access to the interior 179 (e.g., passenger compartment) of the vehicle body 170 via the opening 910 defined by the vehicle body 170, the vertical support 900 can move between a first location (shown in FIG. 33) within the opening 910 and a second location (shown in FIG. 34) within the opening 910. The first location can correspond to a middle of the opening 910, whereas the second location can correspond to an edge of the opening 910. When the first door assembly 700 of the double door is in the closed position, the vertical support 900 can be in the first location (that is, the middle of the opening) to provide structural support for a roof of the autonomous vehicle. Conversely, the vertical support 900 can be in the second location (that is, an edge of the opening) when the first door assembly 700 of the double door is in the open position. In this manner, the vertical support 900 does not obstruct the opening passengers use to enter and exit the interior 179 of the autonomous vehicle 108 when the first door assembly 700 is in the open position.

In some implementations, the vehicle body 170 can define a track (not shown) that the vertical support 900 moves along as the first door assembly 700 of the double door moves between the closed position and the open position. In such implementations, the track can allow the vertical support 900 to move within the opening between at least the first location and the second location. In alternative implementations, the vertical support 900 can be coupled to the first door assembly 700 of the double door via one or more linkages (not shown) that are separate from the linkages (e.g., first linkage arm 810, second linkage arm 820) of the linkage assembly 800 discussed above with reference to FIGS. 29-31.

In some implementations, the vertical support 900 can be selectively coupled to the vehicle body 170 based on a position (e.g., open position, closed position) of both door assemblies (e.g., first door assembly 700 and second door assembly 710) of the double door. In some instances, only one door assembly (e.g., first door assembly 700 or second door assembly 710) of the double door moves to the open position to allow passengers to enter and exit the interior 179 of the vehicle body 170. In such instances, the vertical support 900 can remain coupled to the vehicle body 170. More specifically, the vertical support 900 can remain coupled to the vehicle body 170 such that the vertical support 900 is positioned at the middle of the opening 910 defined by the vehicle body 170. In instances in which both door assemblies (e.g., first door assembly 700 and second door assembly 710) of the double door move to the open position to allow passenger to enter and exit the interior 179 of the vehicle body 170, the first door assembly 700 and the second door assembly 710 can move to the open position in a sequential manner. More specifically, the first door assembly 700 can move to the open position first and then the second door assembly 710 can begin moving to the open position. In such instances, the vertical support 900 can remain coupled to the vehicle body 170 until the second door assembly 710 of the double door begins to move to the open position.

In some implementations, the second door assembly 710 can pull the vertical support 900 along a track when the second door assembly 710 is moving from the closed position to the open position. More specifically, the second door assembly 710 can pull the vertical support 900 along the track such that the vertical support 900 moves from the middle of the opening 910 to an edge of the opening 910. In this manner, the vertical support 900 can be out of the way of passengers entering or exiting the interior 179 of the vehicle body 170 via the opening 910 when both door assemblies (e.g., first door assembly 700 and second door assembly 710) of the double door are in the open position.

It should be understood that whether one or both door assemblies of the double door move to the open position to allow passengers to enter and exit the interior 179 of the vehicle body 170 can be determined based, at least in part, on a variety of parameters. For instance, in some implementations, whether one or both of the door assemblies of the double door move to the open position can be determined based on a position of passengers within the interior 179 of the vehicle body 170. Alternatively, or additionally, weather conditions and/or a seating configuration of the interior 179 of the vehicle body 170 can determine whether one or more both of the door assemblies move to the open position.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A control system for an autonomous vehicle, the control system comprising:
   a first actuator configured to move a first portion of a first passenger seat of the autonomous vehicle to adjust an interior of the autonomous vehicle between a first seating configuration in which a seating orientation of the first passenger seat and a seating orientation of a second passenger seat of the autonomous vehicle face one another and a second seating configuration in which the seating orientation of the first passenger seat and the seating orientation of the second passenger seat face away from one another; and
   one or more computing devices configured to provide a control signal to the first actuator to move the first portion of the first passenger seat to adjust the interior of the autonomous vehicle between the first seating configuration and the second seating configuration.

2. The control system of claim 1, further comprising:
   a second actuator configured to move a second portion of the first passenger seat, the second portion of the first passenger seat being different from the first portion of the first passenger seat.

3. The control system of claim 2, wherein the first portion of the first passenger seat comprises a seatback of the first passenger seat and the second portion of the first passenger seat comprises a seat bottom of the first passenger seat.

4. The control system of claim 3, wherein the one or more computing devices are further configured to:
   provide a control signal to the second actuator to move the seat bottom of the first passenger seat to adjust a tilt angle of the seat bottom while the first actuator is moving the seatback of the first passenger seat to adjust the interior of the autonomous vehicle between the first seating configuration and the second seating configuration.

5. The control system of claim 4, wherein in the first seating configuration and the second seating configuration, the seat bottom of the first passenger seat has the same tilt angle.

6. The control system of claim 3, further comprising:
   a third actuator configured to move a headrest of the first passenger seat between a stowed position and a deployed position.

7. The control system of claim 6, wherein the one or more computing devices are further configured to:
   obtain, via one or more sensors associated with the first passenger seat, first data indicative of a person being seated in the first passenger seat; and
   in response to obtaining the first data, provide a control signal to the third actuator to move the headrest from the stowed position to the deployed position.

8. The control system of claim 7, wherein the one or more computing devices are further configured to:
   obtain, via the one or more sensors, second data indicative of the person no longer being seated in the first passenger seat; and
   in response to obtaining the second data, provide a control signal to the third actuator to move the headrest from the deployed position to the stowed position.

9. The control system of claim 1, wherein the first actuator is configured to rotate the first portion of the first passenger seat about a pivot point on a base of the first passenger seat to adjust the interior of autonomous vehicle between the first seating configuration and the second seating configuration.

10. An autonomous vehicle comprising:
    a vehicle body defining an interior;
    a first passenger seat positioned within the interior;
    a second passenger seat positioned within the interior; and
    a control system comprising:
       a first actuator configured to move a first portion of the first passenger seat to adjust the interior of the autonomous vehicle between a first seating configuration in which a seating orientation of the first passenger seat and a seating orientation of the second passenger seat face one another and a second seating configuration in which the seating orientation of the first passenger seat and the seating orientation of the second passenger seat face away from one another; and
       one or more computing devices configured to provide a control signal to the first actuator to move the first portion of the first passenger seat to adjust the interior of the autonomous vehicle between the first seating configuration and the second seating configuration.

11. The autonomous vehicle of claim 10, further comprising:
a third passenger seat positioned between the first passenger seat and the second passenger seat within the interior of the vehicle body.

12. The autonomous vehicle of claim 11, wherein the control system further comprises:
a second actuator configured to move a seatback of the third passenger seat between a first position in which the seatback of the third passenger seat is folded down onto a seat bottom of the third passenger seat and a second position in which the seatback of the third passenger seat is upright relative to the seat bottom of the third passenger seat.

13. The autonomous vehicle of claim 12, wherein the one or more computing devices are further configured to:
provide a control signal to the second actuator to move the seatback of the third passenger seat between the first position and the second position while the first actuator is moving the first portion of the first passenger seat to adjust the interior of the autonomous vehicle between the first seating configuration and the second seating configuration.

14. The autonomous vehicle of claim 13, wherein the control system further comprises:
a second actuator configured to move a second portion of the first passenger seat that is different from the first portion of the first passenger seat.

15. The autonomous vehicle of claim 14, wherein the first portion of the first passenger seat comprises a seatback of the first passenger seat and the second portion of the first passenger seat comprises a headrest of the first passenger seat.

16. The autonomous vehicle of claim 15, wherein the second actuator is configured to move the headrest of the first passenger seat between a stowed position and a deployed position.

17. The autonomous vehicle of claim 16 wherein the one or more computing devices are further configured to:
obtain, via one or more sensors associated with the first passenger seat, first data indicative of a person being seated in the first passenger seat;
in response to obtaining the first data, provide a control signal to the second actuator to move the headrest from the stowed position to the deployed position;
obtain, via the one or more sensors, second data indicative of the person no longer being seated in the first passenger seat; and
in response to obtaining the second data, provide a control signal to the second actuator to move the headrest from the deployed position to the stowed position.

18. The autonomous vehicle of claim 10, wherein at least one of the first passenger seat or the second passenger seat comprises a bench.

19. The autonomous vehicle of claim 10, wherein:
the first portion of the first passenger seat comprises a seatback of the first passenger seat;
in the first seating configuration, the seatback of the first passenger seat is positioned closer to a first end of a seat bottom of the first passenger seat than a second end of the seat bottom that is spaced apart from the first end along a longitudinal centerline of the seat bottom; and
in the second seating configuration, the seatback of the first passenger seat is positioned closer to the second end of the seat bottom than the first end of the seat bottom.

20. One or more non-transitory computer-readable media storing instructions executable to cause one or more computing devices of a control system for an autonomous vehicle to perform operations comprising:
providing a control signal to a first actuator of the control system to move a first portion of a first passenger seat of the autonomous vehicle to adjust an interior of the autonomous vehicle between a first seating configuration in which a seating orientation of the first passenger seat and a seating orientation of a second passenger seat of the autonomous vehicle face one another and a second seating configuration in which the seating orientation of the first passenger seat and the seating orientation of the second passenger seat face away from one another.

* * * * *